(12) United States Patent
Kobayashi

(10) Patent No.: US 8,580,146 B2
(45) Date of Patent: Nov. 12, 2013

(54) LIQUID CRYSTAL COMPOUND, LIQUID CRYSTAL COMPOSITION AND LIQUID CRYSTAL DISPLAY DEVICE

(75) Inventor: Masahide Kobayashi, Ichihara (JP)

(73) Assignees: JNC Corporation, Tokyo (JP); JNC Petrochemical Corporation, Tokyo (JP)

( * ) Notice: Subject to any disclaimer, the term of this patent is extended or adjusted under 35 U.S.C. 154(b) by 0 days.

(21) Appl. No.: 13/360,302

(22) Filed: Jan. 27, 2012

(65) Prior Publication Data

US 2012/0193577 A1    Aug. 2, 2012

(30) Foreign Application Priority Data

Jan. 31, 2011  (JP) .................. 2011-018118
Dec. 7, 2011   (JP) .................. 2011-267465

(51) Int. Cl.
*C09K 19/30* (2006.01)
*C09K 19/32* (2006.01)
*C09K 19/34* (2006.01)
*C09K 19/06* (2006.01)
*C09K 19/52* (2006.01)
*C09K 19/00* (2006.01)
*C07C 19/08* (2006.01)
*C07C 22/00* (2006.01)
*C07C 25/13* (2006.01)
*C07C 41/00* (2006.01)
*C07C 43/02* (2006.01)
*C07C 43/20* (2006.01)

(52) U.S. Cl.
USPC .............. 252/299.63; 252/299.01; 252/299.6; 252/299.61; 252/299.62; 349/182; 428/1.1; 570/128; 568/642; 568/645; 568/647

(58) Field of Classification Search
USPC ............... 252/299.01, 299.6, 299.61, 299.62, 252/299.63; 428/1.1; 568/642, 645, 647; 570/128; 349/182
See application file for complete search history.

(56) References Cited

U.S. PATENT DOCUMENTS

| 5,204,018 | A | 4/1993 | Kelly |
| 5,204,019 | A | 4/1993 | Reiffenrath et al. |
| 5,236,620 | A | 8/1993 | Reiffenrath et al. |
| 6,921,560 | B2 * | 7/2005 | Okabe et al. ................... 428/1.1 |
| 7,081,279 | B2 * | 7/2006 | Kato et al. ..................... 428/1.1 |
| 2004/0065866 | A1 | 4/2004 | Kato et al. |

FOREIGN PATENT DOCUMENTS

| DE | 3906058 A1 | 9/1989 |
| JP | H02-503441 A | 10/1990 |
| JP | H04-330019 A | 11/1992 |
| JP | 2000-53602 A | 2/2000 |
| WO | 89/08633 A1 | 9/1989 |
| WO | 89/08687 A1 | 9/1989 |
| WO | 89/08689 A1 | 9/1989 |

OTHER PUBLICATIONS

Hird, M., The synthesis and transition temperatures of some ferroelectric host materials based on 4- and 4'-(trans-4-alkylcyclohexlmethoxy)-2,3-difluorobiphenyls, Liquid Crystals (1994), 16 (4), 625-641.

* cited by examiner

*Primary Examiner* — Geraldina Visconti
(74) *Attorney, Agent, or Firm* — Hogan Lovells US LLP

(57) ABSTRACT

A liquid crystal compound having a high stability to heat, light or the like, a wide temperature range of a nematic phase, a small viscosity, a suitable optical anisotropy, a large elastic constant $K_{33}$, a large negative dielectric anisotropy and an excellent compatibility with other liquid crystal compounds. Also, a liquid crystal composition having characteristics similar to these of the compound. Additionally, a liquid crystal display device having a short response time, low electric power consumption, a low driving voltage, a large contrast and a wide temperature range in which the device can be used. The compound is a 2,3-difluorobenzene derivative (1) having a combination of a cyclohexane ring, a cyclohexene ring or a benzene ring phenyl and a butene bonding group. The liquid crystal composition includes this compound, and the liquid crystal display device contains this composition.

(1)

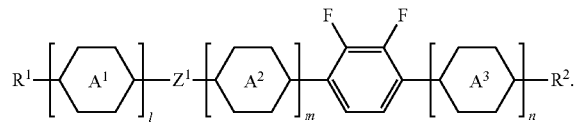

16 Claims, No Drawings

LIQUID CRYSTAL COMPOUND, LIQUID CRYSTAL COMPOSITION AND LIQUID CRYSTAL DISPLAY DEVICE

This is a Non-Provisional application, which claims priority to Japanese Patent Application No. 2011-018118, filed on Jan. 31, 2011 and Japanese Patent Application No. 2011-267465, filed on Dec. 7, 2011, the contents of which are all herein incorporated by this reference in their entireties. All publications, patents, patent applications, databases and other references cited in this application, all related applications referenced herein, and all references cited therein, are incorporated by reference in their entirety as if restated here in full and as if each individual publication, patent, patent application, database or other reference were specifically and individually indicated to be incorporated by reference.

BACKGROUND OF THE INVENTION

1. Field of the Invention

The invention relates to a liquid crystal compound, a liquid crystal composition and a liquid crystal display device. More specifically, it relates to a 2,3-difluorobenzene derivative having a butene-bonding group, a liquid crystal composition including this compound and having a nematic phase, and a liquid crystal display device containing this composition.

2. Related Art

A liquid crystal display device typified by a liquid crystal display panel, a liquid crystal display module and so forth utilizes optical anisotropy, dielectric anisotropy and so forth, which are possessed by a liquid crystal compound. A variety of operating modes of this liquid crystal display device are known, such as a PC (phase change) mode, a TN (twisted nematic) mode, a STN (super twisted nematic) mode, a BTN (bistable twisted nematic) mode, an ECB (electrically controlled birefringence) mode, an OCB (optically compensated bend) mode, an IPS (in-plane switching) mode, a VA (vertical alignment) mode, a PSA (polymer sustained alignment) mode.

In the operating modes, the ECB mode, the IPS mode, the VA mode and so forth utilize homeotropic orientation of liquid crystal molecules, and it is known that in particular the IPS mode and the VA mode are able to improve a limited viewing angle that is a disadvantage of a conventional display mode such as the TN mode or the STN mode.

A variety of liquid crystal compounds in which hydrogen on the benzene ring had been replaced by fluorine have conventionally been studied as a component of a liquid crystal composition having negative dielectric anisotropy, which can be used for liquid crystal display devices having these operating modes.

For example, the compound (A), in which hydrogen on the benzene ring had been replaced by fluorine, has been studied (see Patent document No. 1). However, the compound has a small optical anisotropy. The compound (B) having alkenyl, in which hydrogen on the benzene ring had been replaced by fluorine, has been studied (see Patent document No. 2). However, the compound does not have a sufficiently large optical anisotropy.

The three-ring compound (C) having an ether-bonding group has been reported (see Patent document No. 3 and Non-patent document No. 1). The compound has a narrow temperature range of a liquid crystal phase (mesophase range), and a liquid crystal composition including the compound has a low maximum temperature of a nematic phase.

The four-ring compound (D) having an ethylene-bonding group has been reported (see Patent document No. 4). However, the compound does not have a sufficiently large negative dielectric anisotropy, and a liquid crystal composition including the compound has a low maximum temperature.

The four-ring compound (E) having an ether-bonding group and an ethylene-bonding group has been reported (see Patent document No. 5). However, a liquid crystal composition including the compound has a low maximum temperature.

The three-ring compound (F) having a butene-bonding group and an ester-bonding group has been reported (see Patent document No. 6). However, the compound does not have a sufficiently large negative dielectric anisotropy and has a large viscosity, and a liquid crystal composition including the compound has a low maximum temperature.

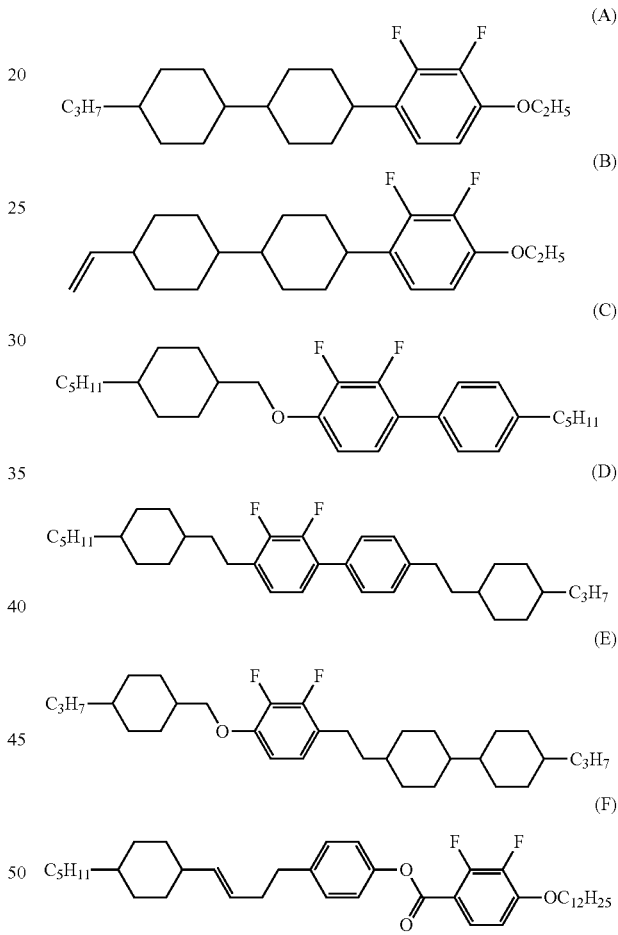

REFERENCES

Patent document No. 1: JP H02-503441 A (1990).

Patent document No. 2: JP 2000-053602 A.

Patent document No. 3: DE 3,906,058 A.

Patent document No. 4: WO 1989-008687 A.

Patent document No. 5: WO 1989-008689 A.

Patent document No. 6: JP H04-330019 A (1992).

Non-patent document No. 1: Liquid Crystals (1994), 16 (4), 625-641.

SUMMARY OF THE INVENTION

The invention concerns a compound represented by formula (1), and also concerns a liquid crystal composition including the compound and a liquid crystal display device containing the composition.

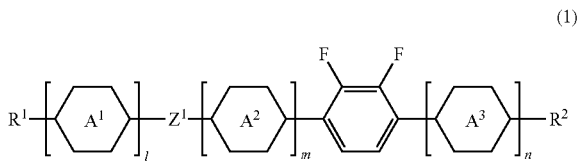

(1)

In formula (1),

R¹ and R² are each independently hydrogen, alkyl having 1 to 10 carbons, alkenyl having 2 to 10 carbons, alkoxy having 1 to 9 carbons, alkoxyalkyl having 2 to 9 carbons or alkenyloxy having 2 to 9 carbons;

the ring A¹, the ring A² and the ring A³ are each independently 1,4-cyclohexylene, 1,4-cyclohexenylene, 1,4-phenylene or 2,3-difluoro-1,4-phenylene;

at least one of the ring A² and the ring A³ is 1,4-cyclohexenylene when the ring A¹ is 1,4-cyclohexylene;

$Z^1$ is $—(CH_2)_2—CH=CH—$ or $—CH=CH—(CH_2)_2—$;

l is 1 or 2, m and n are each independently 0, 1 or 2, the sum of m and n is 1 or 2, and the sum of l, m and n is 2 or 3;

at least one of the ring A² and the ring A³ is 1,4-cyclohexylene or 1,4-cyclohexenylene when l and m are 1, n is 0, and the ring A¹ is 1,4-phenylene or 2,3-difluoro-1,4-phenylene; and any one of the two rings A¹ is 1,4-cyclohexylene or 1,4-cyclohexenylene when l is 2, m is 1, n is 0, the other of the two rings A¹ is 1,4-phenylene and the ring A² is 1,4-phenylene.

DETAILED DESCRIPTION OF THE INVENTION

There are still some subjects to be solved even in a liquid crystal display device having an operating mode such as an IPS mode or a VA mode in comparison with a CRT display, and, for example, an improvement of the response time, an improvement of the contrast and a decrease in the driving voltage are expected.

A liquid crystal composition having negative dielectric anisotropy is mainly used in a display device operated in the IPS mode or the VA mode. A liquid crystal compound included in this composition is required to have the following physical properties shown in the following items (1) to (8), in order to improve the characteristics of the display device.

(1) a high chemical stability and a high physical stability,
(2) a high clearing point (transition temperature between a liquid crystal phase and an isotropic phase),
(3) a low minimum temperature of a liquid crystal phase (a nematic phase, a smectic phase and so forth), especially of the nematic phase,
(4) a small viscosity,
(5) a suitable optical anisotropy,
(6) a large negative dielectric anisotropy,
(7) a suitable elastic constant $K_{33}$ ($K_{33}$: a bend elastic constant), and
(8) an excellent compatibility with other liquid crystal compounds.

A voltage holding ratio can be increased when a composition including a chemically and physically stable liquid crystal compound, as described in item (1), is used for a display device. The temperature range of a nematic phase can be increased in a composition that includes a compound having a high clearing point or a low minimum temperature of a liquid crystal phase as described in items (2) and (3), and thus the display device can be used in a wide temperature range.

When a composition that includes a compound having a small viscosity as described in item (4) is used for a display device, the response time can be improved. When a composition that includes a compound having a suitable optical anisotropy as described in item (5) is used for a display device, an improvement of the contrast of the display device can be expected. A device requires compositions having a small to large optical anisotropy, depending on the design of the device. Recently, a method for improving the response time by means of a decreased cell thickness has been studied, whereby a liquid crystal composition having a large optical anisotropy is also required.

When a liquid crystal compound has a large negative dielectric anisotropy, the threshold voltage of the liquid crystal composition including this compound can be decreased. Thus, the driving voltage of a display device can be decreased and the electric power consumption can also be decreased, when the display device contains a composition that includes a compound having a large negative dielectric anisotropy as described in item (6). With regard to item (7), the driving voltage of a display device can be decreased, and thus the electric power consumption can be decreased, when a display device contains a composition that includes a compound having a small elastic constant $K_{33}$. The response time can be improved, when a display device contains a composition that includes a compound having a large elastic constant $K_{33}$.

A liquid crystal compound is generally used in the form of a composition prepared by mixing it with many other liquid crystal compounds in order to exhibit physical properties that are difficult to be attained by a single compound. Accordingly, it is desirable that a liquid crystal compound used for a display device should have an excellent compatibility with other liquid crystal compounds, as described in item (8). Since the display device may also be used in a wide temperature range including a lower temperature than the freezing point, the compound that exhibits an excellent compatibility even at a low temperature is desirable.

The first advantage of the invention is to provide a liquid crystal compound having a high stability to heat, light or the like, a wide temperature range of a nematic phase, a small viscosity, a large optical anisotropy, a large elastic constant $K_{33}$, a large negative dielectric anisotropy and an excellent compatibility with other liquid crystal compounds.

The second advantage of the invention is to provide a liquid crystal composition including this compound and having a high stability to heat, light or the like, a small viscosity, a suitable optical anisotropy, a large negative dielectric anisotropy, a large elastic constant $K_{33}$, a low threshold voltage, a high maximum temperature of a nematic phase and a low minimum temperature of a nematic phase.

The third advantage of the invention is to provide a liquid crystal display device containing this composition and having a short response time, low electric power consumption, a low driving voltage, a large contrast and a wide temperature range in which the device can be used.

As a result of earnest studies in consideration of these subjects, the inventors have found that a 2,3-difluorobenzene derivative having a cyclohexane ring, a cyclohexene ring or a benzene ring, and having a butene-bonding group has a high stability to heat, light or the like, a wide temperature range of a nematic phase, a small viscosity, a suitable optical anisotropy, a large elastic constant $K_{33}$, a large negative dielectric anisotropy and an excellent compatibility with other liquid crystal compounds. The inventors have also found that a liquid crystal composition including the compound has a high stability to heat, light or the like, a small viscosity, a suitable optical anisotropy, a large elastic constant $K_{33}$, a suitable negative dielectric anisotropy, a low threshold voltage, a high maximum temperature of a nematic phase and a low minimum temperature of a nematic phase. The inventors have further found that a liquid crystal display device containing the composition has a short response time, low electric power consumption, a low driving voltage, a large contrast and a wide temperature range in which the device can be used. Thus, the inventors have completed the invention.

The invention includes the following items 1 to 13.

Item 1. A compound represented by formula (1).

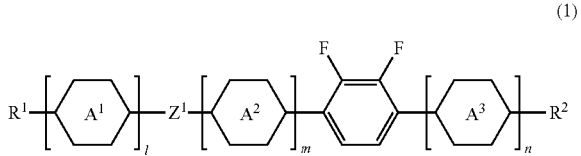
(1)

In formula (1),
$R^1$ and $R^2$ are each independently hydrogen, alkyl having 1 to 10 carbons, alkenyl having 2 to 10 carbons, alkoxy having 1 to 9 carbons, alkoxyalkyl having 2 to 9 carbons or alkenyloxy having 2 to 9 carbons;
the ring $A^1$, the ring $A^2$ and the ring $A^3$ are each independently 1,4-cyclohexylene, 1,4-cyclohexenylene, 1,4-phenylene or 2,3-difluoro-1,4-phenylene;
at least one of the ring $A^2$ and the ring $A^3$ is 1,4-cyclohexenylene when the ring $A^1$ is 1,4-cyclohexylene;
$Z^1$ is —$(CH_2)_2$—CH=CH— or —CH=CH—$(CH_2)_2$—;
l is 1 or 2, m and n are each independently 0, 1 or 2, the sum of m and n is 1 or 2, and the sum of l, m and n is 2 or 3;
at least one of the ring $A^2$ and the ring $A^3$ is 1,4-cyclohexylene or 1,4-cyclohexenylene when l and m are 1, n is 0, and the ring $A^1$ is 1,4-phenylene or 2,3-difluoro-1,4-phenylene; and
any one of the two rings $A^1$ is 1,4-cyclohexylene or 1,4-cyclohexenylene when l is 2, m is 1, n is 0, the other of the two rings $A^1$ is 1,4-phenylene, and the ring $A^2$ is 1,4-phenylene.

Item 2. The compound according to item 1, wherein the compound is represented by formula (1-1) or (1-2).

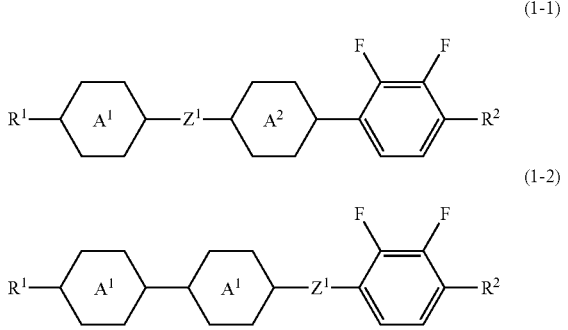

In formulas (1-1) and (1-2),
$R^1$ and $R^2$ are each independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons;
the ring $A^1$ and the ring $A^2$ are each independently 1,4-cyclohexylene, 1,4-cyclohexenylene, 1,4-phenylene or 2,3-difluoro-1,4-phenylene;
$Z^1$ is —$(CH_2)_2$—CH=CH— or —CH=CH—$(CH_2)_2$—;
in formula (1-1), when any one of the ring $A^1$ and the ring $A^2$ is 1,4-phenylene, the other is 1,4-cyclohexylene or 1,4-cyclohexenylene; and
in formula (1-2), when any one of the two rings $A^1$ is 1,4-phenylene, the other is 1,4-cyclohexylene or 1,4-cyclohexenylene.

Item 3. The compound according to item 2, wherein the compound is represented by any one of formulas (1-1-1), (1-1-2) and (1-2-2).

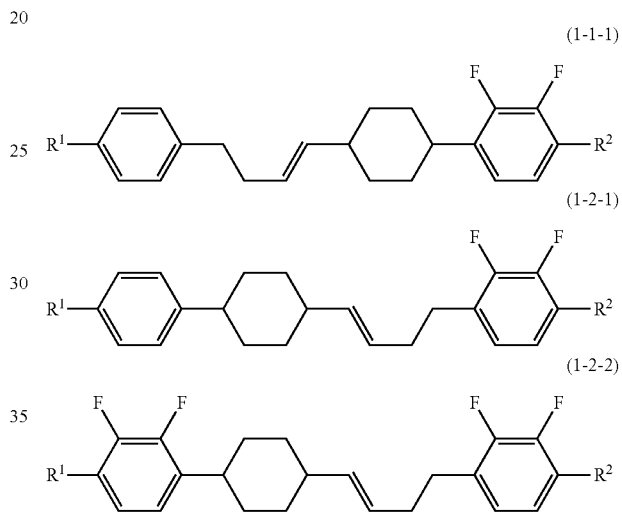

In formulas (1-1-1), (1-1-2) and (1-2-2),
$R^1$ and $R^2$ are each independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons.

Item 4. The compound according to item 1, wherein the compound is represented by formula (1-3) or (1-4).

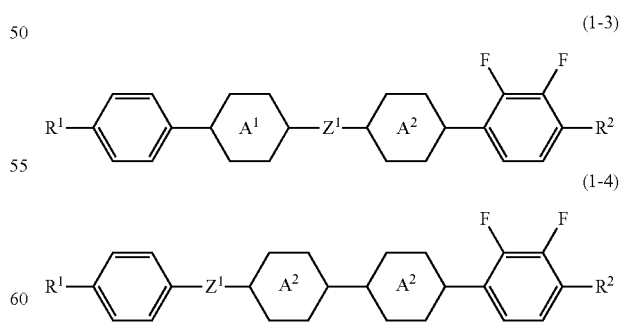

In formulas (1-3) and (1-4),
$R^1$ and $R^2$ are each independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons;

the ring $A^1$ and the ring $A^2$ are each independently 1,4-cyclohexylene, 1,4-cyclohexenylene or 1,4-phenylene;

$Z^1$ is —$(CH_2)_2$—CH=CH— or —CH=CH—$(CH_2)_2$—;

in formula (1-3), when any one of the ring $A^1$ and the ring $A^2$ is 1,4-phenylene, the other is 1,4-cyclohexylene or 1,4-cyclohexenylene; and in formula (1-4), when any one of the two rings $A^2$ is 1,4-phenylene, the other is 1,4-cyclohexylene or 1,4-cyclohexenylene.

Item 5. The compound according to item 4, wherein the compound is represented by any one of formulas (1-3-1) to (1-3-3) and formulas (1-4-1) to (1-4-3).

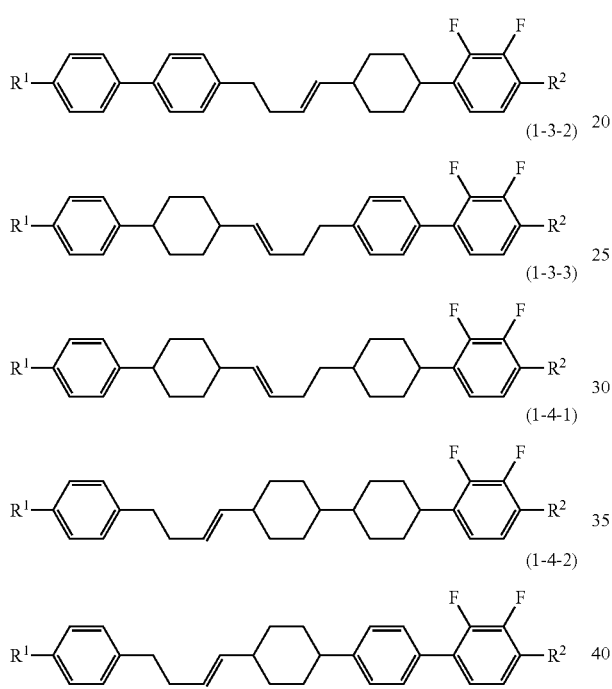

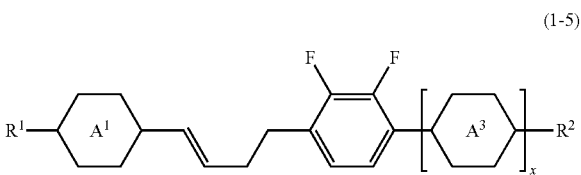

In formulas (1-3-1) to (1-3-3) and formulas (1-4-1) to (1-4-3), $R^1$ and $R^2$ are each independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons.

Item 6. The compound according to item 1, wherein the compound is represented by formula (1-5).

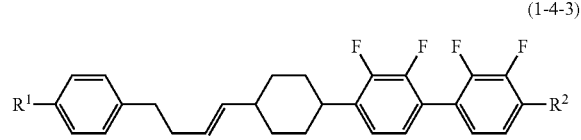

In formula (1-5), $R^1$ and $R^2$ are each independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons;

the ring $A^1$ is 1,4-cyclohexylene or 1,4-cyclohexenylene, and the ring $A^3$ is 1,4-cyclohexylene, 1,4-cyclohexenylene or 1,4-phenylene;

the ring $A^3$ is 1,4-cyclohexenylene when the ring $A^1$ is 1,4-cyclohexylene; and x is 1 or 2.

Item 7. A liquid crystal composition including at least one of compounds according to any one of items 1 to 6.

Item 8. The liquid crystal composition according to item 7, further including at least one compound selected from the group of compounds represented by formulas (2), (3), (4), (5), (6) and (7).

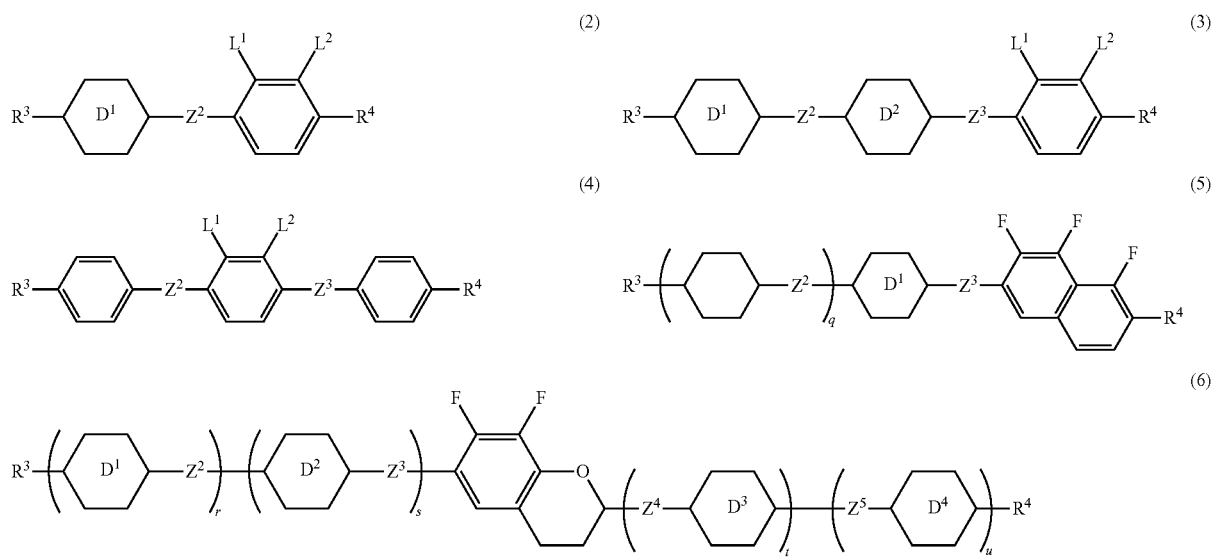

(7)

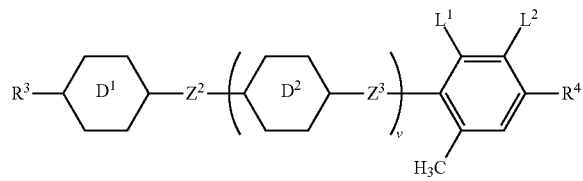

In formulas (2) to (7), $R^3$ and $R^4$ are each independently alkyl having 1 to 10 carbons or alkenyl having 2 to 10 carbons, and in the alkyl and the alkenyl, arbitrary hydrogen may be replaced by fluorine and arbitrary —$CH_2$— may be replaced by —O—;

the ring $D^1$, the ring $D^2$, the ring $D^3$ and the ring $D^4$ are each independently 1,4-cyclohexylene, 1,4-cyclohexenylene, 1,4-phenylene in which arbitrary hydrogen may be replaced by fluorine, tetrahydropyran-2,5-diyl or decahydro-2,6-naphthalene;

$Z^2$, $Z^3$, $Z^4$ and $Z^5$ are each independently —$(CH_2)_2$—, —COO—, —$CH_2O$—, —$OCF_2$—, —$OCF_2(CH_2)_2$— or a single bond;

$L^1$ and $L^2$ are each independently fluorine or chlorine; and q, r, s, t, u and v are each independently 0 or 1, and the sum of r, s, t and u is 1 or 2.

Item 9. The liquid crystal composition according to item 7, further including at least one compound selected from the group of compounds represented by formulas (8), (9) and (10).

(8)

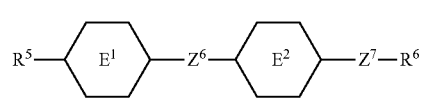

(9)

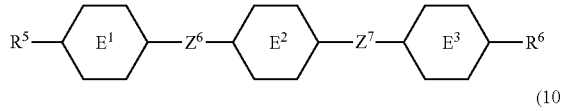

(10)

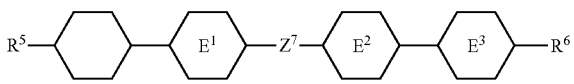

In formulas (8) to (10), $R^5$ and $R^6$ are each independently alkyl having 1 to 10 carbons or alkenyl having 2 to 10 carbons, and in the alkyl and the alkenyl, arbitrary —$CH_2$— may be replaced by —O—;

the ring $E^1$, the ring $E^2$ and the ring $E^3$ are each independently 1,4-cyclohexylene, pyrimidine-2,5-diyl, 1,4-phenylene, 2-fluoro-1,4-phenylene, 3-fluoro-1,4-phenylene or 2,5-difluoro-1,4-phenylene; and $Z^6$ and $Z^7$ are each independently —C≡C—, —COO—, —$(CH_2)_2$—, —CH=CH— or a single bond.

Item 10. The liquid crystal composition according to item 8, further including at least one compound selected from the group of compounds represented by formulas (8), (9) and (10) according to item 9.

Item 11. The liquid crystal composition according to any one of items 7 to 10, further including at least one optically active compound and/or at least one polymerizable compound.

Item 12. The liquid crystal composition according to any one of items 7 to 11, further including at least one antioxidant and/or at least one ultraviolet light absorber.

Item 13. A liquid crystal display device containing the liquid crystal composition according to any one of items 7 to 12.

Usage of the terms in this specification is as follows. A liquid crystal compound is a generic term for a compound having a liquid crystal phase such as a nematic phase or a smectic phase, and also for a compound having no liquid crystal phases but useful as a component of a liquid crystal composition. The terms, a liquid crystal compound, a liquid crystal composition and a liquid crystal display device may be abbreviated to a compound, a composition and a device, respectively. A liquid crystal display device is a generic term for a liquid crystal display panel and a liquid crystal display module. A clearing point is the transition temperature between a liquid crystal phase and an isotropic phase in a liquid crystal compound. The maximum temperature of a nematic phase is the phase transition temperature between a nematic phase and an isotropic phase in a liquid crystal composition, and may be abbreviated to the maximum temperature. The minimum temperature of a nematic phase may be abbreviated to the minimum temperature. A compound represented by formula (1) may be abbreviated to the compound (1). This abbreviation may apply to a compound represented by formula (2) or the like. In formulas (1) to (10), the symbols D, E or the like surrounded by a hexagonal shape correspond to the ring D, the ring E or the like, respectively. The amount of a compound, which is expressed as a percentage, means a weight percentage (% by weight) based on the total weight of the composition. Symbols such as $R^1$, the ring $A^1$ and $Z^1$ were described in the same or different formulas. Two groups represented by arbitrary two of $R^1$ may be the same or different in these compounds. The same rule applies to symbols such as the ring $A^1$ and $Z^1$.

"Arbitrary" means that not only the position of an element (or a functional group) but also its number can be selected without restriction. The expression "arbitrary A may be replaced by B, C or D" includes cases where arbitrary A is replaced by B, and arbitrary A is replaced by C, and arbitrary A is replaced by D, and also cases where a plurality of A are replaced by at least two of B, C and/or D. For example, "alkyl in which arbitrary —$CH_2$— may be replaced by —O— or —CH=CH—" includes alkyl, alkenyl, alkoxy, alkoxyalkyl, alkoxyalkenyl and alkenyloxyalkyl. Incidentally, it is undesirable that two successive —$CH_2$— should be replaced by —O— to give —O—O—. It is also undesirable that —$CH_2$— of a terminal methyl group (—$CH_2$—H) should be replaced by —O— to give —O—H.

The liquid crystal compound of the invention has a high stability to heat, light or the like, a wide temperature range of a nematic phase, a small viscosity, a large optical anisotropy, a suitable elastic constant $K_{33}$ ($K_{33}$: bend elastic constant), a large negative dielectric anisotropy and an excellent compatibility with other liquid crystal compounds. The liquid crystal compound is particularly excellent in view of the fact that the optical anisotropy has a tendency to increase without a decrease in the maximum temperature of a nematic phase and without an increase in the viscosity.

The liquid crystal composition of the invention has a small viscosity, a large optical anisotropy, a suitable elastic constant $K_{33}$, a large negative dielectric anisotropy, a low threshold voltage, a high maximum temperature of a nematic phase and a low minimum temperature of a nematic phase. The liquid crystal composition is effective in a display device that requires a large optical anisotropy, since it has a large optical anisotropy.

The liquid crystal display device of the invention has a short response time, low electric power consumption, a low driving voltage, a large contrast ratio, a wide temperature range in which the device can be used. Thus, the liquid crystal display device can be used preferably for a display mode such as an IPS mode, a VA mode or a PSA mode.

The compound, the liquid crystal composition and the liquid crystal display device of the invention will be explained in more detail.

The Compound (1)

The compound of the invention has the structure represented by formula (1). The terminal group, the ring structure and the bonding group of the compound (1) will be explained first.

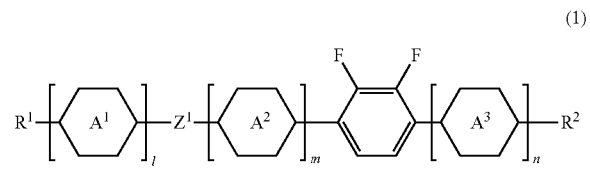

(1)

In formula (1), $R^1$ and $R^2$ are each independently hydrogen, alkyl having 1 to 10 carbons, alkenyl having 2 to 10 carbons, alkoxy having 1 to 9 carbons, alkoxyalkyl having 2 to 9 carbons or alkenyloxy having 2 to 9 carbons.

Desirable $R^1$ or $R^2$ is alkyl, alkoxy, alkoxyalkyl or alkenyl, and more desirable $R^1$ or $R^2$ is alkyl, alkoxy or alkenyl. When $R^1$ and $R^2$ are alkyl, alkoxy or alkenyl, the temperature range of a liquid crystal phase of the compound can be increased.

Specific examples of the alkyl include —$CH_3$, —$C_2H_5$, —$C_3H_7$, —$C_4H_9$, —$C_5H_{11}$, —$C_6H_{13}$ and —$C_7H_{15}$. Specific examples of the alkoxy include —$OCH_3$, —$OC_2H_5$, —$OC_3H_7$, —$OC_4H_9$, —$OC_5H_{11}$ and —$OC_6H_{13}$. Specific examples of the alkoxyalkyl include —$CH_2OCH_3$, —$CH_2OC_2H_5$, —$CH_2OC_3H_7$, —$(CH_2)_2OCH_3$, —$(CH_2)_2OC_2H_5$, —$(CH_2)_2OC_3H_7$, —$(CH_2)_3OCH_3$, —$(CH_2)_4OCH_3$ and —$(CH_2)_5OCH_3$. Specific examples of the alkenyl include —$CH=CH_2$, —$CH=CHCH_3$, —$CH_2CH=CH_2$, —$CH=CHC_2H_5$, —$CH_2CH=CHCH_3$, —$(CH_2)_2CH=CH_2$, —$CH\_CHC_3H_7$, —$CH_2CH=CHC_2H_5$, $(CH_2)_2CH=CHCH_3$ and —$(CH_2)_3CH=CH_2$. Specific examples of the alkenyloxy include —$OCH_2CH=CH_2$, —$OCH_2CH=CHCH_3$ and —$OCH_2CH=CHC_2H_5$.

In these specific examples, desirable $R^1$ and $R^2$ are —$CH_3$, —$C_2H_5$, —$C_3H_7$, —$C_4H_9$, —$O_5H_{11}$, —$OCH_3$, —$OC_2H_5$, —$OC_3H_7$, —$OC_4H_9$, —$OC_5H_{11}$, —$CH_2OCH_3$, —$(CH_2)_2OCH_3$, —$(CH_2)_3OCH_3$, —$CH_2CH=CH_2$, —$CH_2CH=CHCH_3$, —$(CH_2)_2CH=CH_2$, —$CH_2CH=CHC_2H_5$, —$(CH_2)_2CH=CHCH_3$, —$(CH_2)_3CH=CH_2$, —$(CH_2)_3CH=CHCH_3$, —$(CH_2)_3CH=CHC_2H_5$, —$(CH_2)_3CH=CHC_3H_7$, —$OCH_2CH=CH_2$, —$OCH_2CH=CHCH_3$ and —$OCH_2CH=CHC_2H_5$. More desirable $R^1$ and $R^2$ are —$CH_3$, —$C_2H_5$, —$C_3H_2$, —$OCH_3$, —$OC_2H_5$, —$OC_3H_2$, —$OC_4H_2$, —$(CH_2)_2CH=CH_2$, —$(CH_2)_2CH=CHCH_3$ and —$(CH_2)_2CH=CHC_3H_7$.

It is desirable that the chain of carbon-carbon bonds in these groups should be straight. When the chain of carbon-carbon bonds is straight, the temperature ranges of a liquid crystal phase can be increased and the viscosity can be decreased. When any one of $R^1$ and $R^2$ is an optically active group, the compound is useful as a chiral dopant. A reverse twisted domain which will occur in a liquid crystal display device can be prevented by the addition of the compound to a liquid crystal composition.

A desirable configuration of —CH=CH— in alkenyl depends on the position of the double bond. A trans-configuration is desirable for the configuration of alkenyl having a double bond in the odd position, such as —CH=CHCH₃, —CH=CHC₂H₅, —CH=CHC₃H₇, —CH=CHC₄H₉, —C₂H₄CH=CHCH₃ or —C₂H₄CH=CHC₂H₅.

On the other hand, a cis-configuration is desirable for the configuration of alkenyl having a double bond in the even position, such as —CH₂CH=CHCH₃, —CH₂CH=CHC₂H₅ and —CH₂CH=CHC₃H₇. An alkenyl compound possessing a desirable configuration has a wide temperature range of a liquid crystal phase, a large elastic constant ratio $K_{33}/K_{11}$ ($K_{33}$: a bend elastic constant, $K_{22}$: a splay elastic constant), and a small viscosity. When this compound is added to a liquid crystal composition, the maximum temperature can be increased.

In formula (1),
the ring $A^1$, the ring $A^2$ and the ring $A^3$ are each independently 1,4-cyclohexylene, 1,4-cyclohexenylene, 1,4-phenylene or 2,3-difluoro-1,4-phenylene;
at least one of the ring $A^2$ and the ring $A^3$ is 1,4-cyclohexenylene when the ring $A^1$ is 1,4-cyclohexylene;
at least one of the ring $A^2$ and the ring $A^3$ is 1,4-cyclohexylene or 1,4-cyclohexenylene when l and m are 1, n is 0, and the ring $A^1$ is 1,4-phenylene or 2,3-difluoro-1,4-phenylene; and
any one of the two rings $A^1$ is 1,4-cyclohexylene or 1,4-cyclohexenylene when l is 2, m is 1, n is 0, the other of the two rings $A^1$ is 1,4-phenylene, and the ring $A^2$ is 1,4-phenylene.

In these rings, 1,4-phenylene and 1,4-cyclohexylene are more desirable. The most desirable combination is that the ring $A^1$ is 1,4-phenylene and the ring $A^2$ is 1,4-cyclohexylene.

When at least one of these rings is 1,4-cyclohexylene, the viscosity can be decreased. When the compound is added to a liquid crystal composition, the maximum temperature can be increased.

When at least one of these rings is 2,3-difluoro-1,4-phenylene, the dielectric anisotropy can be increased negatively. When the compound is added to a liquid crystal composition, the optical anisotropy can be increased.

In the ring bonded to —CH=CH— of $Z^1$, 1,4-cyclohexylene and 1,4-cyclohexenylene are desirable, and 1,4-cyclohexylene is more desirable in consideration of the stability of the compound.

In the 1,4-cyclohexylene, there are two configurations of cis-1,4-cyclohexylene and trans-1,4-cyclohexylene. The trans-1,4-cyclohexylene is desirable in view of an increase in the maximum temperature, when added to a liquid crystal composition.

In formula (1), $Z^1$ is —$(CH_2)_2$—CH=CH— or —CH=CH—$(CH_2)_2$—. The viscosity of the compound can be decreased and the clearing point can be increased, since $Z^1$ is —$(CH_2)_2$—CH=CH— or —CH=CH—$(CH_2)_2$—.

In formula (1), l is 1 or 2, m and n are 0, 1 or 2, the sum of m and n is 1 or 2, and the sum of l, m and n is 2 or 3.

The compound (1) has 1,4-phenylene in which hydrogens in the 2- and 3-positions are replaced by fluorines. The compound (1) has a suitable optical anisotropy, a suitable elastic constant $K_{33}$, a large negative dielectric anisotropy because of the effect of this kind of structure. The compound (1) has an excellent compatibility with other liquid crystal compounds, a large elastic constant, a small viscosity, since the bonding group is —$(CH_2)_2$—CH═CH— or —CH═CH—$(CH_2)_2$—. The compound (1) is particularly excellent in view of an excellent compatibility with other liquid crystal compounds and a low viscosity without a decrease in the maximum temperature of a nematic phase.

As is described above, in the compound (1), it is possible to adjust physical properties, such as dielectric anisotropy, to desired values by suitably selecting $R^1$, $R^2$, the ring $A^1$, the ring $A^2$, the ring $A^3$ and $Z^1$. The compound (1) may also contain isotopes such as $^2H$ (deuterium) and $^{13}C$ in a larger amount than the amount of the natural abundance, since there are no major differences in physical properties of the compound.

Desirable examples of the compound (1) include the compounds (1-1) and (1-2), the compound (1-3) and (1-4) and the compound (1-5). The compounds (1-1) to (1-5) will be explained in due order. In these compounds, desirable examples of $R^1$, $R^2$, the ring $A^1$, the ring $A^2$ and the ring $A^3$ are the same with those of the compound (1). The compounds (1-1) and (1-2) are as follows.

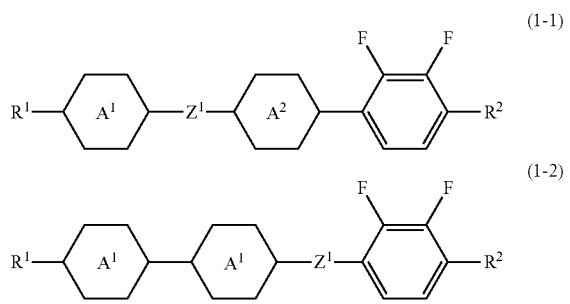

In formulas (1-1) and (1-2), $R^1$ and $R^2$ are each independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons;

the ring $A^1$ and the ring $A^2$ are each independently 1,4-cyclohexylene, 1,4-cyclohexenylene, 1,4-phenylene or 2,3-difluoro-1,4-phenylene;

the ring $A^2$ is 1,4-cyclohexenylene when the ring $A^1$ is 1,4-cyclohexylene;

$Z^1$ is —$(CH_2)_2$—CH═CH— or —CH═CH—$(CH_2)_2$—;

in formula (1-1), when any one of the ring $A^1$ and the ring $A^2$ is 1,4-phenylene, the other is 1,4-cyclohexylene or 1,4-cyclohexenylene; and in formula (1-2), when any one of the two rings $A^1$ is 1,4-phenylene, the other is 1,4-cyclohexylene or 1,4-cyclohexenylene.

Desirable examples of the compounds (1-1) and (1-2) include the compounds (1-1-1), (1-2-1) and (1-2-2).

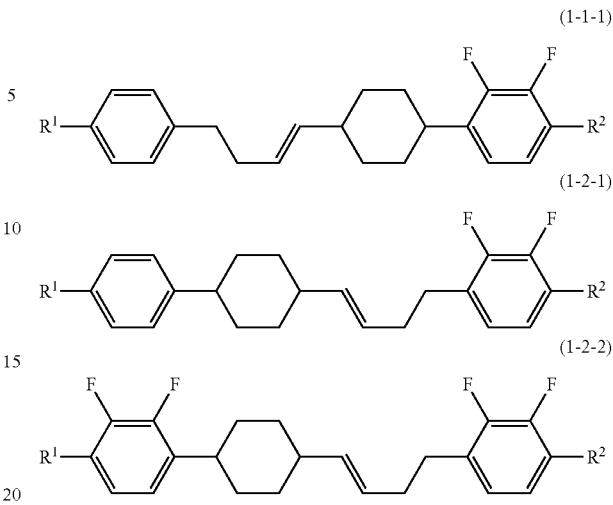

In formulas (1-1-1), (1-2-1) and (1-2-2), $R^1$ and $R^2$ are each independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons.

The compounds (1-1), (1-2), (1-1-1), (1-2-1) and (1-2-2) are asymmetric, since they have —$(CH_2)_2$—CH═CH— or —CH═CH—$(CH_2)_2$—. Furthermore, three rings selected from 2,3-difluoro-1,4-phenylene, 1,4-cyclohexylene, 1,4-cyclohexenylene and 1,4-phenylene are arranged in an asymmetric manner. Accordingly, these compounds are more desirable in view of a high stability to heat, light or the like, a lower minimum temperature of a liquid crystal phase, a higher clearing point, a large elastic constant $K_{33}$ and a small viscosity.

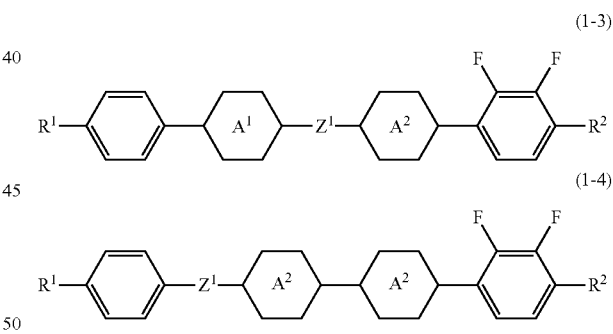

In formulas (1-3) and (1-4), $R^1$ and $R^2$ are each independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons;

the ring $A^1$ and the ring $A^2$ are each independently 1,4-cyclohexylene, 1,4-cyclohexenylene or 1,4-phenylene;

$Z^1$ is —$(CH_2)_2$—CH═CH— or —CH═CH—$(CH_2)_2$—;

in formula (1-1), when any one of the ring $A^1$ and the ring $A^2$ is 1,4-phenylene, the other is 1,4-cyclohexylene or 1,4-cyclohexenylene; and in formula (1-2), when any one of the two rings $A^1$ is 1,4-phenylene, the other is 1,4-cyclohexylene or 1,4-cyclohexenylene.

Desirable examples of the compounds (1-3) and (1-4) include the compounds (1-3-1) to (1-3-3) and the compounds (1-4-1) to (1-4-3).

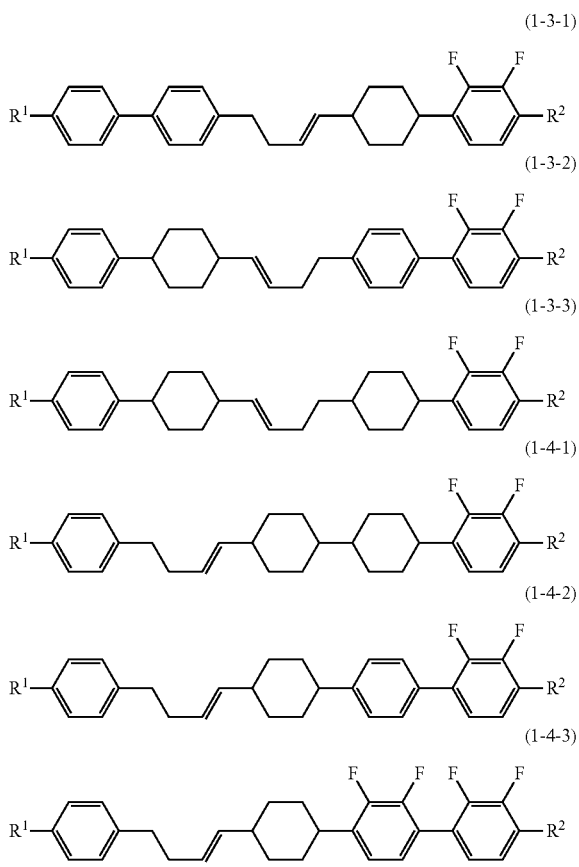

In the compounds (1-3-1) to (1-3-3) and the compounds (1-4-1) to (1-4-3), $R^1$ and $R^2$ are each independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons.

The compounds (1-3) and (1-4), the compounds (1-3-1) to (1-3-3) and the compounds (1-4-1) to (1-4-3) are asymmetric, since they have —(CH$_2$)$_2$—CH=CH— or —CH=CH—(CH$_2$)$_2$—. Furthermore, four rings selected from 2,3-difluoro-1,4-phenylene, 1,4-cyclohexylene, 1,4-cyclohexenylene and 1,4-phenylene are arranged in an asymmetric manner. Accordingly, these compounds are more desirable in view of a high stability to heat, light or the like, a lower minimum temperature of a liquid crystal phase, a higher clearing point, a suitable optical anisotropy, a large elastic constant $K_{33}$ and a small viscosity.

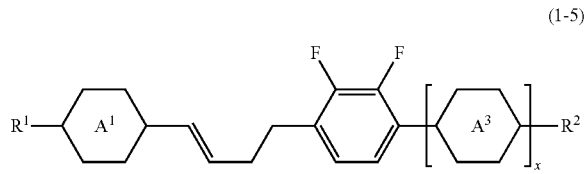

In formula (1-5), $R^1$ and $R^2$ are each independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons;
the ring $A^1$ is 1,4-cyclohexylene or 1,4-cyclohexenylene, and the ring $A^3$ is 1,4-cyclohexylene, 1,4-cyclohexenylene or 1,4-phenylene;
the ring $A^3$ is 1,4-cyclohexenylene when the ring $A^1$ is 1,4-cyclohexylene; and
x is 1 or 2.

The compound (1-5) is asymmetric, since it has —CH=CH—(CH$_2$)$_2$—. Furthermore, three or four rings selected from 2,3-difluoro-1,4-phenylene, 1,4-cyclohexylene, 1,4-cyclohexenylene and 1,4-phenylene are arranged in an asymmetric manner. Accordingly, these compounds are more desirable in view of a high stability to heat, light or the like, a lower minimum temperature of a liquid crystal phase, a suitable optical anisotropy, a large elastic constant $K_{33}$ and a small viscosity.

As is described above, the compound (1) has a suitable negative dielectric anisotropy and an excellent compatibility with other liquid crystal compounds. It also has a high stability to heat, light or the like, a small viscosity, a large optical anisotropy and a large elastic constant $K_{33}$. A liquid crystal composition including this compound is stable under conditions in which a liquid crystal display device is usually used, and this compound does not deposit its crystals (or its smectic phase) even when the composition is kept in storage at a low temperature. Accordingly, the compound (1) can suitably utilized for a liquid crystal composition that is used for a liquid crystal display device having a driving mode such as IPS, VA or PSA.

Preparation of the Compound (1)

The compound (1) can be prepared by a suitable combination of methods in synthetic organic chemistry. Methods of introducing objective terminal groups, rings and bonding groups into starting materials are described in books such as "Organic Syntheses" (John Wiley & Sons, Inc.), "Organic Reactions" (John Wiley & Sons, Inc.), "Comprehensive Organic Synthesis" (Pergamon Press) and "Shin Jikken Kagaku Kouza" (New Experimental Chemistry Course, in English; Maruzen Co., Ltd., Japan).

Formation of the Bonding Group $Z^1$

A method for forming the bonding group $Z^1$ is shown in the schemes below. In the schemes, MSG$^1$ or MSG$^2$ is a monovalent organic group. Monovalent organic groups represented by a plurality of the MSG$^1$ (or MSG$^2$) may be the same or different. The compound (1A) corresponds to the compound (1).

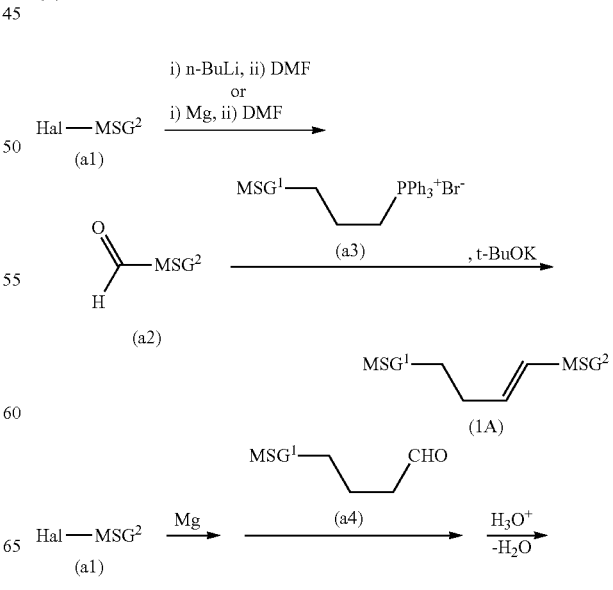

-continued

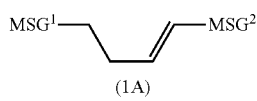

Hal = Br, I

Formation of —(CH$_2$)$_2$—CH=CH— and —CH=CH—(CH$_2$)$_2$—

Dehydration of the alcohol derivative in the presence of an acid such as p-toluenesulfonic acid gives the compound (1A).

Formation of the ring A$^1$, the ring A$^2$ or the ring A$^3$

Starting materials are commercially available, or methods are well known for the preparation of rings, such as 1,4-cyclohexylene, 1,4-cyclohexenylene, 1,4-phenylene or 2,3-difluoro-1,4-phenylene.

Examples of the preparation for the compound (1) will be shown.

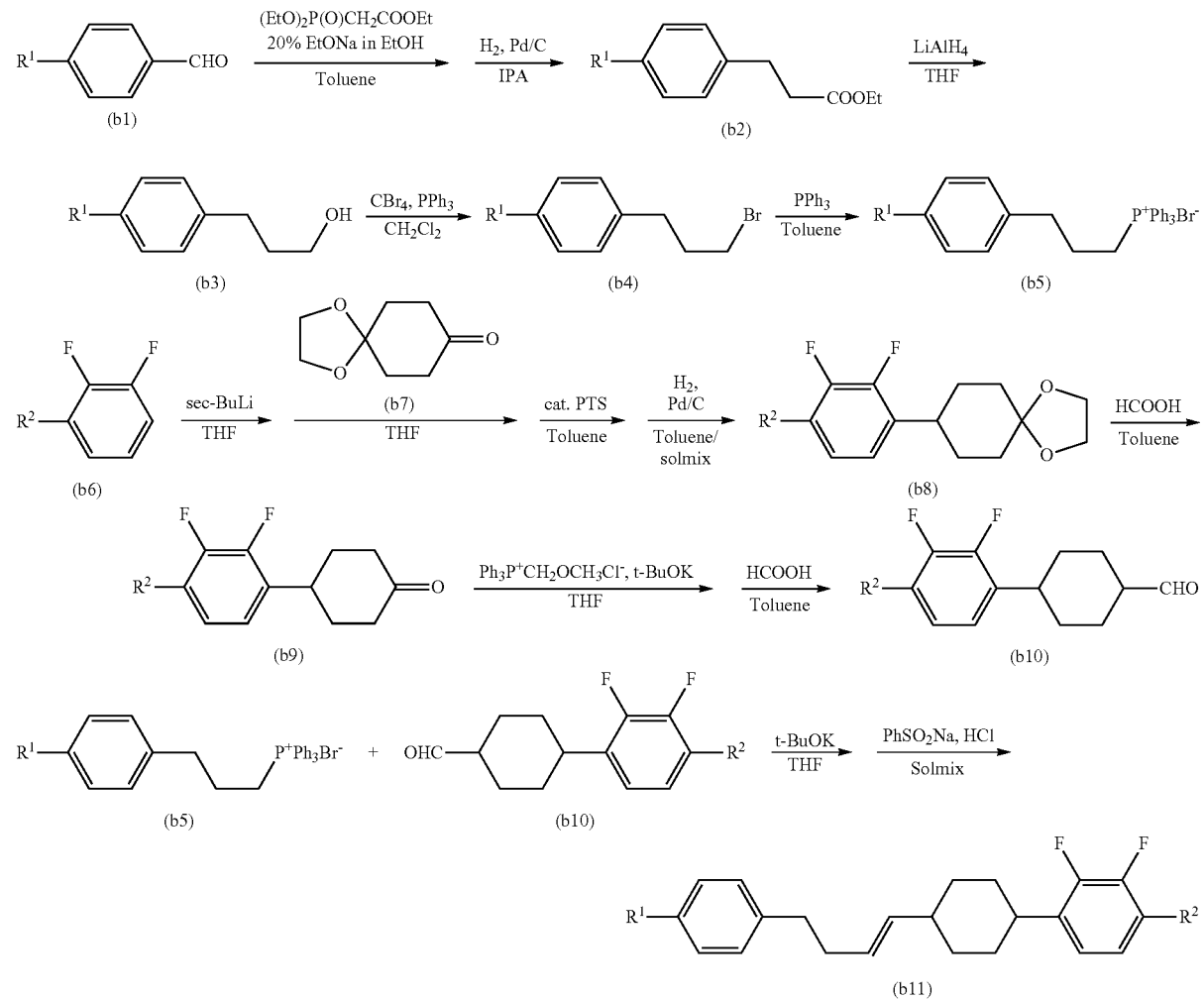

The organohalogen compound (a1) is treated with butyllithium, or magnesium to give an intermediate, which is allowed to react with formamide such as N,N-dimethylformamide (DMF) to give the aldehyde derivative (a2). The aldehyde (a2) is allowed to react with phosphine ylide, which is formed by the treatment of the phosphonium salt (a3) with a base such as potassium t-butoxide, giving the compound (1A). In this reaction, the cis-isomer may also be formed depending on the reaction conditions, and the cis-isomer is isomerized to the trans-isomer according to known methods.

Another method is as follows. The organohalogen compound (a1) is allowed to react with magnesium to give a Grignard reagent. The Grignard reagent is allowed to react with the aldehyde derivative (a4) to give an alcohol derivative.

The aldehyde (b1) is allowed to react with ethyl diethylphosphonoacetate in the presence of sodium ethoxide, and the product is hydrogenated in the presence of a catalyst such as Pd/C to give the compound (b2). Reduction of the compound (b2) with lithium aluminum hydride or the like gives the compound (b3). Bromination of the compound (b3) by using carbon tetrabromide and triphenylphosphine gives the compound (b4). The compound (b4) is allowed to react with triphenylphosphine to give the compound (b5).

In a separate run, the difluorobenzene derivative (b6) is allowed to react with sec-BuLi to give a lithium salt. The reaction of the lithium salt with the carbonyl derivative (b7) gives an alcohol derivative, which is dehydrated in the presence of an acid catalyst such as p-toluenesulfonic acid. The product is hydrogenated in the presence of a catalyst such as Pd/C to give the compound (b8). The compound (b8) is allowed to react with formic acid or the like to give the carbonyl derivative (b9). The Wittig reaction of the carbonyl derivative (b9) with a phosphine ylide that is prepared from methoxymethyltriphenylphosphonium chloride and a base such as potassium t-butoxide (t-BuOK) gives an intermediate, which is further reacted with formic acid to give the aldehyde derivative (b10).

The Wittig reaction of the aldehyde derivative (b10) with a phosphine ylide that is prepared from the compound (b5) obtained previously and abase such as potassium t-butoxide (t-BuOK), followed by the isomerization in the presence of sodium benzenesulfonate and hydrochloric acid gives the compound (b11), which is one example of the compound (1) of the invention.

The Composition (1)

The liquid crystal composition (1) of the invention will be explained. The composition (1) includes at least one of the compound (1) as a component. The composition (1) may include two or more of the compound (1), or the component of the liquid crystal compounds may be the compound (1) alone. It is desirable that the composition (1) should include at least one of the compound (1) in the range of 1% to 99% by weight in order to exhibit an excellent characteristics. More desirable ratio is in the range of 5% to 60% by weight. The composition (1) may include the compound (1) and a variety of liquid crystal compounds that are not described in this specification. A desirable composition includes a compound selected from the component D and component E, which will be shown below. When the composition (1) is prepared, the component can be selected in consideration of, for example, the dielectric anisotropy of the compound (1). The composition in which the component is suitably selected has a small viscosity, a large negative dielectric anisotropy, a suitable elastic constant $K_{33}$, a low threshold voltage, a high maximum temperature of a nematic phase and a low minimum temperature of a nematic phase.

The component D is the compounds (2), (3), (4), (5), (6) and (7). The component D is desirable in the preparation of a composition having negative dielectric anisotropy for use in a VA mode (a vertical alignment mode), a PSA mode (a polymer sustained alignment mode) or the like. The component E is the compounds (8), (9) and (10). The threshold voltage, the temperature range of a liquid crystal phase, the optical anisotropy, the dielectric anisotropy, the viscosity and so forth of a composition can be adjusted by the addition of the component E.

Suitable examples of the compounds (2) to (7), the component D, include the compounds (2-1) to (2-6), the compounds (3-1) to (3-15), the compounds (4-1), the compounds (5-1) to (5-3), the compounds (6-1) to (6-11) and the compounds (7-1) to (7-10).

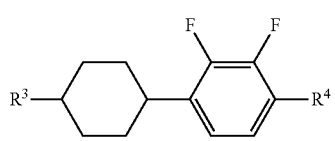
(2-1)

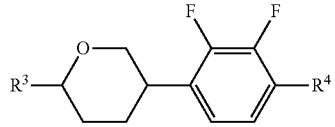
(2-2)

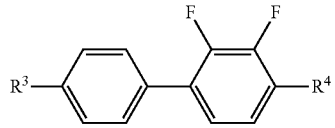
(2-3)

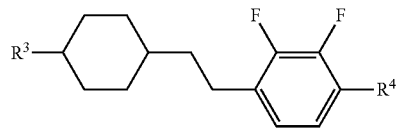
(2-4)

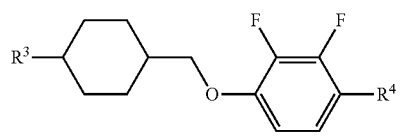
(2-5)

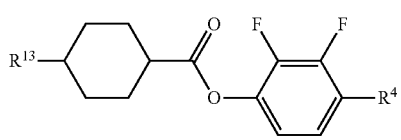
(2-6)

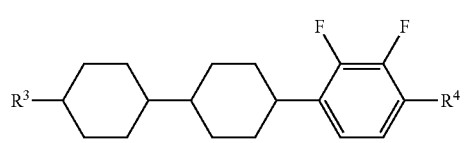
(3-1)

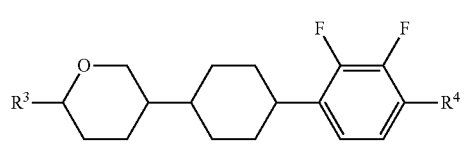
(3-2)

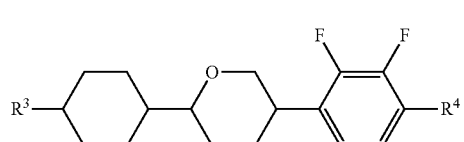
(3-3)

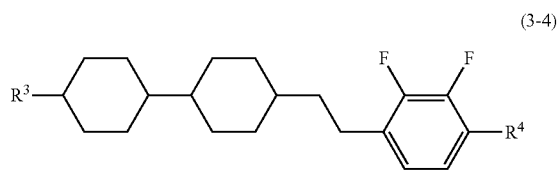
(3-4)

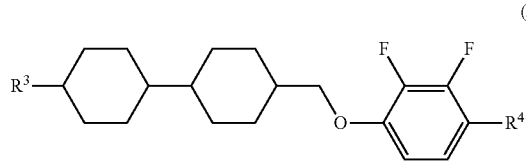
(3-5)

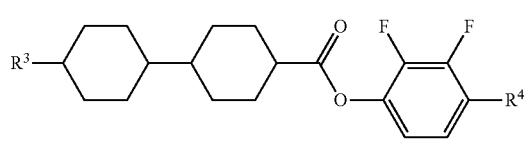
(3-6)

(3-7) 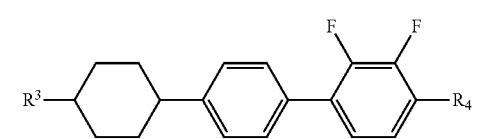
(3-8) 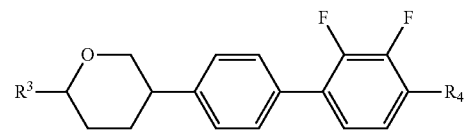
(3-9) 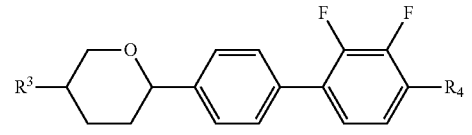
(3-10) 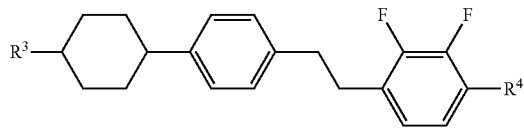
(3-11) 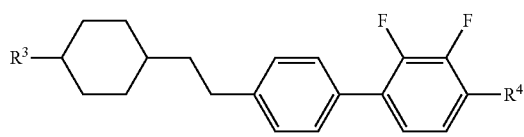
(3-12) 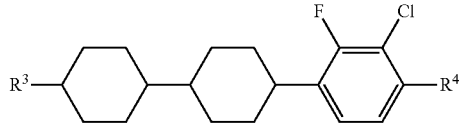
(3-13) 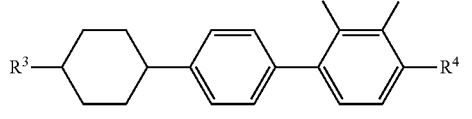
(3-14) 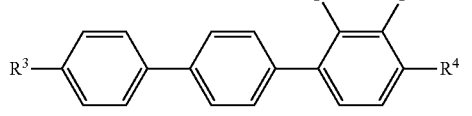
(3-15) 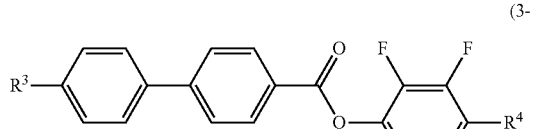
(4-1) 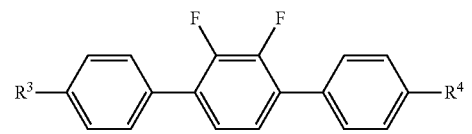
(5-1) 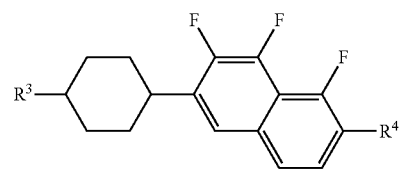
(5-2) 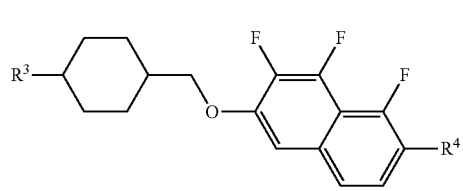
(5-3) 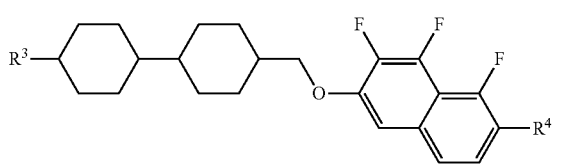
(6-1) 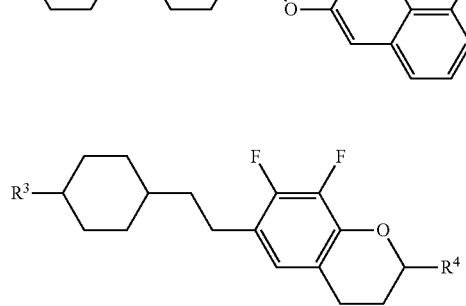
(6-2) 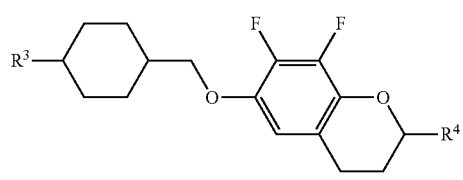
(6-3) 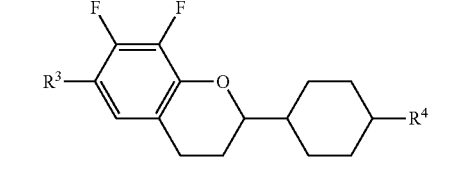
(6-4) 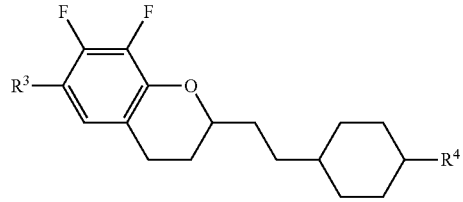
(6-5) 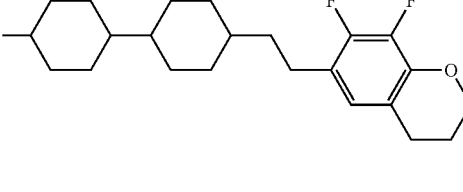
(6-6) 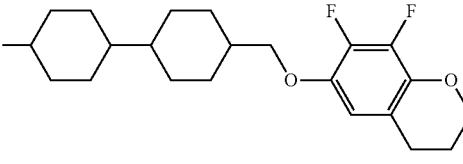

-continued

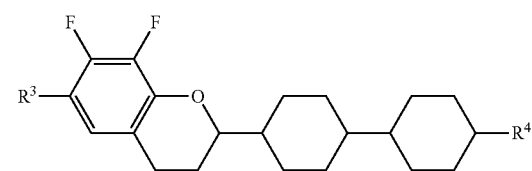
(6-7)

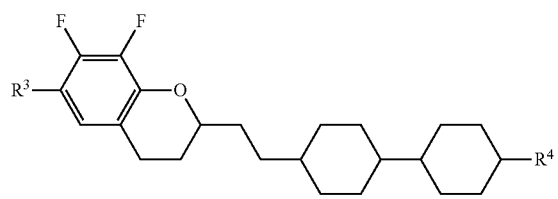
(6-8)

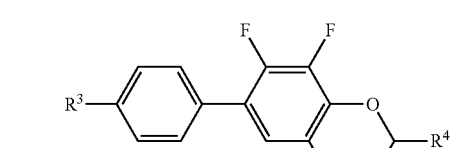
(6-9)

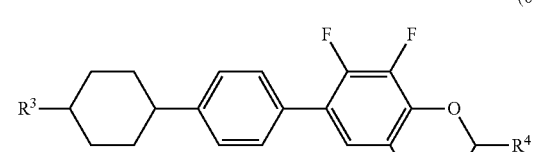
(6-10)

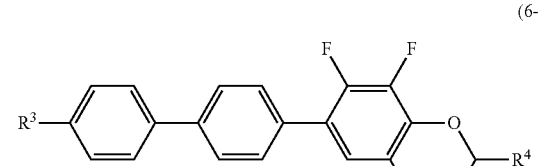
(6-11)

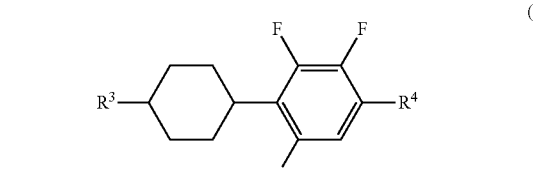
(7-1)

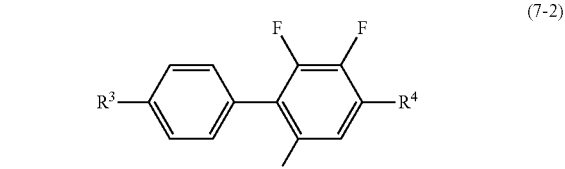
(7-2)

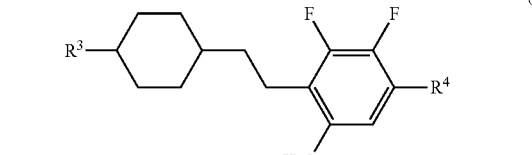
(7-3)

-continued

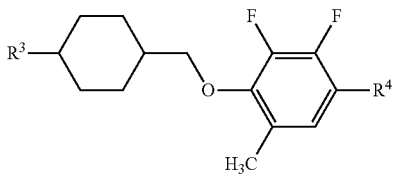
(7-4)

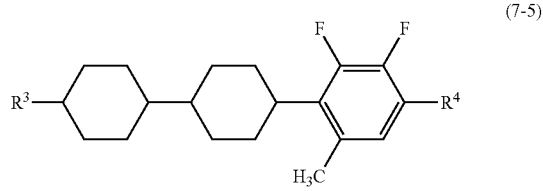
(7-5)

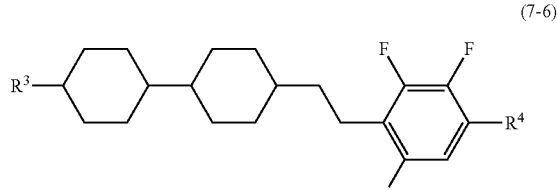
(7-6)

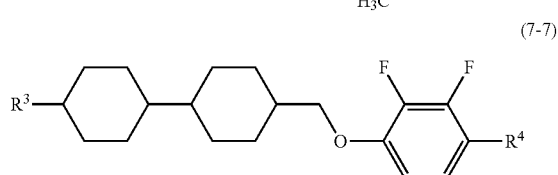
(7-7)

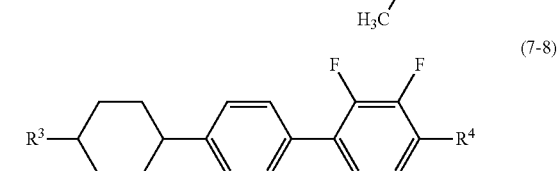
(7-8)

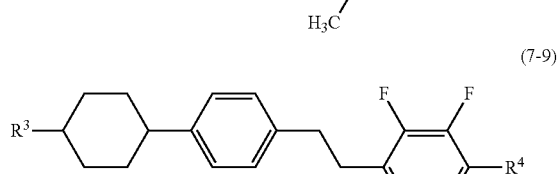
(7-9)

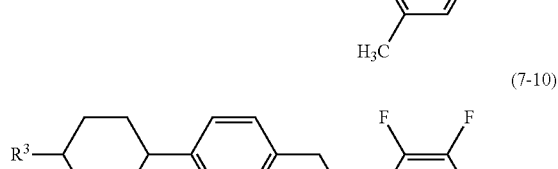
(7-10)

In the formulas, the definitions of $R^3$ and $R^4$ are just the same as described previously.

The component D is added to the liquid crystal composition having negative dielectric anisotropy for use in a VA mode and a PSA mode. As the content of the component D is increased, the threshold voltage of the composition decreases. However, the viscosity increases. Thus, it is desirable that the content should decrease as long as the required value of the threshold is satisfied. Accordingly, the content is preferably 40% by weight or more in order to ensure adequate voltage drive, in consideration that the absolute value of the dielectric anisotropy is about 5.

In the component D, the compound (2) is effective mainly in adjusting the threshold voltage, adjusting the viscosity, or adjusting the optical anisotropy, since it is a two-ring compound. The compounds (3) and (4) are effective in increasing the maximum temperature, decreasing the threshold voltage or increasing the optical anisotropy for instance, since it is a three-ring compound. The compounds (5), (6) and (7) are effective in decreasing the threshold voltage for instance.

The content of the component D is preferably 40% by weight or more, and more preferably in the range of 50% to 95% by weight based on the total weight of the composition, in the preparation of the composition for use in a VA and PSA mode. The elastic constant can be adjusted and the voltage-transmission curve can be adjusted by the addition of the component D. It is desirable that the content of the component D should 30% by weight or less based on the total weight of the composition when the component D is added to a composition having positive dielectric anisotropy.

Suitable examples of the compounds (8), (9) and (10), the component E, include the compounds (8-1) to (8-11), the compounds (9-1) to (9-19) and the compounds (10-1) to (10-6).

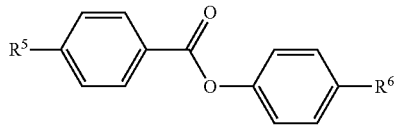
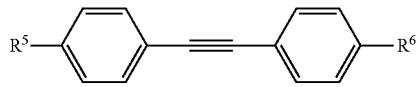
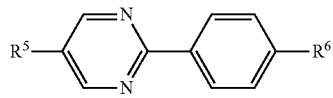
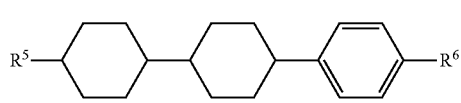
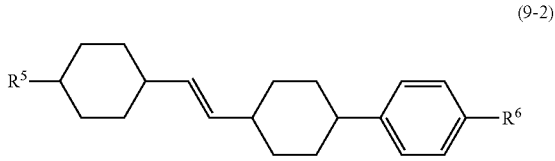
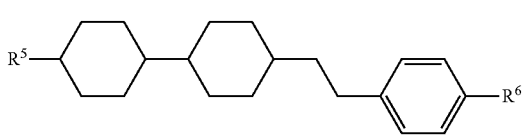
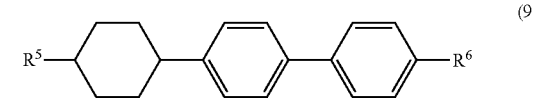
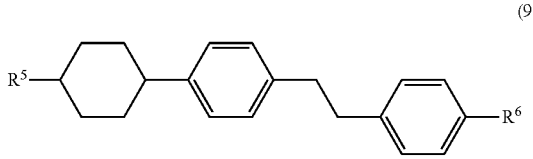
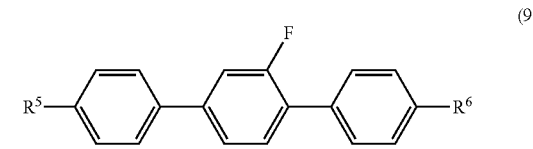
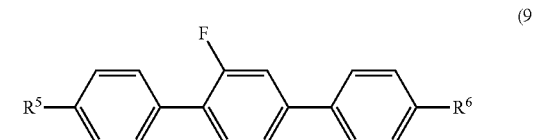
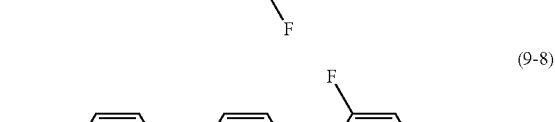
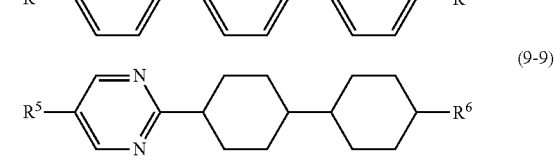

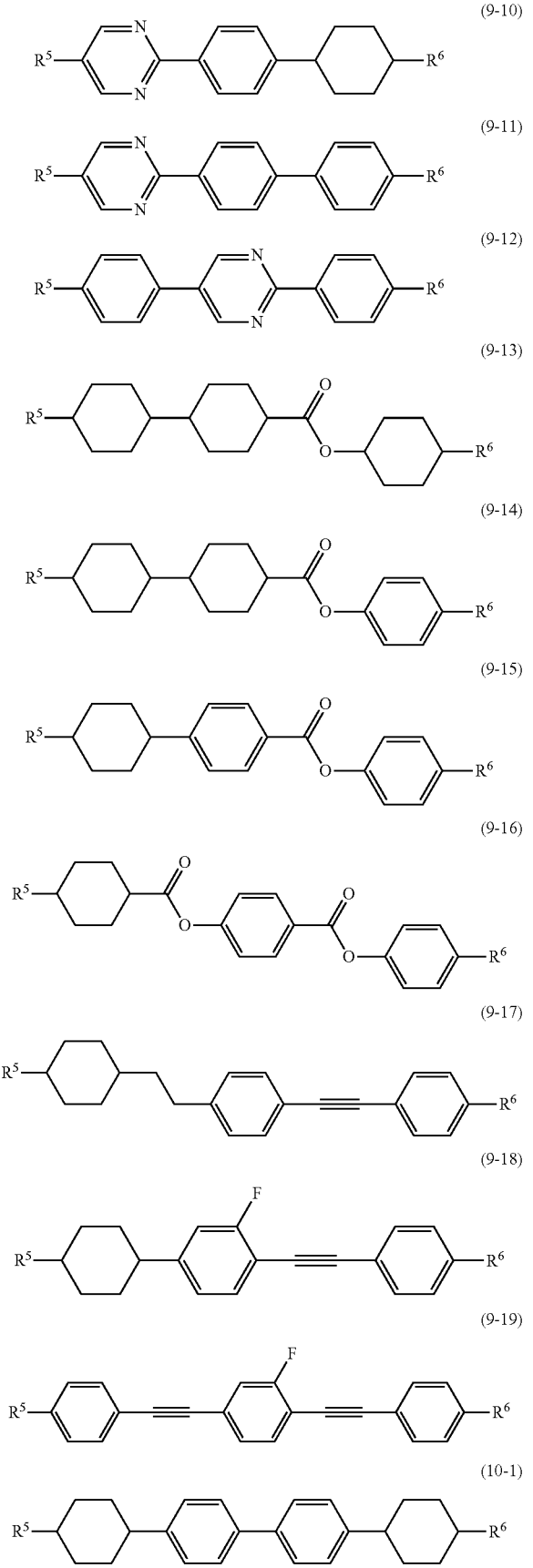
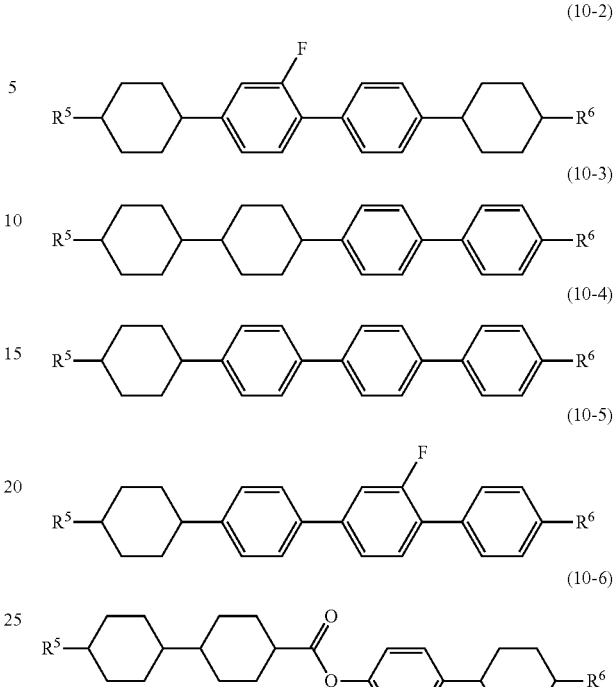

In the formulas, the definitions of $R^5$ and $R^6$ are just the same as described previously.

The compounds (8) to (10), the component E, are close to neutral, since the absolute value of the dielectric anisotropy is small. The compound (8) is effective mainly in adjusting the viscosity or adjusting the optical anisotropy. The compounds (9) and (10) are effective in increasing the temperature range of a nematic phase that is caused by an increase in the maximum temperature, or adjusting the optical anisotropy.

As the content of the component E is increased, the threshold voltage increases of the composition. However, the viscosity decreases. Thus, it is desirable that the content should increase as long as the required value of the threshold voltage is satisfied. Accordingly, the content of the component E is preferably 30% by weight or more, and more preferably 40% by weight or more based on the total weight of the composition, in the preparation of the composition for use in a VA mode or a PSA mode.

The preparation of the composition (1) is carried out according to known methods such as the mutual dissolution of necessary components at a high temperature. An additive may be added to the composition depending on its intended use. Examples of the additive are an optically active compound, a polymerizable compound, a polymerization initiator, an antioxidant, an ultraviolet light absorber and so forth. These kinds of additives are known to a person skilled in the art, and have been described in the literature.

The composition (1) may further include at least one optically active compounds. A known chiral dopant can be added as an optically active compound. The chiral dopant is effective in inducing a helical structure in liquid crystals, giving a necessary twist angle and thus preventing a reverse twist. Examples of the chiral dopant include the following optically active compounds (Op-1) to (Op-13).

(Op-1)
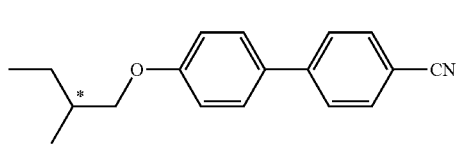
(Op-2)
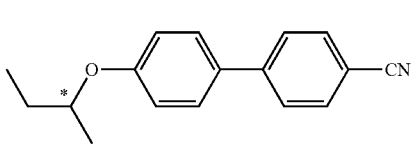
(Op-3)
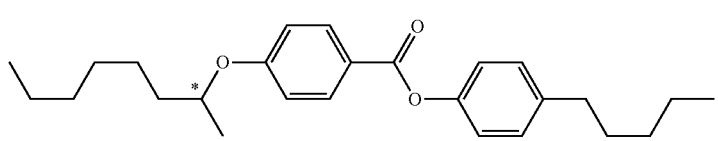
(Op-4)
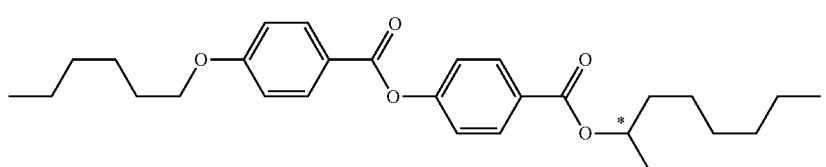
(Op-5)
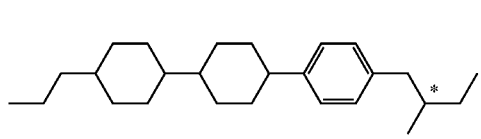
(Op-6)
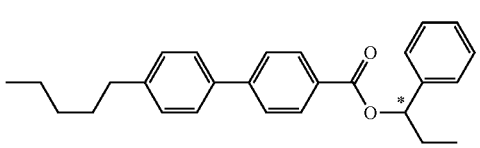
(Op-7)
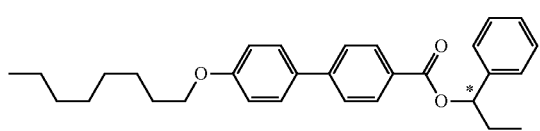
(Op-8)
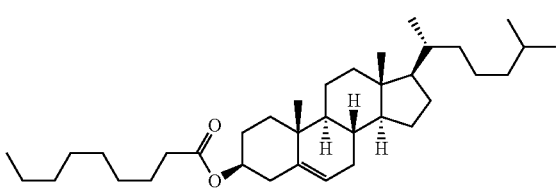
(Op-9)
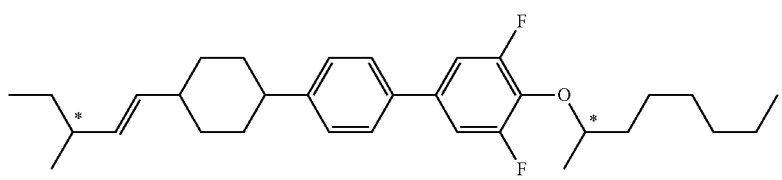
(Op-10)
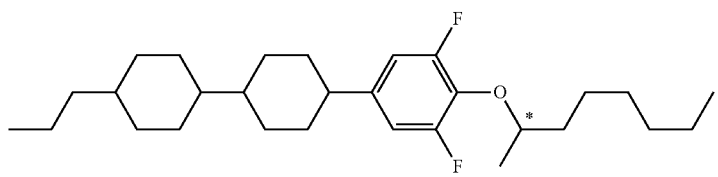
(Op-11)
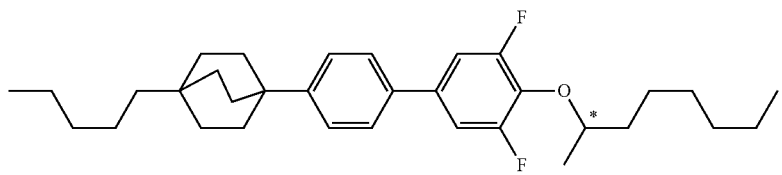
(Op-12)
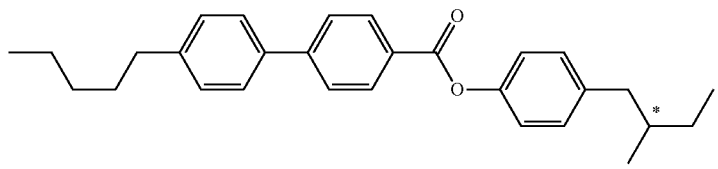

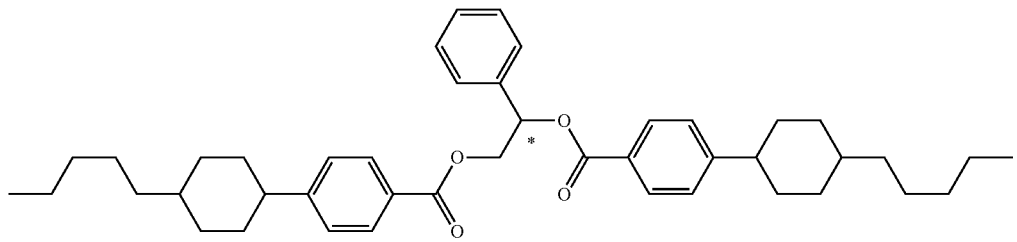
(Op-13)

A helical pitch is usually adjusted by the addition of an optically active compound to the composition (1). It is desirable to adjust the helical pitch to the range of 40 to 200 micrometers in a composition for use in a TFT mode and a TN mode. It is desirable to adjust the helical pitch to the range of 6 to 20 micrometers in a composition for use in a STN mode. It is desirable to adjust the helical pitch to the range of 1.5 to 4 micrometers in a composition for use in a BTN (bistable TN) mode. Two or more optically active compounds may be added for the purpose of adjusting the temperature dependence of the helical pitch.

The composition (1) can be used as a composition for use in a PSA mode by the addition of a polymerizable compound. Examples of the polymerizable compound include acrylates, methacrylates, vinyl compounds, vinyloxy compounds, propenyl ethers, epoxy compounds, vinyl ketones and oxetanes. The polymerizable compound is polymerized on irradiation with ultraviolet light or the like, preferably in the presence of a suitable initiator such as a photopolymerization initiator. Suitable conditions for the polymerization, and a suitable type and a suitable amount of the initiator are known to a person skilled in the art and are described in the literature.

The antioxidant is effective in maintaining a large voltage holding ratio. Desirable examples of the antioxidant include 2,6-di-tert-butyl-4-alkylphenol. The ultraviolet light absorber is effective for preventing a decrease in the maximum temperature. Desirable examples of the ultraviolet light absorber include a benzophenone derivative, a benzoate derivative and a triazole derivative. A light stabilizer such as an amine having steric hindrance is also desirable.

The composition (1) can be used for a GH mode by the addition of a dichroic dye such as a merocyanine, stylyl, azo, azomethine, azoxy, quinophthalone, anthraquinone or tetrazine compound.

Characteristics of the Composition (1)

In the composition (1), the temperature range of a nematic phase is wide, since the maximum temperature of a nematic phase can be adjusted to 70° C. or higher and the minimum temperature of the nematic phase can be adjusted to −20° C. or lower, by suitably adjusting the kinds of component compounds and their ratios. Accordingly, the liquid crystal display device containing this composition can be used in a wide temperature range.

In the composition (1), the optical anisotropy can be adjusted to the range of 0.10 to 0.13, and to the range of 0.05 to 0.18, by suitably adjusting the kinds of component compounds and their ratios. In a similar manner, the dielectric anisotropy can be adjusted to the range of −5.0 to −2.0. Desirable dielectric anisotropy is in the range of −4.5 to −2.5. The composition (1) having dielectric anisotropy in this range can be suitably used for a liquid crystal display device operated in a IPS mode, a VA mode or a PSA mode.

The Liquid Crystal Display Device

The composition (1) can be used not only for a liquid crystal display device having an operating mode such as a PC mode, a TN mode, a STN mode, an OCB mode or a PSA mode, which is driven by means of an AM (active matrix) mode, but also for a liquid crystal display device having an operating mode such as a PC mode, a TN mode, a STN mode, an OCB mode, a VA mode or an IPS mode, which is driven by means of a PM (passive matrix) mode. These liquid crystal display devices having the AM mode and the PM mode can be applied to any type of a reflection type, a transmission type, and a semi-transmission type.

The composition (1) can be used for a dynamic scattering (DS) mode-device by the addition of a conducting agent is added. The composition (1) can be used for a nematic curvilinear aligned phase (NCAP) device containing the composition microencapsulated, and a polymer dispersed (PD) device having a three-dimensional network polymer formed in the liquid crystal composition, for example, a polymer network (PN) device.

Since the composition (1) has negative dielectric anisotropy, it can be suitably used for a liquid crystal display device having an operating mode such as a VA mode, an IPS mode or a PSA mode, which is driven by means of an AM mode. The composition can be suitably used especially for the liquid crystal display device having a VA mode, which is driven by means of an AM mode.

The direction of an electric field is perpendicular to the surface of the glass substrate in a liquid crystal display device operated in the TN mode, the VA mode or the like. On the other hand, the direction of an electric field is parallel to the surface of the substrate in a liquid crystal display device operated in the IPS mode or the like. The structure of the liquid crystal display device operated in the VA mode is reported by K. Ohmuro, S. Kataoka, T. Sasaki and Y. Koike, SID '97 Digest of Technical Papers, 28, 845 (1997). The structure of the liquid crystal display device operated in the IPS mode is reported in WO 1991-010936 A (patent family: U.S. Pat. No. 5,576,867).

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents. The following examples are for illustrative purposes only and are not intended, nor should they be interpreted to limit the scope of the invention.

EXAMPLES

Examples of the Compound (1)

The invention will be explained in more detail based on examples. However, the invention is not limited to the examples. The term "%" means "% by weight," unless otherwise noted. Compounds synthesized herein were identified by means of $^1$H-NMR analysis and so forth.

$^1$H-NMR Analysis

A model DRX-500 apparatus (made by Bruker BioSpin Corporation) was used for measurement. A sample was dissolved in a deuterated solvent such as $CDCl_3$, and the measurement was carried out under the conditions of room temperature, 500 MHz and thirty-two times of accumulation. In the explanation of the nuclear magnetic resonance spectra, the symbols s, d, t, q, quin, sex, m and br stand for a singlet, a doublet, a triplet, a quartet, a quintet, a sextet, a multiplet and line-broadening, respectively. Tetramethylsilane (TMS) was used as the internal standard.

Sample for Measurement

A liquid crystal compound itself was used as a sample when the phase structure and the transition temperature were measured. A composition prepared by mixing the compound and mother liquid crystals was used as a sample when physical properties such as the maximum temperature of a nematic phase, compatibility at low temperature, viscosity and optical anisotropy were measured.

When a sample in which a compound is mixed with mother liquid crystals was used, the measurement was carried out according to the following method. The sample was prepared by mixing 15% by weight of the compound and 85% by weight of the mother liquid crystals. Extrapolated values were calculated from the measured values of the sample by means of an extrapolation method based on the following formula, and their values were reported. [Extrapolated value]= (100×[Measured value of sample]−[% by weight of mother liquid crystals]×[Measured value of mother liquid crystals])/[% by weight of compound].

When a smectic phase or crystals deposited at 25° C. even at this ratio of the compound to the mother liquid crystals, the ratio of the compound to the mother liquid crystals was changed in the order of (10% by weight:90% by weight), (5% by weight:95% by weight) and (1% by weight:99% by weight). The physical properties of the sample were measured at the ratio in which the smectic phase or the crystals did not deposit at 25° C. Incidentally, the ratio of the compound to the mother liquid crystals is (15% by weight:85% by weight), unless otherwise noted.

The following mother liquid crystals (i) were used as mother liquid crystals. The ratio of each component is expressed as a percentage by weight.

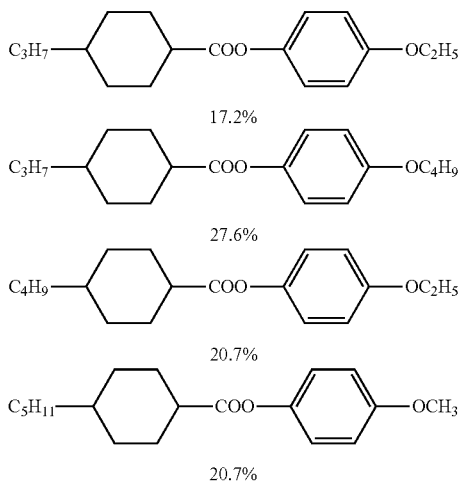

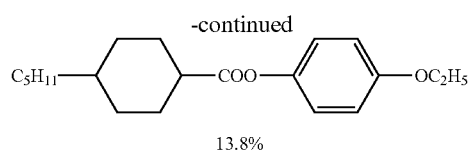

13.8%

Measurement Method

The physical properties of compounds were measured according to the following methods. Most were measurement methods described in the Standard of Electronic Industries Association of Japan, EIAJ•ED-2521A, or the modified methods. No TFT was attached to a TN device or a VA device used for measurement.

(1) Phase Structure

A sample (a compound) was placed on a hot plate of a melting point apparatus (Hot Stage Model FP-52 made by Mettler Toledo International Inc.) equipped with a polarizing microscope, and the phase conditions and their changes were observed with the polarizing microscope while the compound was heated at the rate of 3° C. per minute, and the kinds of phases were specified.

(2) Transition Temperature (° C.)

A sample (a compound) was heated and then cooled at the rate of 3° C. per minute using a Perkin-Elmer differential scanning calorimeter, a DSC-7 System or a Diamond DSC System. The starting point of an endothermic peak or an exothermic peak caused by the phase change of the sample was obtained by means of the extrapolation, and thus the phase transition temperature was determined.

The symbol C stood for crystals, which were expressed as $C_1$ and $C_2$ when the kinds of crystals were distinguishable. The symbols S and N stood for a smectic phase and a nematic phase, respectively. When a smectic B phase or a smectic A were distinguishable in the smectic phases, they were expressed as $S_B$ and $S_A$, respectively. The symbol Iso stood for a liquid (isotropic). Phase-transition temperatures were expressed as, for example, "C, 50.0; N, 100.0; Iso", which means that the phase-transition temperature from crystals to a nematic phase (CN) was 50.0° C., and the phase-transition temperature from the nematic phase to a liquid (clearing point) was 100.0° C.

(3) Compatibility at Low Temperature

Samples were prepared by mixing a compound with mother liquid crystals so that the ratio of the compound became 20% by weight, 15% by weight, 10% by weight, 5% by weight, 3% by weight and 1% by weight, and placed in glass vials. After these glass vials had been kept in a freezer at −10° C. or −20° C. for a certain period of time, they were observed as to whether or not crystals or a smectic phase had been deposited.

(4) Maximum Temperature of a Nematic Phase ($T_{NI}$ or NI; ° C.)

A sample was placed on a hot plate in a melting point apparatus equipped with a polarizing microscope and was heated at the rate of 1° C. per minute. The temperature was measured when part of the sample began to change from a nematic phase to an isotropic liquid. A higher limit of the temperature range of a nematic phase may be abbreviated to "the maximum temperature."

(5) Minimum Temperature of a Nematic Phase (TC; ° C.)

A sample having a nematic phase was kept in freezers at temperatures of 0° C., −10° C., −20° C., −30° C. and −40° C. for 10 days, and then the liquid crystal phases were observed. For example, when the sample maintained the nematic phase at −20° C. and changed to crystals or a smectic phase at −30°

C., TC was expressed as ≤−20° C. A lower limit of the temperature range of a nematic phase may be abbreviated to "the minimum temperature."

(6) Viscosity (Bulk Viscosity; η; Measured at 20° C.; mPa·s)

An E-type viscometer was used for measurement.

(7) Viscosity (Rotational Viscosity; γ1; Measured at 25° C.; mPa·s)

Measurement was carried out according to the method described in M. Imai, et al., Molecular Crystals and Liquid Crystals, Vol. 259, p. 37 (1995). A sample was put in a VA device in which the distance between the two glass substrates (cell gap) was 20 micrometers. A voltage in the range of 30 V to 50 V was applied stepwise with an increment of 1 V to the device. After a period of 0.2 second with no voltage, a voltage was applied repeatedly under the conditions of only one rectangular wave (rectangular pulse; 0.2 second) and no voltage (2 seconds). The peak current and the peak time of the transient current generated by the applied voltage were measured. The value of rotational viscosity was obtained from the measured values and the calculating equation (8) on page 40 of the paper presented by M. Imai, et al. Incidentally, the value of the dielectric anisotropy necessary for the present calculation was obtained by the method described below, under the heading "Dielectric anisotropy."

(8) Optical Anisotropy (Refractive Index Anisotropy; Δn; Measured at 25° C.)

Measurement was carried out using an Abbe refractometer with a polarizing plate attached to the ocular, on irradiation with light at a wavelength of 589 nanometers. The surface of the main prism was rubbed in one direction, and then a sample was dropped onto the main prism. The refractive index (n∥) was measured when the direction of the polarized light was parallel to that of the rubbing. The refractive index (n⊥) was measured when the direction of polarized light was perpendicular to that of the rubbing. The value of the optical anisotropy (Δn) was calculated from the equation: Δn=n∥−n⊥.

(9) Dielectric Anisotropy (Δ∈; Measured at 25° C.)

Negative dielectric anisotropy was measured by the following method. An ethanol (20 mL) solution of octadecyltriethoxysilane (0.16 mL) was applied to well-washed glass substrates. The glass substrates were rotated with a spinner, and then heated at 150° C. for 1 hour. A VA device in which the distance (cell gap) was 20 micrometers was assembled from the two glass substrates. A sample was put in the VA device, a voltage of 0.5 V (1 kHz, sine waves) was applied to the sample, and then the dielectric constant (∈∥) in the major axis direction of the liquid crystal molecules was measured.

A polyimide alignment film was prepared on glass substrates in a similar manner. After a rubbing-treatment to the alignment film, a TN device in which the distance between the two glass substrates was 9 micrometers and the twist angle was 80 degrees was assembled. The sample was put in the TN device, a voltage of 0.5 V (1 kHz, sine waves) was applied to the sample, and then the dielectric constant (∈⊥) in the minor axis direction of the liquid crystal molecules was measured. The value of the dielectric anisotropy was calculated from the equation of Δ∈=∈∥−∈⊥.

(10) Voltage Holding Ratio (VHR; Measured at 25° C. and 100° C.; %)

A TN device was prepared by putting a sample in a cell having a polyimide alignment film, where the distance between the two glass substrates (cell gap) was 6 micrometers. The TN device was charged at 25° C. by applying pulse voltage (60 microseconds at 5V). The waveforms of the voltage applied to the TN device were observed with a cathode ray oscilloscope and the area between the voltage curve and the axis of abscissa in a unit period (16.7 milliseconds) was measured. An area was similarly measured based on the waveform of the applied voltage after the TN device had been removed. The value of the voltage holding ratio (%) was calculated from the equation: (voltage holding ratio)=(value of the area in the presence of a TN device)/(value of the area in the absence of a TN device)×100. The voltage holding ratio thus obtained was referred to as "VHR-1."

Then, the TN device was heated at 100° C. for 250 hours. After the TN device had been allowed to return to 25° C., the voltage holding ratio was measured by a method similar to that described above. The voltage holding ratio obtained after the heating test was referred to as "VHR-2." The heating test means an acceleration test and was used as a test corresponding to a long-term durability test for the TN device.

(11) Elastic Constant ($K_{11}$ and $K_{33}$; Measured at 25° C.)

An elastic constant measurement system Model EC-1 made by Toyo Corporation was used for measurement. A sample was put in a homeotropic device in which the distance between the two glass substrates (cell gap) was 20 micrometers. An electric charge of 20 volts to 0 volts was applied to the device, and the electrostatic capacity and the applied voltage were measured. The measured values of the electrostatic capacity (C) and the applied voltage (V) were fitted to the equation (2.98) and the equation (2.101) in page 75 of "Ekisho Debaisu Handobukku" (Liquid Crystal Device Handbook, in English; The Nikkan Kogyo Shimbun, Ltd., Japan) and the value of the elastic constant was obtained from the equation (2.100).

Materials

Solmix A-11 was a mixture of ethanol (85.5%), methanol (13.4%) and isopropanol (1.1%), and was available from Japan Alcohol Trading Co., Ltd.

Example 1

Preparation of (E)-1-ethoxy-2,3-difluoro-4-(trans-4-(4-(4-propylphenyl)but-1-en-1-yl)cyclohexyl)benzene (No. 2)

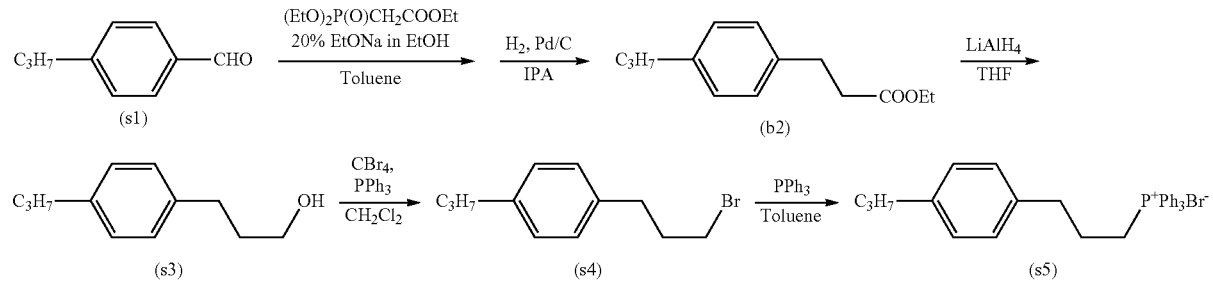

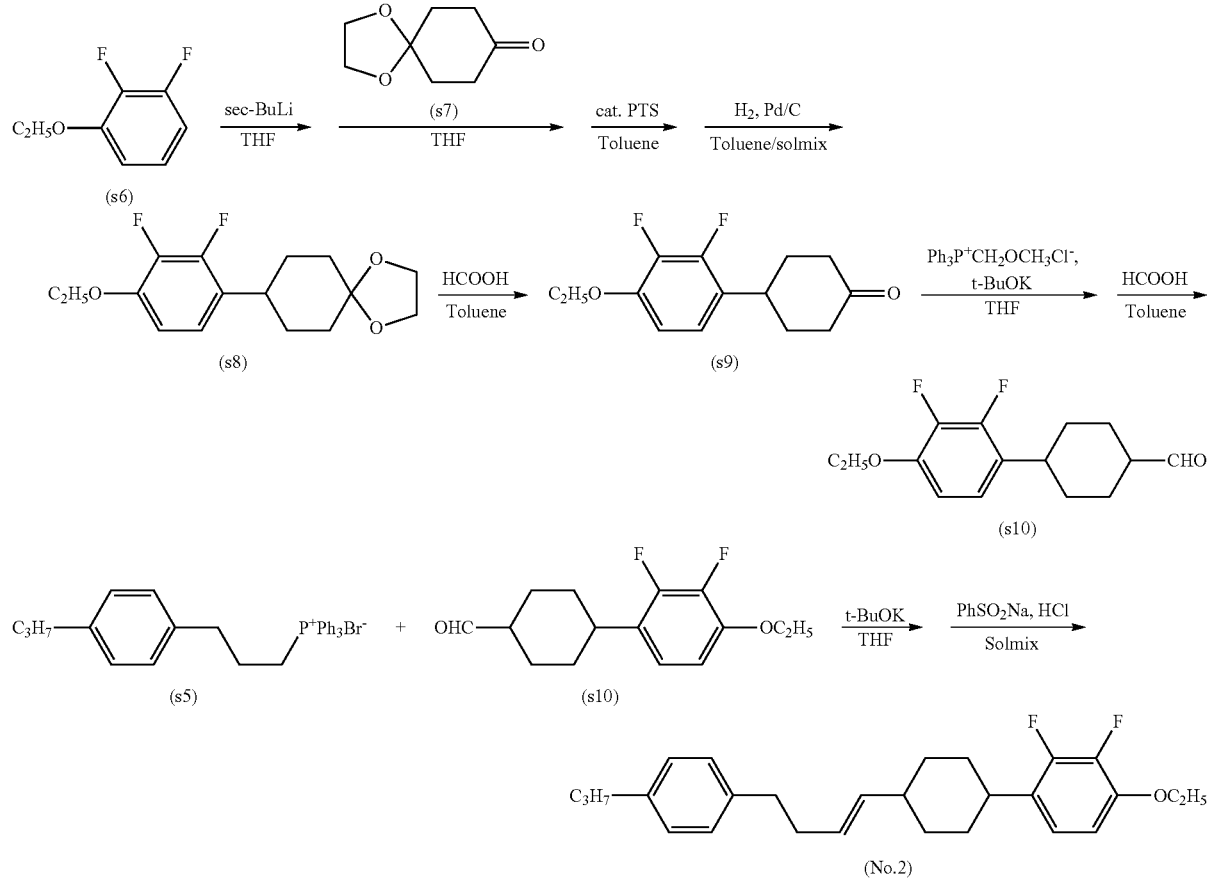

First Step:

4-Propylbenzaldehyde (s1) (10.0 g), ethyl diethylphosphonoacetate (18.2 g) and toluene (200 ml) were placed in a reaction vessel under an atmosphere of nitrogen, and cooled to 0° C. Sodium ethoxide in ethanol solution (20%; 27.6 g) was added at the same temperature, and the stirring was continued for another 2 hours. After the reaction mixture had been returned to 25° C., the stirring was continued for another 2 hours. The reaction mixture was treated with water, and the aqueous layer was extracted with toluene. The combined organic layers were washed with water, and then dried over anhydrous magnesium sulfate. The solution was concentrated under reduced pressure, and the residue was purified by column chromatography with a mixed solvent of toluene and heptane (toluene:heptane=2:1 by volume) as an eluent and silica gel as a stationary phase powder. The purified product was dissolved in 2-propanol (150 ml), to which Pd/C (0.91 g) was added. The mixture was stirred at room temperature under a hydrogen atmosphere until hydrogen absorption had ceased. After the reaction had been completed, Pd/C was removed, and then solvent was distilled off. The residue was purified by column chromatography with toluene as an eluent and silica gel as a stationary phase powder to give ethyl 3-(4-propylphenyl) propionate (s2) (14.2 g). The yield based on the compound (s1) was 95.5%.

Second Step:

Lithium aluminum hydride (2.9 g) was suspended in THF (200 ml). Ethyl 3-(4-propylphenyl)propionate (s2) (14.2 g) was added dropwise to the suspension in the temperature range of −20° C. to −10° C., and the mixture was stirred at the same temperature range for 2 hours. After the completion of reaction had been confirmed by means of GC analysis, ethyl acetate and a saturated aqueous solution of ammonia were added successively to the reaction mixture under ice-cooling, and the deposits were removed by filtration through Celite. The filtrate was extracted with ethyl acetate. The combined organic layers were washed successively with water and brine, and then dried over anhydrous magnesium sulfate. The products were purified by recrystallization from heptane to give 3-(4-propylphenyl)propanol (s3) (11.0 g). The yield based on the compound (s2) was 95.7%.

Third Step:

3-(4-Propylphenyl)propanol (s3) (11.0 g) and triphenylphosphine (24.3 g) were dissolved in methylene chloride (200 ml). Carbon tetrabromide (24.5 g) in methylene chloride (100 ml) solution was slowly added dropwise to the solution, and the mixture was stirred at room temperature for another 3 hours. The reaction mixture was treated with a saturated aqueous solution of sodium hydrogencarbonate, and the aqueous layer was extracted with ethyl acetate. The combined organic layers were washed successively with water and brine, and dried over anhydrous magnesium sulfate. The solution was concentrated under reduced pressure to leave a residue, pale yellow solids. The residue was purified by column chromatography with heptane as an eluent and silica gel as a stationary phase powder to give 3-(4-propylphenyl)bromopropane (s4) (14.5 g). The yield based on the compound (s3) was 97.4%.

Fourth Step:

3-(4-Propylphenyl)bromopropane (s4) (14.0 g), toluene (100 ml) and triphenylphosphine (31.5 g) were placed in a reaction vessel under an atmosphere of nitrogen, and the mixture was heated to reflux for 5 hours. After the reaction mixture had been cooled to 25° C., the deposits were filtered, and the unreacted material was removed by washing with toluene three times. The resulting colorless solids were dried to give 3-(4-propylphenyl)propyltriphenyl phosphonium bromide (s5) (30.0 g). The yield based on the compound (s4) was 99.1%.

Fifth Step:

1-Ethoxy-2,3-difluorobenzene (s6) (102.8 g) and THF (1,000 ml) were placed in a reaction vessel under an atmosphere of nitrogen, and cooled to −74° C. sec-Butyllithium (1.00M; in n-hexane-cyclohexane; 780 ml) was added dropwise in the temperature range of −74° C. to −70° C., and the stirring was continued for another 2 hours. Then, 1,4-dioxaspiro[4.5]decan-8-one (s7) (101.5 g) in THF (500 ml) solution was added dropwise in the temperature range of −75° C. to −70° C., and the stirring was continued for another 8 hours while the mixture was allowed to come to 25° C. The reaction mixture was treated with an aqueous solution of ammonium chloride, and the aqueous layer was extracted with ethyl acetate. The combined organic layers were washed with water, a saturated aqueous solution of sodium hydrogencarbonate and water, and then dried over anhydrous magnesium sulfate. The solvent was distilled off under reduced pressure, and the residue was mixed with p-toluenesulfonic acid (3.0 g) and toluene (500 ml). The mixture was heated to reflux for 2 hours while distilled water was removed. After the reaction mixture had been cooled to 30° C., it was treated with water, and the aqueous layer was extracted with toluene. The combined organic layers were washed with a saturated aqueous solution of sodium hydrogencarbonate and water, and then dried over anhydrous magnesium sulfate. The solution concentrated under reduced pressure, and the residue was purified by column chromatography with toluene as an eluent and silica gel as a stationary phase powder. The purified product was dissolved in a mixed solvent of toluene (250 ml) and Solmix A-11 (250 ml), to which Pd/C (5.0 g) was added. The mixture was stirred at room temperature under a hydrogen atmosphere until hydrogen absorption had ceased. After the reaction had been completed, Pd/C was removed, and then solvent was distilled off. The residue was purified by column chromatography with toluene as an eluent and silica gel as a stationary phase powder, and then by recrystallization from heptane to give 8-(2,3-difluoro-4-ethoxyphenyl)-1,4-dioxaspiro[4.5]decane (s8) (136.1 g). The yield based on the compound (s6) was 70.2%.

Sixth Step:

The compound (s8) (136.1 g), formic acid (87%; 105.0 ml) and toluene (300 ml) were mixed, and the mixture was heated to reflux for 2 hours. After the reaction mixture had been cooled to 30° C., it was treated with water, and the aqueous layer was extracted with toluene. The combined organic layers were washed with water, a saturated aqueous solution of sodium hydrogencarbonate and water, and then dried over anhydrous magnesium sulfate. The solvent was distilled off under reduced pressure. The residue was purified by column chromatography with toluene as an eluent and silica gel as a stationary phase powder, and then by recrystallization from heptane to give 1-(2,3-difluoro-4-ethoxyphenyl)-cyclohexan-4-one (s9) (102.7 g). The yield based on the compound (s8) was 88.5%.

Seventh Step:

Well-dried methoxymethyltriphenylphosphonium chloride (166.1 g) was mixed with THF (500 ml) under an atmosphere of nitrogen, and the solution was cooled to −30° C. Potassium t-butoxide (t-BuOK; 54.4 g) was added in two portions in the temperature range of −30° C. to −20° C. After 30 minutes of stirring at −20° C., the compound (s9) (102.7 g) dissolved in THF (100 ml) was added dropwise in the temperature range of −30 to −20° C. After 30 minutes of stirring at −10° C., the reaction mixture was treated with water, and the aqueous layer was extracted with toluene. The combined organic layers were washed with water, and then dried over anhydrous magnesium sulfate. The solution was concentrated under reduced pressure. The residue was purified by column chromatography with a mixed solvent of heptane and toluene (heptane:toluene=1:1 by volume) as an eluent and silica gel as a stationary phase powder to give 1-(4-ethoxy-2,3-difluorophenyl)-4-methoxymethylenecyclohexane. The compound was mixed with formic acid (87%; 55.8 g) and toluene (300 ml), and the mixture was heated to reflux for 2 hours. After the reaction mixture had been cooled to 30° C., it was treated with water, and the aqueous layer was extracted with toluene. The combined organic layers were washed with water, a saturated aqueous solution of sodium hydrogencarbonate and water, and then dried over anhydrous magnesium sulfate. The solvent was distilled off under reduced pressure, and the residue was purified by column chromatography with toluene as an eluent and silica gel as a stationary phase powder, and then by recrystallization from a mixed solvent of heptane and toluene (heptane:toluene=2:1 by volume) to give trans-4-(4-ethoxy-2,3-difluorophenyl)-cyclohexanecarboxaldehyde (s10) (54.6 g). The yield based on the compound (s9) was 50.4%.

Eighth Step:

Well-dried 3-(4-propylphenyl)propyltriphenyl phosphonium bromide (s5) (11.3 g) was mixed with THF (100 ml) under an atmosphere of nitrogen, and cooled to −10° C. Potassium t-butoxide (t-BuOK; 2.5 g) was added in two portions in the temperature range of −10° C. to −5° C. After 60 minutes of stirring at −10° C., the compound (s10) (5.0 g) dissolved in THF (30 ml) was added dropwise in the temperature range of −10 to −5° C. After 30 minutes of stirring at 0° C., the reaction mixture was treated with water, and the aqueous layer was extracted with toluene (100 ml). The combined organic layers were washed with water, and then dried over anhydrous magnesium sulfate. The solution was concentrated under reduced pressure, and the residue was purified by column chromatography with toluene as an eluent and silica gel as a stationary phase powder. The purified product was mixed with sodium benzenesulfonate dihydrate (6.1 g) and Solmix A-11 (100 ml). Then, 6N-hydrochloric acid (20 ml) was added, and the mixture was heated to reflux for 2 hours. The reaction mixture was treated with water, and the aqueous layer was extracted with toluene. The combined organic layers were washed with water, a saturated aqueous solution of sodium hydrogencarbonate and water, and then dried over anhydrous magnesium sulfate. The solvent was distilled off under reduced pressure, and the residue was purified by column chromatography with toluene as an eluent and silica gel as a stationary phase powder. The product was further purified by recrystallization from a mixed solvent of ethyl acetate and Solmix A-11 (ethyl acetate:Solmix=1:4 by volume) to give (E)-1-ethoxy-2,3-difluoro-4-(trans-4-(4-(4-propylphenyl)but-1-en-1-yl)cyclohexyl)benzene (No. 2) (5.0 g). The yield based on the compound (s10) was 65.0%.

Chemical shift (δ ppm; CDCl$_3$): 7.09 (s, 4H), 6.83 (t, 1H), 6.66 (t, 1H), 5.50-5.37 (m, 2H), 4.09 (q, 2H), 3.22 (m, 1H), 2.74 (tt, 1H), 2.63 (t, 2H), 2.56 (t, 2H), 2.29 (m, 2H), 1.95 (m, 1H), 1.84 (m, 4H), 1.62 (quin, 2H), 1.52-1.41 (m, 4H), 1.28-1.18 (m, 2H) and 0.94 (t, 3H).

The physical properties of the compound (No. 2) were as follows. Transition temperature: C, 88.5; N, 96.5; I. $T_{NI}$=93.3° C.; Δ∈=−4.83; Δn=0.141; η=41.0 mPa·s.

Example 2

Preparation of (E)-1-ethoxy-2,3-difluoro-4-(4-(trans-4-(4-propylphenyl)cyclohexyl)but-3-en-1-yl)benzene
(No. 42)

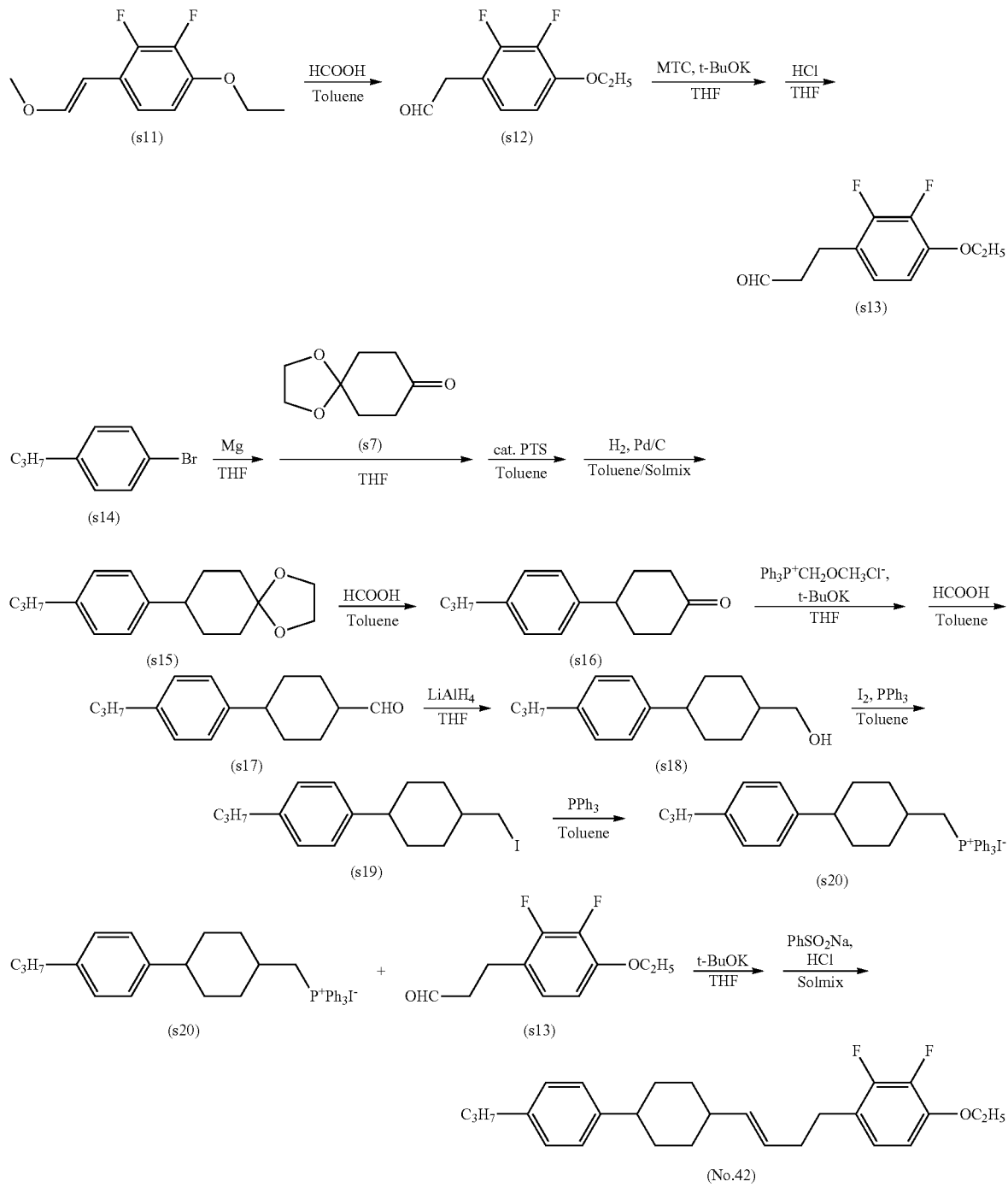

First Step:

The compound (s11) (50.0 g), formic acid (87%; 54.0 g), tetrabutylammonium bromide (15.0 g) and toluene (500 ml) were mixed, and the mixture was heated to reflux for 2 hours. After the reaction mixture had been cooled to 30° C., it was treated with water, and aqueous layer was extracted with toluene (500 ml). The combined organic layers were washed with water, a saturated aqueous solution of sodium hydrogencarbonate and water, and then dried over anhydrous magnesium sulfate. The solvent was distilled off under reduced pressure, and the residue was purified by column chromatography with toluene as an eluent and silica gel as a stationary phase powder, and then by recrystallization from a mixed solvent of heptane and toluene (heptane:toluene=2:1 by volume) to give 2-(4-ethoxy-2,3-difluorophenyl)acetaldehyde (s12) (46.0 g). The yield based on the compound (s11) was 98.4%.

Second Step:

Well-dried methoxymethyltriphenylphosphonium chloride (69.4 g) was mixed with THF (300 ml) under an atmosphere of nitrogen, and cooled to −30° C. Potassium t-butoxide (t-BuOK) (22.7 g) was added in two portions in the temperature range of −30° C. to −20° C. After 30 minutes of stirring at −20° C., the compound (s12) (31.2 g) dissolved in THF (100 ml) was added dropwise in the temperature range of −30 to After 30 minutes of stirring at −10° C., the reaction mixture was treated with water, and the aqueous layer was extracted with toluene. The combined organic layers were washed with water, and then dried over anhydrous magnesium sulfate. The solution was concentrated under reduced pressure, and the residue was purified by column chromatography with a mixed solvent of heptane and toluene (heptane:toluene=1:1 by volume) as an eluent and silica gel as a stationary phase powder to give 1-ethoxy-2,3-difluoro-4-(3-methoxyallyl)benzene. Then, 6N-hydrochloric acid (78 ml) and THF (100 ml) were mixed with the compound, and the mixture was stirred at room temperature for 8 hours. The reaction mixture was treated with water, and the aqueous layer was extracted with toluene. The combined organic layers were washed with water, a saturated aqueous solution of sodium hydrogencarbonate and water, and then dried over anhydrous magnesium sulfate. The solvent was distilled off under reduced pressure, and the residue was purified by column chromatography with toluene as an eluent and silica gel as a stationary phase powder, and then by recrystallization from a mixed solvent of heptane and toluene (heptane:toluene=2:1 by volume) to give 3-(4-ethoxy-2,3-difluorophenyl)propanal (s13) (15.8 g). The yield based on the compound (s12) was 43.7%.

Third Step:

Well-dried magnesium (14.5 g) and THF (100 ml) were placed in a reaction vessel under an atmosphere of nitrogen, and heated to 40° C. 1-Bromo-4-propylbenzene (s14) (100.0 g) dissolved in THF (300 ml) was added dropwise in the temperature range of 40° C. to 60° C., and the stirring was continued for another 60 minutes. 1,4-Dioxaspiro[4.5]decan-8-one (s7) (78.4 g) dissolved in THF (150 ml) was slowly added dropwise in the temperature range of −5° C. to 0° C., and the stirring was continued for another 60 minutes. After the reaction mixture was allowed to come to room temperature, it was treated with an aqueous solution of ammonium chloride (3%), and the aqueous layer was extracted with toluene. The combined organic layers were washed with water, a saturated aqueous solution of sodium hydrogencarbonate and water, and then dried over anhydrous magnesium sulfate. The solvent was distilled off under reduced pressure. The residue was mixed with p-toluenesulfonic acid (3.9 g) and toluene (300 ml), and the mixture was heated to reflux for 2 hours while distilled water was removed. After the reaction mixture had been cooled to 30° C., it was treated with water, and the aqueous layer was extracted with toluene. The combined organic layers were washed with a saturated aqueous solution of sodium hydrogencarbonate and water, and then dried over anhydrous magnesium sulfate. The solution was concentrated under reduced pressure, and the residue was purified by column chromatography with toluene as an eluent and silica gel as a stationary phase powder. The purified product was dissolved in a mixed solvent of toluene (250 ml) and Solmix A-11 (250 ml), to which Pd/C (5.0 g) was added. The mixture was stirred at room temperature under a hydrogen atmosphere until hydrogen absorption had ceased. After the reaction had been completed, Pd/C was removed, and then solvent was distilled off. The residue was purified by column chromatography with toluene as an eluent and silica gel as a stationary phase powder, and then by recrystallization from heptane to give 8-(4-propylphenyl)-1,4-dioxaspiro[4.5]decane (s15) (68.0 g). The yield based on the compound (s14) was 52.0%.

Fourth Step:

The compound (s15) (68.0 g), formic acid (87%; 60.0 ml) and toluene (200 ml) were mixed, and the mixture was heated to reflux for 2 hours. After the reaction mixture had been cooled to 30° C., it was treated with water, and the aqueous layer was extracted with toluene. The combined organic layers were washed with water, a saturated aqueous solution of sodium hydrogencarbonate and water, and then dried over anhydrous magnesium sulfate. The solvent was distilled off under reduced pressure, and the residue was purified by column chromatography with toluene as an eluent and silica gel as a stationary phase powder, and then by recrystallization from heptane to give 1-(4-propylphenyl)-cyclohexan-4-one (s16) (54.0 g). The yield based on the compound (s15) was 95.6%.

Fifth Step:

Well-dried methoxymethyltriphenylphosphonium chloride (47.5 g) was mixed with THF (200 ml) under an atmosphere of nitrogen, and cooled to −30° C. Potassium t-butoxide (t-BuOK; 15.6 g) was added in two portions in the temperature range of −30° C. to −20° C. After 30 minutes of stirring at −20° C., the compound (s16) (25.0 g) dissolved in THF (100 ml) was added dropwise in the temperature range of −30 to After 30 minutes of stirring at −10° C., the reaction mixture was treated with water, and the aqueous layer was extracted with toluene. The combined organic layers were washed with water, and then dried over anhydrous magnesium sulfate. The solution was concentrated under reduced pressure, and the residue was purified by column chromatography with a mixed solvent of heptane and toluene (heptane:toluene=1:1 by volume) as an eluent and silica gel as a stationary phase powder to give 1-(4-propylphenyl)-4-methoxymethylenecyclohexane. The compound was mixed with formic acid (87%; 25.0 g), tetrabutylammonium bromide (37.3 g) and toluene (300 ml), and the mixture was heated to reflux for 2 hours. After the reaction mixture had been cooled to 30° C., it was treated with water, and the aqueous layer was extracted with toluene. The combined organic layers were washed with water, a saturated aqueous solution of sodium hydrogencarbonate and water, and then dried over anhydrous magnesium sulfate. The solvent was distilled off, and the residue was purified by column chromatography with toluene as an eluent and silica gel as a stationary phase powder, and then by recrystallization from a mixed solvent of heptane and toluene (heptane:toluene=2:1 by volume) to give trans-4-(4-propylphenyl)-cyclohexanecarboxaldehyde (s17) (24.4 g). The yield based on the compound (s16) was 91.7%.

Sixth Step:

Lithium aluminum hydride (2.4 g) was suspended in THF (200 ml). trans-4-(4-propylphenyl)-cyclohexanecarboxaldehyde (s17) (24.4 g) was added dropwise to the suspension in the temperature range of −20° C. to −10° C., and the mixture was stirred at the same temperature range for 2 hours. After the completion of reaction had been confirmed by means of GC analysis, ethyl acetate and a saturated aqueous solution of ammonia were added successively to the reaction mixture under ice-cooling, and the deposits were removed by filtration through Celite. The filtrate was extracted with ethyl acetate. The combined organic layers were washed successively with water and brine, and then dried over anhydrous magnesium sulfate. The products were purified by recrystallization from heptane to give trans-4-(4-propylphenyl)-hydroxymethylcyclohexane (s18) (22.9 g). The yield based on the compound (s17) was 93.0%.

Seventh Step:

The compound (s18) (22.9 g) and triphenylphosphine (PPh$_3$; 31.0 g) were added to toluene (200 ml) under an atmosphere of nitrogen, and the mixture was stirred at 5° C. Iodine (30.0 g) was added in five portions in the temperature range of 5 to 10° C., and the stirring was continued for another 3 hours. The completion of the reaction was confirmed by means of GC analysis. The deposits were filtered off from the reaction mixture. The solvent was distilled off from the filtrate under reduced pressure. The residue was purified by column chromatography with heptane as an eluent and silica gel as a stationary phase powder to give trans-4-(4-propylphenyl)-iodomethylcyclohexane (s19) (19.7 g). The yield based on the compound (s18) was 58.5%.

Eighth Step:

The compound (s19) (13.2 g), toluene (50 ml) and triphenylphosphine (12.1 g) were placed in a reaction vessel under an atmosphere of nitrogen, and the mixture was heated to reflux for 5 hours. After the reaction mixture had been cooled to 25° C., the deposits were filtered, and the unreacted material was removed by washing with toluene three times. The resulting colorless solids were dried to give trans-4-(4-propylphenyl)methyltriphenyl phosphonium iodide (s20) (19.2 g). The yield based on the compound (s19) was 82.3%.

Ninth Step:

Well-dried trans-4-(4-propylphenyl)methyltriphenyl phosphonium iodide (s20) (19.2 g) was mixed with THF (200 ml) under an atmosphere of nitrogen, and cooled to −10° C. Potassium t-butoxide (t-BuOK; 3.5 g) was added in two portions in the temperature range of −10° C. to −5° C. After 60 minutes of stirring at −10° C., the compound (s13) (5.7 g) dissolved in THF (30 ml) was added dropwise in the temperature range of −10 to −5° C. After 30 minutes of stirring at 0° C., the reaction mixture was treated with water, and the aqueous layer was extracted with toluene. The combined organic layers were washed with water, and then dried over anhydrous magnesium sulfate. The solution was concentrated under reduced pressure, and the residue was purified by column chromatography with toluene as an eluent and silica gel as a stationary phase powder. The purified product was mixed with sodium benzenesulfonate dihydrate (6.1 g) and Solmix A-11 (100 ml). Then, 6N-hydrochloric acid (20 ml) was added, and the mixture was heated to reflux for 2 hours. The reaction mixture was treated with water, and the aqueous layer was extracted with toluene. The combined organic layers were washed with water, a saturated aqueous solution of sodium hydrogencarbonate and water, and then dried over anhydrous magnesium sulfate. The solvent was distilled off under reduced pressure, and the residue was purified by column chromatography with toluene as an eluent and silica gel as a stationary phase powder. The product was purified by recrystallization from a mixed solvent of ethyl acetate and Solmix A-11 (ethyl acetate:Solmix=1:4 by volume), and then by recrystallization from a mixed solvent of ethyl acetate and Solmix A-11 (ethyl acetate:Solmix=1:4 by volume) to give (E)-1-ethoxy-2,3-difluoro-4-(4-(trans-4-(4-propylphenyl) cyclohexyl) but-3-en-1-yl)benzene (No. 42) (4.6 g). The yield based on the compound (s13) was 41.9%.

Chemical shift (δ ppm; CDCl$_3$): 7.10 (m, 4H), 6.80 (td, 1H), 6.65 (td, 1H), 5.46-5.34 (m, 2H), 4.09 (q, 2H), 2.65 (t, 2H), 2.54 (t, 2H), 2.42 (tt, 1H), 2.27 (q, 2H), 2.00-1.86 (m, 3H), 1.83-1.77 (m, 2H), 1.63 (quin, 2H), 1.52-1.41 (m, 4H), 1.24-1.13 (m, 2H) and 0.94 (t, 3H).

The physical properties of the compound (No. 42) were as follows. Transition temperature: C, 64.8; N, 82.1; I. T$_{NI}$=79.9° C.; Δ∈=−4.06; Δn=0.136; η=34.8 mPa·s.

Example 3

Preparation of (E)-1-ethoxy-2,3-difluoro-4-(4-(trans-4-(4-butoxy-2,3-difluorophenyl)cyclohexyl)but-3-en-1-yl)benzene (No. 82)

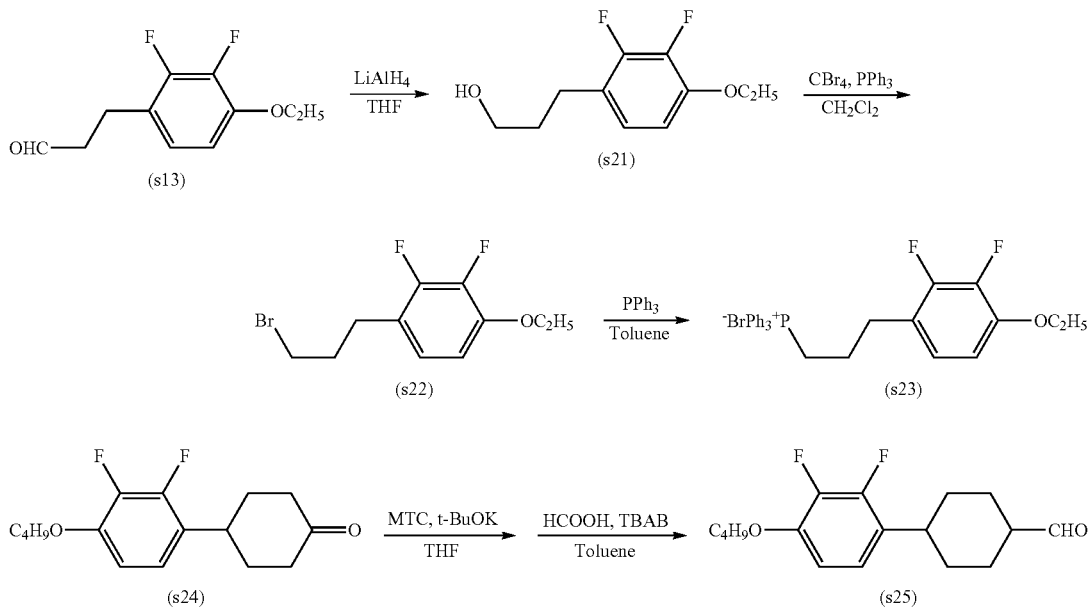

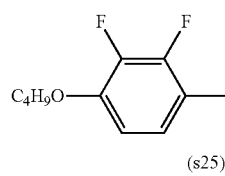
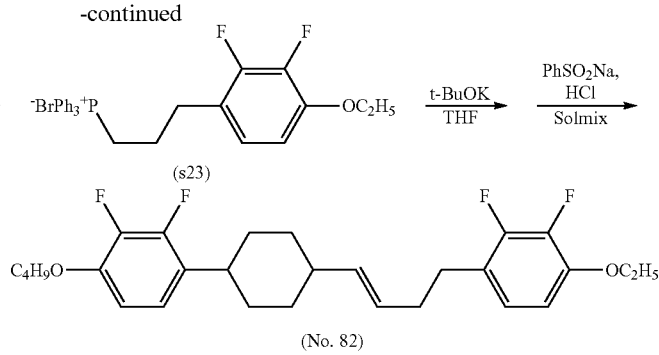

(No. 82)

First Step:

Lithium aluminum hydride (1.7 g) was suspended in THF (100 ml). 3-(4-Ethoxy-2,3-difluorophenyl)propanal (s13) (9.6 g) was added dropwise to the suspension in the temperature range of −20° C. to −10° C., and the mixture was stirred at the same temperature range for 2 hours. After the completion of reaction had been confirmed by means of GC analysis, ethyl acetate and a saturated aqueous solution of ammonia were added successively to the reaction mixture under ice-cooling, and the deposits were removed by filtration through Celite. The filtrate was extracted with ethyl acetate. The combined organic layers were washed successively with water and brine, and then dried over anhydrous magnesium sulfate. The products were purified by recrystallization from heptane to give 3-(4-ethoxy-2,3-difluorophenyl)propanol (s21) (9.4 g). The yield based on the compound (s13) was 97.0%.

Second Step:

3-(4-Ethoxy-2,3-difluorophenyl)propanol (s21) (9.4 g) and triphenylphosphine (17.1 g) were dissolved in methylene chloride (100 ml). Carbon tetrabromide (17.3 g) in methylene chloride (100 ml) solution was slowly added dropwise to the solution at room temperature, and the mixture was stirred at room temperature for another 3 hours. The reaction mixture was treated with a saturated aqueous solution of sodium hydrogencarbonate, and the aqueous layer was extracted with ethyl acetate. The combined organic layers were washed successively with water and brine, and dried over anhydrous magnesium sulfate. The solution was concentrated under reduced pressure to leave a residue, pale yellow solids. The residue was purified by column chromatography with heptane as an eluent and silica gel as a stationary phase powder to give 3-(4-ethoxy-2,3-difluorophenyl) bromopropane (s22) (11.5 g). The yield based on the compound (s21) was 94.8%.

Third Step:

3-(4-Ethoxy-2,3-difluorophenyl)bromopropane (s22) (11.5 g), toluene (100 ml) and triphenylphosphine (21.6 g) were placed in a reaction vessel under an atmosphere of nitrogen, and the mixture was heated to reflux for 5 hours. After the reaction mixture had been cooled to 25° C., the deposits were filtered, and the unreacted material was removed by washing with toluene three times. The resulting colorless solids were dried to give 3-(4-ethoxy-2,3-difluorophenyl)propyltriphenylphosphonium bromide (s23) (17.6 g). The yield based on the compound (s22) was 78.9%.

Fourth Step:

Well-dried methoxymethyltriphenylphosphonium chloride (43.6 g) was mixed with THF (300 ml) under an atmosphere of nitrogen, and cooled to −30° C. Potassium t-butoxide (t-BuOK; 14.3 g) was added in two portions in the temperature range of −30° C. to −20° C. After 30 minutes of stirring at −20° C., the compound (s24) (30.0 g) dissolved in THF (100 ml) was added dropwise in the temperature range of −30 to After 30 minutes of stirring at −10° C., the reaction mixture was treated with water, and the aqueous layer was extracted with toluene. The combined organic layers were washed with water, and then dried over anhydrous magnesium sulfate. The solution was concentrated under reduced pressure, and the residue was purified by column chromatography with a mixed solvent of heptane and toluene (heptane:toluene=1:1 by volume) as an eluent and silica gel as a stationary phase powder to give 1-(4-butoxy-2,3-difluorophenyl)-4-methoxymethylenecyclohexane. The compound was mixed with formic acid (87%; 30.0 ml), tetrabutylammonium bromide (10.3 g) and toluene (300 ml), and the mixture was heated to reflux for 2 hours. After the reaction mixture had been cooled to 30° C., it was treated with water, and the aqueous layer was extracted with toluene. The combined organic layers were washed with water, a saturated aqueous solution of sodium hydrogencarbonate and water, and then dried over anhydrous magnesium sulfate. The solvent was distilled off under reduced pressure, and the residue was purified by column chromatography with toluene as an eluent and silica gel as a stationary phase powder, and then by recrystallization from a mixed solvent of heptane and toluene (heptane:toluene=2:1 by volume) to give trans-4-(4-butoxy-2,3-difluorophenyl)-cyclohexanecarboxaldehyde (s25) (26.9 g). The yield based on the compound (s24) was 85.4%.

Fifth Step:

Well-dried 3-(4-ethoxy-2,3-difluorophenyl)propyl triphenylphosphonium bromide (s23) (6.6 g) was mixed with THF (100 ml) under an atmosphere of nitrogen, and the solution was cooled to −10° C. Potassium t-butoxide (t-BuOK; 1.4 g) was added in two portions in the temperature range of −10° C. to −5° C. After 60 minutes of stirring at −10° C., the compound (s25) (3.0 g) dissolved in THF (30 ml) was added dropwise in the temperature range of −10 to −5° C. After 30 minutes of stirring at 0° C., the reaction mixture was treated with water, and the aqueous layer was extracted with toluene. The combined organic layers were washed with water, and then dried over anhydrous magnesium sulfate. The solution was concentrated under reduced pressure, and the residue was purified by column chromatography with toluene as an eluent and silica gel as a stationary phase powder. The purified product was mixed with sodium benzenesulfonate dihydrate (6.1 g) and Solmix A-11 (100 ml). Then, 6N-hydrochloric acid (20 ml) was added, and the mixture was heated to reflux for 2 hours. The reaction mixture was treated with water, and the aqueous layer was extracted with toluene (100 ml). The combined organic layers were washed with water, a saturated aqueous solution of sodium hydrogencarbonate and water, and then dried over anhydrous magnesium sulfate. The solvent was distilled off under reduced pressure, and the residue was purified by column chromatography with toluene as an eluent and silica gel as a stationary phase powder, and then by recrystallization from a mixed solvent of ethyl acetate and Solmix A-11 (ethyl acetate:Solmix=1:4 by volume) to give (E)-1-ethoxy-2,3-difluoro-4-(4-(trans-4-(4-ethoxy-2,3-difluorophenyl)cyclohexyl)but-3-en-1-yl)benzene (No. 82) (4.6 g). The yield based on the compound (s13) was 41.9%.

Chemical shift (δ ppm; CDCl$_3$): 6.82 (m, 2H), 6.66 (m, 2H), 5.46-5.33 (m, 2H), 4.09 (q, 2H), 4.02 (t, 2H), 2.72 (tt, 1H), 2.65 (t, 2H), 2.27 (q, 2H), 1.94 (m, 1H), 1.88-1.75 (m, 6H), 1.54-1.41 (m, 7H), 1.26-1.16 (m, 2H) and 0.97 (t, 3H).

The physical properties of the compound (No. 82) were as follows. Transition temperature: C, 63.8; N, 90.8; I. $T_{NI}$=87.9° C.; Δ∈=−7.79; Δn=0.141; η=69.6 mPa·s.

Example 4

Preparation of (E)-2',3'-difluoro-4'-(4-(trans-4-propylcyclohexyl)but-3-en-1-yl)-4-vinyl-2,3,4,5-tetrahydro-1,1'-biphenyl (No. 102)

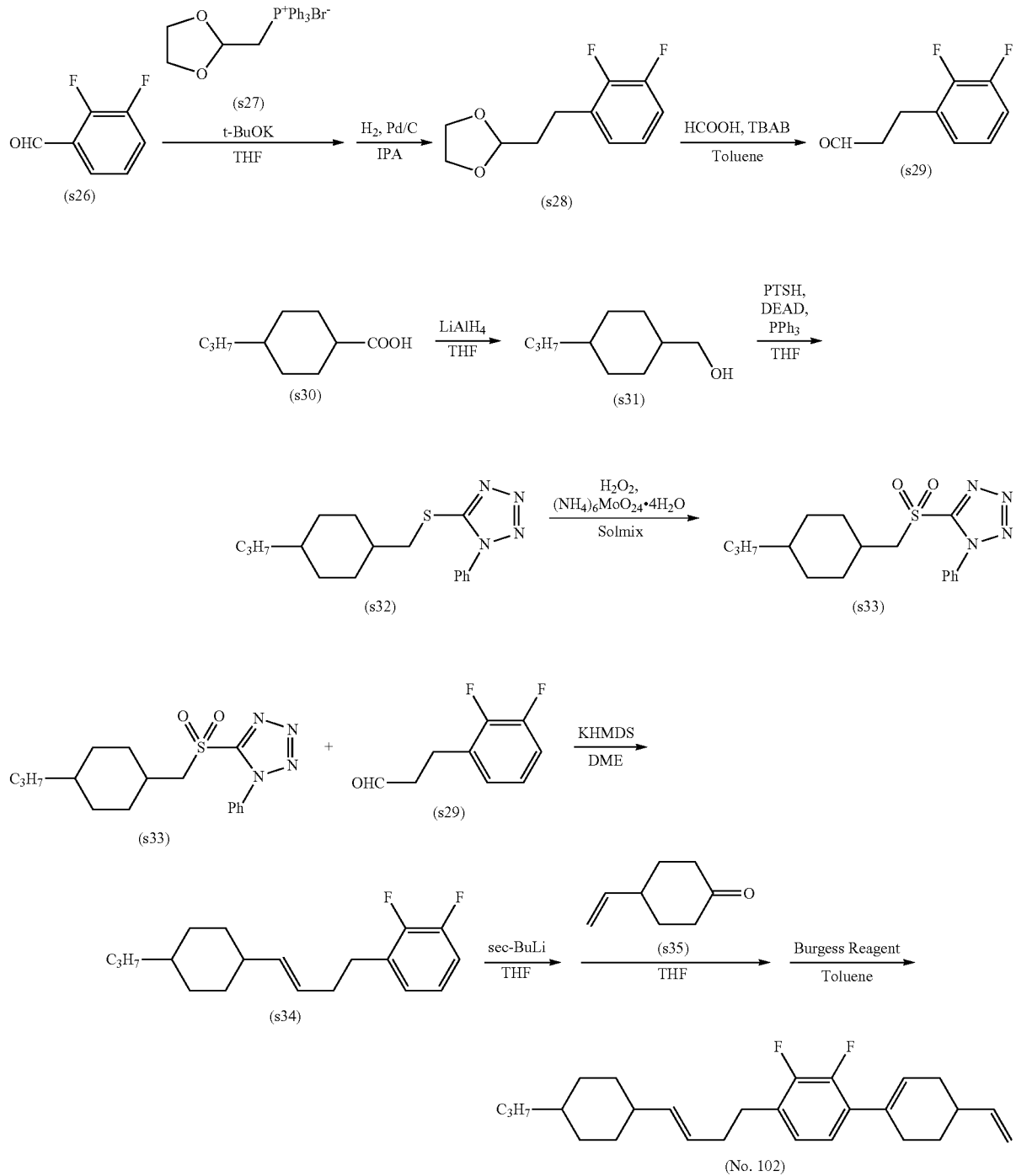

First Step:
Well-dried (1,3-dioxolan-2-yl)methyltriphenyl phosphonium bromide (s27) (108.8 g) was mixed with THF (500 ml) under an atmosphere of nitrogen, and cooled to −10° C. Potassium t-butoxide (t-BuOK; 28.4 g) was added in two portions in the temperature range of −10° C. to −5° C. After 60 minutes of stirring at −10° C., 2,3-difluorobenzaldehyde (s26) (30.0 g) dissolved in THF (30 ml) was added dropwise in the temperature range of −10 to −5° C. After 30 minutes of stirring at 0° C., the reaction mixture was treated with water, and the aqueous layer was extracted with toluene. The combined organic layers were washed with water, and then dried over anhydrous magnesium sulfate. The solution was concentrated under reduced pressure, and the residue was purified by column chromatography with toluene as an eluent and silica gel as a stationary phase powder. The purified product was dissolved in a mixed solvent of toluene (250 ml) and Solmix A-11 (250 ml), to which Pd/C (1.5 g) was added. The mixture was stirred at room temperature under a hydrogen atmosphere until hydrogen absorption had ceased. After the reaction had been completed, Pd/C was removed, and then solvent was distilled off. The residue was purified by column chromatography with toluene as an eluent and silica gel as a stationary phase powder, and then by recrystallization from heptane to give 2-(2,3-difluorophenethyl)-1,3-dioxolane (s28) (37.9 g). The yield based on the compound (s26) was 83.8%.

Second Step:
The compound (s28) (68.0 g), formic acid (87%; 60.0 ml) and toluene (200 ml) were mixed, and the mixture was heated to reflux for 2 hours. After the reaction mixture had been cooled to 30° C., it was treated with water, and the aqueous layer was extracted with toluene (500 ml). The combined organic layers were washed with water, a saturated aqueous solution of sodium hydrogencarbonate and water, and then dried over anhydrous magnesium sulfate. The solvent was distilled off under reduced pressure, and the residue was purified by column chromatography with toluene as an eluent and silica gel as a stationary phase powder, and then by recrystallization from heptane to give 1-(4-propylphenyl)-cyclohexan-4-one (s29) (54.0 g). The yield based on the compound (s28) was 95.6%.

Third Step:
Lithium aluminum hydride (33.4 g) was suspended in THF (500 ml). trans-4-Propylcyclohexylcarboxylic acid (s30) (50.0 g) was added dropwise to the suspension in the temperature range of −20° C. to −10° C., and the mixture was stirred at the same temperature range for 2 hours. After the completion of reaction had been confirmed by means of GC analysis, ethyl acetate and a saturated aqueous solution of ammonia were added successively to the reaction mixture under ice-cooling, and the deposits were removed by filtration through Celite. The filtrate was extracted with ethyl acetate. The combined organic layers were washed successively with water and brine, and then dried over anhydrous magnesium sulfate. The products were purified by recrystallization from heptane to give trans-4-propyl cyclohexylmethanol (s31) (45.0 g). The yield based on the compound (s30) was 98.1%.

Fourth Step:
The compound (s31) (45.0 g), 1-phenyl-5-mercapto-1H-tetrazole (PTSH; 56.5 g) and triphenylphosphine (PPh$_3$; 83.1 g) were mixed with THF (300 ml) under an atmosphere of nitrogen, and the mixture was cooled to 0° C. Diethyl azodicarboxylate (DEAD; 40%-toluene solution; 144.0 g) was added dropwise in the temperature range of 0° C. to 5° C. After the completion of the reaction had been confirmed by means of LC analysis, the reaction mixture was treated with water, and the aqueous layer was extracted with toluene. The combined organic layers were washed with water, and then dried over anhydrous magnesium sulfate. The solution was concentrated under reduced pressure, and the residue was purified by column chromatography with toluene as an eluent and silica gel as a stationary phase powder to give 1-phenyl-5-(trans-4-propylcyclohexyl methylthio)-1H-tetrazole (s32) (87.6 g). The yield based on the compound (s31) was 96.1%.

Fifth Step:
The compound (s32) (87.6 g) was mixed with Solmix A-11 (300 ml) under an atmosphere of nitrogen. Hexaammonium heptamolybdate tetrahydrate (17.1 g) dissolved in aqueous solution of hydrogen peroxide (30%; 251 ml) was added dropwise in the temperature range of 35° C. to 40° C. The mixture was stirred at the same temperature range for 8 hours. After the completion of the reaction had been confirmed by means of LC analysis, it was treated with water, and the aqueous layer was extracted with toluene. The combined organic layers were washed with an aqueous solution of sodium hydrogen sulfite, water, and then dried over anhydrous magnesium sulfate. The solution was concentrated under reduced pressure, and the residue was purified by column chromatography with toluene as an eluent and silica gel as a stationary phase powder to give 1-phenyl-5-(trans-4-propylcyclohexylmethylsulfonyl)-1H-tetrazole (s33) (73.0 g). The yield based on the compound (s32) was 75.7%.

Sixth Step:
The compound (s29) (24.6 g) and the compound (s33) (10.0 g) were mixed with dimethoxyethane (DME; 100 ml) under an atmosphere of nitrogen, and the solution was cooled to −60° C. Potassium hexamethyldisilazide (KHMDS; 0.91 M; in THF; 97.0 ml) was added dropwise in the temperature range of −60° C. to −55° C. After 2 hours of stirring at −60° C., the reaction mixture was allowed to come to room temperature, and the stirring was continued for another 8 hours. After the completion of the reaction had been confirmed by means of LC analysis, the reaction mixture was treated with water, and the aqueous layer was extracted with toluene. The combined organic layers were washed with water, and then dried over anhydrous magnesium sulfate. The solution was concentrated under reduced pressure, and the residue was purified by column chromatography with heptane as an eluent and silica gel as a stationary phase powder to give (E)-1,2-difluoro-3-(4-(trans-4-propylcyclohexyl)but-3-en-1-yl)benzene (s34) (6.3 g). The yield based on the compound (s29) was 36.7%.

Seventh Step:
The compound (s34) (3.3 g) and THF (100 ml) were placed in a reaction vessel under an atmosphere of nitrogen, and cooled to −74° C. sec-Butyllithium (1.00 M; in n-hexane-cyclohexane; 13 ml) was added dropwise in the temperature range of −74° C. to −70° C., and the stirring was continued for another 2 hours. Then, trans-4-vinyl cyclohexanone (s34) (1.7 g) in THF (20 ml) solution was added dropwise in the temperature range of −75° C. to −70° C., and the stirring was continued for another 8 hours while the mixture was allowed to come to 25° C. The reaction mixture was treated with an aqueous solution of ammonium chloride, and the aqueous layer was extracted with ethyl acetate. The combined organic layers were washed with water, a saturated aqueous solution of sodium hydrogencarbonate and water, and then dried over anhydrous magnesium sulfate. The solvent was distilled off under reduced pressure, and the residue was mixed with (methoxycarbonylsulfamoyl)triethylammonium hydroxide, inner salt (Burgess reagent; 2.8 g) and toluene (100 ml). The mixture was stirred at 50° C. for 2 hours. After the reaction mixture had been cooled to 30° C., it was treated with water, and the aqueous layer was extracted with toluene. The combined organic layers were washed with a saturated aqueous solution of sodium hydrogencarbonate and water, and then dried over anhydrous magnesium sulfate. The solution was concentrated under reduced pressure, and the residue was purified by column chromatography with heptane as an eluent and silica gel as a stationary phase powder, and then by recrystallization from Solmix A-11 to give (E)-2',3'-difluoro-4'-(4-(trans-4-propyl cyclohexyl)but-3-en-1-yl)-4-vinyl-2,3,4,5-tetrahydro-1,1'-biphenyl (No. 102) (1.4 g). The yield based on the compound (s33) was 31.1%.

Chemical shift (δ ppm; CDCl$_3$): 6.85 (m, 2H), 5.94 (m, 1H), 5.88 (m, 1H), 5.36 (m, 2H), 5.06 (d, 1H), 4.98 (d, 1H), 2.67 (t, 2H), 2.53-2.42 (m, 1H), 2.42-2.29 (m, 3H), 2.26 (q, 2H), 2.05 (m, 1H), 1.96-1.87 (m, 1H), 1.86-1.76 (m, 1H), 1.72 (d, 2H), 1.66 (d, 2H), 1.53 (m, 1H), 1.29 (m, 2H), 1.14 (m, 3H), 1.00 (m, 2H) and 0.87 (m, 5H).

The physical properties of the compound (No. 102) were as follows. Transition temperature: C, 20.2; N, 77.4; I. $T_{NI}$=71.9° C.; $\Delta\varepsilon$=-2.06; $\Delta n$=0.128; $\eta$=23.6 mPa·s.

Example 5

Preparation of (E)-4'-ethoxy-2',3'-difluoro-4-(4-(trans-4-propylcyclohexyl)but-3-en-1-yl)-2,3,4,5-tetrahydro-1,1'-biphenyl (No. 38)

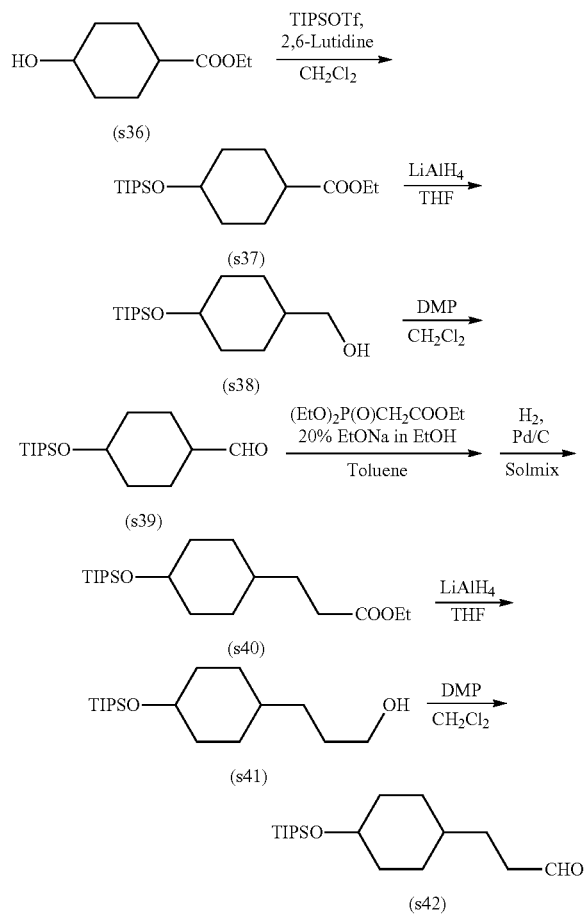

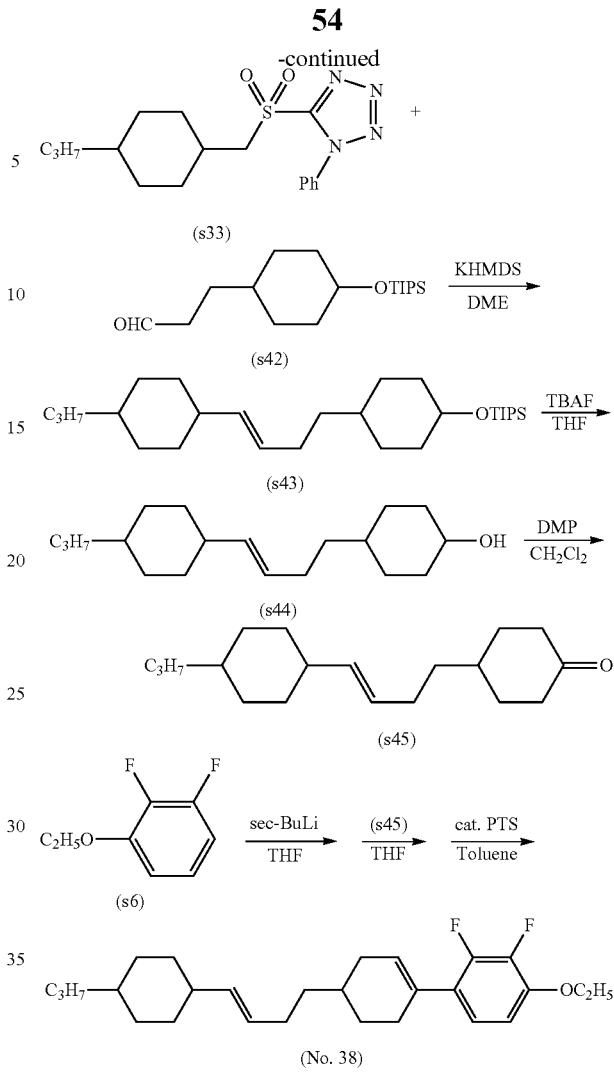

First Step:

Ethyl 4-hydroxycyclohexylcarboxylate (s36) (26.0 g), 2,6-lutidine (23.3 g) and methylene chloride (200 ml) were placed in a reaction vessel under an atmosphere of nitrogen, and cooled to 0° C. Triisopropylsilyl trifluoromethanesulfonate (50 g) was added dropwise in the temperature range of 0° C. to 5° C. After 1 hour of stirring at 0° C., the reaction mixture was allowed to come to room temperature, and the stirring was continued for another 8 hours. Methanol was added to the reaction mixture to terminate the reaction. The reaction mixture was treated with water, and the aqueous layer was extracted with toluene. The combined organic layers were washed with water three times, and then dried over anhydrous magnesium sulfate. The solution was concentrated under reduced pressure, and the residue was purified by column chromatography with toluene as an eluent and silica gel as a stationary phase powder to give ethyl 4-triisopropylsilyloxy-cyclohexylcarboxylate (37) (43.4 g). The yield based on the compound (s36) was 87.5%.

Second Step:

Lithium aluminum hydride (6.0 g) was suspended in THF (200 ml). Ethyl 4-triisopropylsilyloxycyclohexylcarboxylate (37) (43.4 g) was added dropwise to the suspension in the temperature range of −20° C. to −10° C., and the mixture was stirred at the same temperature range for 2 hours. After the completion of reaction had been confirmed by means of GC analysis, ethyl acetate and a saturated aqueous solution of ammonia were added successively to the reaction mixture under ice-cooling, and the deposits were removed by filtration through Celite. The filtrate was extracted with ethyl acetate. The combined organic layers were washed successively with water and brine, and dried over anhydrous magnesium sulfate. Distillation of the solvent under reduced pressure gave 4-triisopropylsilyloxycyclohexyl methanol (s38) (37.1 g). The yield based on the compound (s37) was 97.9%.

Third Step:

4-Triisopropylsilyloxycyclohexylmethanol (s38) (37.1 g) and methylene chloride (200 ml) were placed in a reaction vessel under an atmosphere of nitrogen, and cooled to 0° C. Dess-Martin periodinane (DMP; 60.4 g) was added in the temperature range of 0° C. to 5° C. After 1 hour of stirring at 0° C., the reaction mixture was allowed to come to room temperature, and the stirring was continued for another 8 hours. Celite was added to the reaction mixture, and unnecessary materials were removed. The solution was concentrated under reduced pressure, and the residue was purified by column chromatography with toluene as an eluent and silica gel as a stationary phase powder to give 4-triisopropylsilyloxycyclohexylcarboxaldehyde (s39) (36.3 g). The yield based on the compound (s38) was 98.7%.

Fourth Step:

4-Triisopropylsilyloxycyclohexylcarboxaldehyde (s39) (36.3 g), ethyl diethylphosphonoacetate (34.3 g) and toluene (200 ml) were placed in a reaction vessel under an atmosphere of nitrogen, and cooled to 0° C. Sodium ethoxide in ethanol solution (20%; 52.1 g) was added at the same temperature, and the stirring was continued for another 2 hours. After the reaction mixture had been returned to 25° C., the stirring was continued for another 2 hours. The reaction mixture was treated with water, and the aqueous layer was extracted with toluene. The combined organic layers were washed with water, and then dried over anhydrous magnesium sulfate. The solution was concentrated under reduced pressure, and the residue was purified by column chromatography with a mixed solvent of toluene and heptane (toluene:heptane=2:1 by volume) as an eluent and silica gel as a stationary phase powder. The purified product was dissolved in Solmix A-11 (150 ml), to which Pd/C (1.8 g) was added. The mixture was stirred at room temperature under a hydrogen atmosphere until hydrogen absorption had ceased. After the reaction had been completed, Pd/C was removed, and then solvent was distilled off. The residue was purified by column chromatography with toluene as an eluent and silica gel as a stationary phase powder to give ethyl 4-triisopropylsilyloxycyclohexylpropionete (s40) (21.3 g). The yield based on the compound (s39) was 42.2%.

Fifth Step:

Lithium aluminum hydride (2.7 g) was suspended in THF (200 ml). Ethyl 4-triisopropylsilyloxycyclohexylpropionate (s40) (21.3 g) was added dropwise to the suspension in the temperature range of −20° C. to −10° C., and the mixture was stirred at the same temperature range for 2 hours. After the completion of reaction had been confirmed by means of GC analysis, ethyl acetate and a saturated aqueous solution of ammonia were added successively to the reaction mixture under ice-cooling, and the deposits were removed by filtration through Celite. The filtrate was extracted with ethyl acetate. The combined organic layers were washed successively with water and brine, and dried over anhydrous magnesium sulfate. Distillation of the solvent under reduced pressure gave 4-triisopropylsilyloxycyclohexyl propanol (s41) (18.3 g). The yield based on the compound (s40) was 97.40.

Sixth Step:

4-Triisopropylsilyloxycyclohexylpropanol (s41) (18.3 g) and methylene chloride (200 ml) were placed in a reaction vessel under an atmosphere of nitrogen, and cooled to 0° C. Dess-Martin periodinane (DMP; 32.0 g) was added in the temperature range of 0° C. to 5° C. After 1 hour of stirring at 0° C., the reaction mixture was allowed to come to room temperature, and the stirring was continued for another 8 hours. Celite was added to the reaction mixture, and unnecessary materials were removed. The solution was concentrated under reduced pressure, and the residue was purified by column chromatography with toluene as an eluent and silica gel as a stationary phase powder to give 4-triisopropylsilyloxycyclohexylethyl carboxaldehyde (s42) (13.6 g). The yield based on the compound (s41) was 74.8%.

Seventh Step:

The compound (s33) (19.7 g) and the compound (s42) (13.6 g) were mixed with dimethoxyethane (DME; 100 ml) under an atmosphere of nitrogen, and the solution was cooled to −60° C. Potassium hexamethyldisilazide (KHMDS; 0.91 M; in THF; 77.0 ml) was added dropwise in the temperature range of −60° C. to −55° C. After 2 hours of stirring at −60° C., the reaction mixture was allowed to come to room temperature, and the stirring was continued for another 8 hours. After the completion of the reaction had been confirmed by means of GC analysis, the reaction mixture was treated with water, and the aqueous layer was extracted with toluene. The combined organic layers were washed with water, and then dried over anhydrous magnesium sulfate. The solution was concentrated under reduced pressure, and the residue was purified by column chromatography with heptane as an eluent and silica gel as a stationary phase powder to give (E)-4-(4-(trans-4-propylcyclohexyl)but-3-en-1-yl)triisopropyl silyloxycyclohexane (s43) (8.3 g). The yield based on the compound (s42) was 43.9%.

Eighth Step:

(E)-(4-(trans-4-Propylcyclohexyl)but-3-en-1-yl)-4-triisopropylsilyloxycyclohexane (s43) (8.3 g) and THF (50 ml) were placed in a reaction vessel under an atmosphere of nitrogen, and cooled to 0° C. Tetrabutylammonium fluoride (TBAF; 1.0 M; in THF; 38.0 ml) was added in the temperature range of 0° C. to 5° C. After 1 hour of stirring at 0° C., the reaction mixture was allowed to come to room temperature, and the stirring was continued for another 8 hours. After the completion of the reaction had been confirmed by means of GC analysis, the reaction mixture was treated with water, and the aqueous layer was extracted with ethyl acetate. The combined organic layers were washed with water, and then dried over anhydrous magnesium sulfate. The solution was concentrated under reduced pressure, and the residue was purified by column chromatography with toluene as an eluent and silica gel as a stationary phase powder to give (E)-4-(4-(trans-4-propylcyclohexyl)but-3-en-1-yl)cyclohexanol (s44) (4.7 g). The yield based on the compound (s43) was 88.4%.

Ninth Step:

(E)-4-(4-(trans-4-Propylcyclohexyl)but-3-en-1-yl)cyclohexanol (s44) (4.7 g) and methylene chloride (100 ml) were placed in a reaction vessel under an atmosphere of nitrogen, and cooled to 0° C. Dess-Martin periodinane (DMP; 9.3 g) was added in the temperature range of 0° C. to 5° C. After 1 hour of stirring at 0° C., the reaction mixture was allowed to come to room temperature, and the stirring was continued for another 8 hours. Celite was added to the reaction mixture, and unnecessary materials were removed. The solution was concentrated under reduced pressure, and the residue was purified by column chromatography with toluene as an eluent and silica gel as a stationary phase powder to give (E)-4-(4-(trans- 4-propylcyclohexyl)but-3-en-1-yl)cyclohexanone (s45) (4.6 g). The yield based on the compound (s44) was 98.6%.

Tenth Step:

The compound (s33) (2.6 g) and THF (50 ml) were placed in a reaction vessel under an atmosphere of nitrogen, and cooled to −74° C. sec-Butyllithium (1.00 M; in n-hexane-cyclohexane; 18.0 ml) was added dropwise in the temperature range of −74° C. to −70° C., and the stirring was continued for another 2 hours. Then, (E)-4-(4-(trans-4-propylcyclohexyl)but-3-en-1-yl)cyclohexanone (s45) (4.6 g) in THF (20 ml) solution was added dropwise in the temperature range of −75° C. to −70° C., and the stirring was continued for another 8 hours while the mixture was allowed to come to 25° C. The reaction mixture was treated with an aqueous solution of ammonium chloride, and the aqueous layer was extracted with ethyl acetate. The combined organic layers were washed with water, a saturated aqueous solution of sodium hydrogencarbonate and water, and then dried over anhydrous magnesium sulfate. The solvent was distilled off under reduced pressure, and the residue was mixed with p-toluenesulfonic acid (p-TsOH, 0.14 g) and toluene (50 ml). The mixture was heated to reflux for 2 hours. After the reaction mixture had been cooled to 30° C., it was treated with water, and the aqueous layer was extracted with toluene. The combined organic layers were washed with a saturated aqueous solution of sodium hydrogencarbonate and water, and then dried over anhydrous magnesium sulfate. The solution was concentrated under reduced pressure, and the residue was purified by column chromatography with a mixed solvent of heptane and toluene (heptane:toluene=1:1 by volume) as an eluent and silica gel as a stationary phase powder. The product was purified by recrystallization from Solmix A-11 to give (E)-4'-ethoxy-2',3'-difluoro-4-(4-(trans-4-propylcyclohexyl)but-3-en-1-yl)-2,3,4,5-tetrahydro-1,1'-biphenyl (No. 38) (2.2 g). The yield based on the compound (s33) was 31.8%.

Chemical shift (δ ppm; CDCl$_3$): 6.86 (td, 1H), 6.65 (td, 1H), 5.89 (m, 1H), 5.37 (m, 2H), 4.10 (q, 2H), 2.45-2.25 (m, 3H), 2.04 (m, 2H), 1.90-1.77 (m, 3H), 1.72 (m, 4H), 1.61 (m, 1H), 1.44 (t, 3H), 1.41-1.24 (m, 5H), 1.19-1.11 (m, 3H), 1.10-1.00 (m, 2H), 0.90 (td, 2H) and 0.87 (t, 3H).

The physical properties of the compound (No. 38) were as follows. Transition temperature: C, 75.8; N, 119.6; I. $T_{NI}$=115.3° C.; $\Delta\epsilon$=−4.99; $\Delta n$=0.136; η=41.6 mPa·s.

Example 6

Preparation of (E)-4-ethoxy-2,3-difluoro-4'-(4-(trans-4-propyl cyclohex-3-en-1-yl)but-3-en-1-yl)-1,1'-biphenyl (No. 152)

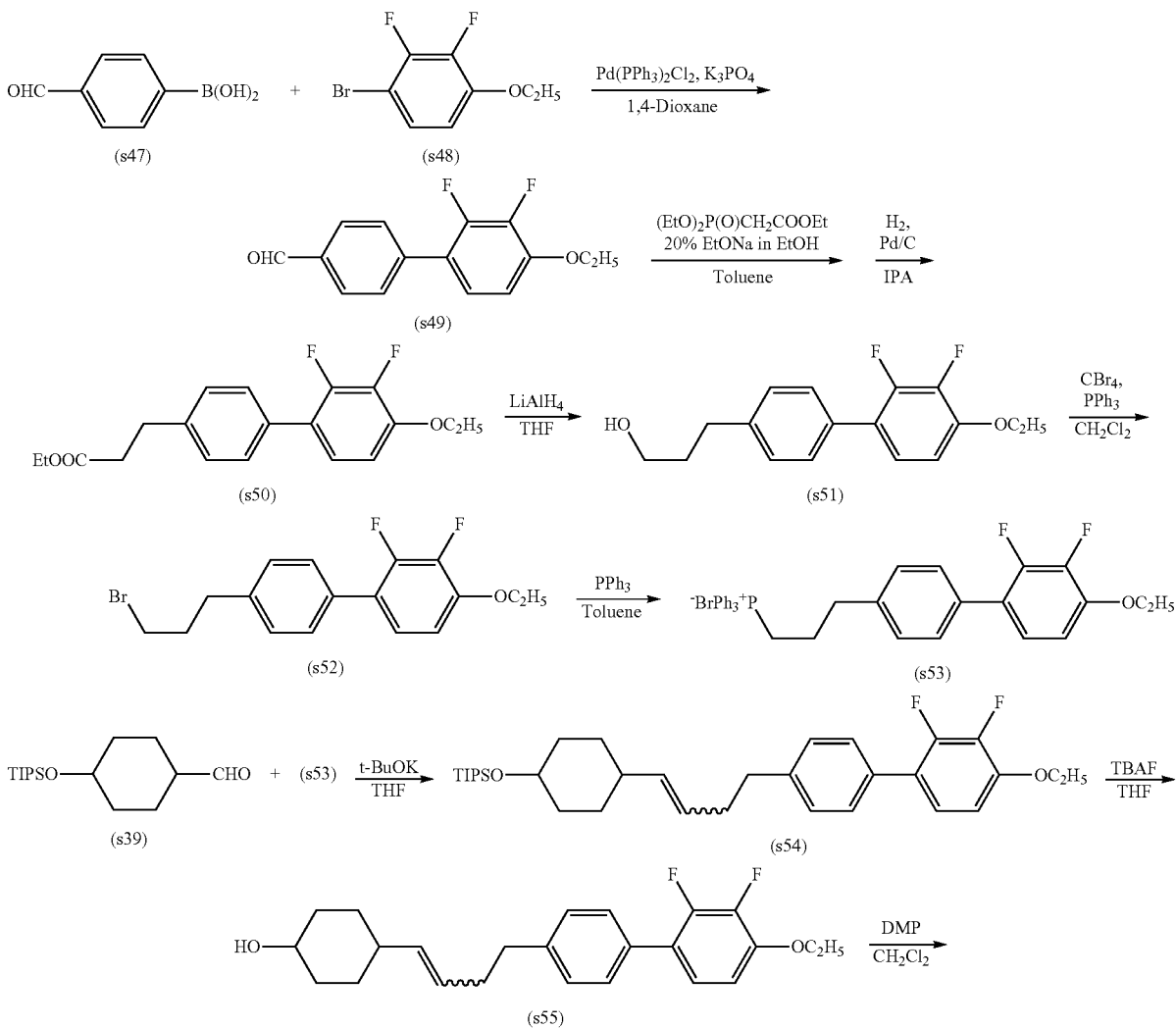

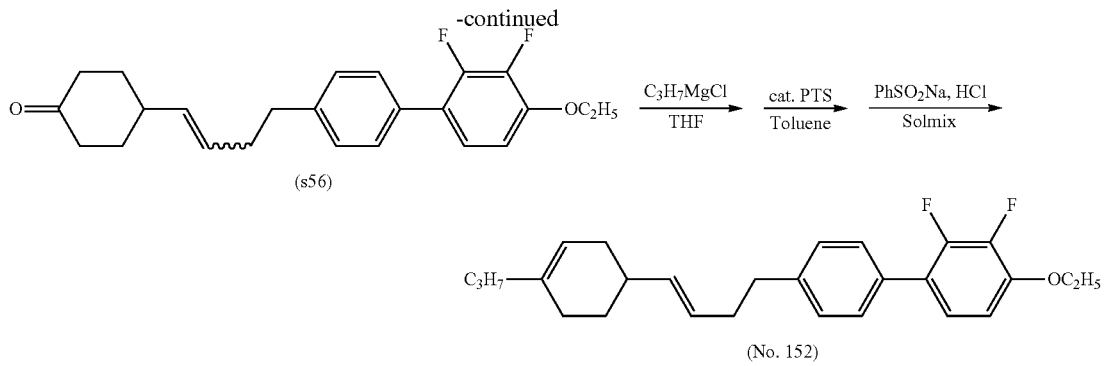

(s56)

(No. 152)

First Step:

4-Formylphenylboronic acid (s47) (75.9 g), 4-bromo-2,3-difluoroethoxybenzene (s48) (100.0 g), potassium phosphate (269.0 g), dichlorobistriphenylphosphinepalladium (II) (Pd (Ph$_3$P)$_2$Cl$_2$; 8.9 g) and 1,4-dioxane (500 ml) were placed in a reaction vessel under an atmosphere of nitrogen, and the mixture was heated to reflux for 2 hours. After the reaction mixture had been cooled to 25° C., it was treated with water, and the aqueous layer was extracted with toluene. The combined organic layers were washed with water, and then dried over anhydrous magnesium sulfate. The solution was concentrated under reduced pressure, and the residue was purified by column chromatography with toluene as an eluent and silica gel as a stationary phase powder. The product was purified by recrystallization from a mixed solvent of heptane and toluene (heptane:toluene=1:1 by volume) to give 4-ethoxy-4'-formyl-2,3-difluoro-1,1'-biphenyl (s49) (102.8 g). The yield based on the compound (s48) was 92.9%.

Second Step:

4-Ethoxy-4'-formyl-2,3-difluoro-1,1'-biphenyl (s49) (30.0 g), ethyl diethylphosphonoacetate (30.8 g) and toluene (200 ml) were placed in a reaction vessel under an atmosphere of nitrogen, and cooled to 0° C. Sodium ethoxide in ethanol solution (20%; 46.7 g) was added at the same temperature, and the stirring was continued for another 2 hours. After the reaction mixture had been returned to 25° C., the stirring was continued for another 2 hours. The reaction mixture was treated with water, and the aqueous layer was extracted with toluene. The combined organic layers were washed with water, and then dried over anhydrous magnesium sulfate. The solution was concentrated under reduced pressure, and the residue was purified by column chromatography with a mixed solvent of toluene and heptane (toluene:heptane=2:1 by volume) as an eluent and silica gel as a stationary phase powder. The purified product was dissolved in 2-propanol (150 ml), to which Pd/C (1.5 g) was added. The mixture was stirred at room temperature under a hydrogen atmosphere until hydrogen absorption had ceased. After the reaction had been completed, Pd/C was removed, and then solvent was distilled off. The residue was purified by column chromatography with toluene as an eluent and silica gel as a stationary phase powder to give ethyl 3-(4'-ethoxy-2',3'-difluoro-(1,1'-biphenyl)-4-yl)propionate (s50) (28.9 g). The yield based on the compound (s49) was 75.6%.

Third Step:

Lithium aluminum hydride (3.3 g) was suspended in THF (200 ml). The compound (s50) (28.9 g) was added dropwise to the suspension in the temperature range of −20° C. to −10° C., and the mixture was stirred at the same temperature range for 2 hours. After the completion of reaction had been confirmed by means of GC analysis, ethyl acetate and a saturated aqueous solution of ammonia were added successively to the reaction mixture under ice-cooling, and the deposits were removed by filtration through Celite. The filtrate was extracted with ethyl acetate. The combined organic layers were washed successively with water and brine, and then dried over anhydrous magnesium sulfate. The products were purified by recrystallization from heptane to give 3-(4'-ethoxy-2',3'-difluoro-(1,1'-biphenyl)-4-yl)propanol (s51) (25.0 g). The yield based on the compound (s50) was 98.9%.

Fourth Step:

The compound (s51) (25.0 g) and triphenylphosphine (33.6 g) were dissolved in methylene chloride (200 ml). Carbon tetrabromide (34.0 g) in methylene chloride (100 ml) solution was slowly added dropwise to the solution at room temperature, and the mixture was stirred at room temperature for another 3 hours. The reaction mixture was treated with a saturated aqueous solution of sodium hydrogencarbonate, and the aqueous layer was extracted with ethyl acetate. The combined organic layers were washed successively with water and brine, and dried over anhydrous magnesium sulfate. The solution was concentrated under reduced pressure to leave a residue, pale yellow solids. The residue was purified by column chromatography with a mixed solvent of heptane and toluene (heptane:toluene=1:1 by volume) as an eluent and silica gel as a stationary phase powder to give 3-(4'-ethoxy-2',3'-difluoro-(1,1'-biphenyl)-4-yl)bromopropane (s52) (28.3 g). The yield based on the compound (s51) was 93.5%.

Fifth Step:

The compound (s52) (28.3 g), toluene (100 ml) and triphenylphosphine (41.8 g) were placed in a reaction vessel under an atmosphere of nitrogen, and the mixture was heated to reflux for 5 hours. After the reaction mixture had been cooled to 25° C., the deposits were filtered, and the unreacted material was removed by washing with toluene three times. The resulting colorless solids were dried to give 3-(4'-ethoxy-2',3'-difluoro-(1,1'-biphenyl)-4-yl)propyltriphenylphosphonium bromide (s53) (48.3 g). The yield based on the compound (s52) was 98.0%.

Sixth Step:

Well-dried compound (s53) (16.4 g) was mixed with THF (100 ml) under an atmosphere of nitrogen, and the solution was cooled to −10° C. Potassium t-butoxide (t-BuOK; 2.9 g) was added in the temperature range of −10° C. to −5° C. After 60 minutes of stirring at −10° C., the compound (s39) (6.7 g) dissolved in THF (30 ml) was added dropwise in the temperature range of −10 to −5° C. After 30 minutes of stirring at 0° C., the reaction mixture was treated with water, and the aqueous layer was extracted with toluene. The combined organic layers were washed with water, and then dried over anhydrous magnesium sulfate. The solution was concentrated under reduced pressure, and the residue was purified by column chromatography with toluene as an eluent and silica gel as a stationary phase powder to give triisopropylsilyloxy-4-(4-(4'-ethoxy-2',3'-difluoro-1,1'-biphenyl-4-yl)but-1-en-1-yl)cyclohexane (s54) (10.5 g). The yield based on the compound (s39) was 82.1%.

Seventh Step:

The compound (s54) (10.5 g) and THF (100 ml) were placed in a reaction vessel under an atmosphere of nitrogen, and cooled to 0° C. Tetrabutylammonium fluoride (TBAF; 1.0 M; in THF; 39.0 ml) was added in the temperature range of 0° C. to 5° C. After 1 hour of stirring at 0° C., the reaction mixture was allowed to come to room temperature, and the stirring was continued for another 8 hours. After the completion of the reaction had been confirmed by means of GC analysis, the reaction mixture was treated with water, and the aqueous layer was extracted with ethyl acetate. The combined organic layers were washed with water, and then dried over anhydrous magnesium sulfate. The solution was concentrated under reduced pressure, and the residue was purified by column chromatography with a mixed solvent of ethyl acetate and toluene (ethyl acetate:toluene=10:1 by volume) as an eluent and silica gel as a stationary phase powder to give 4-(4-(4'-ethoxy-2',3'-difluoro-1,1'-biphenyl-4-yl) but-1-en-1-yl)cyclohexanol (s55) (7.4 g). The yield based on the compound (s54) was 99.0%.

Eighth Step:

The compound (s55) (7.4 g) and methylene chloride (100 ml) were placed in a reaction vessel under an atmosphere of nitrogen, and cooled to 0° C. Dess-Martin periodinane (DMP; 9.7 g) was added in the temperature range of 0° C. to 5° C. After 1 hour of stirring at 0° C., the reaction mixture was allowed to come to room temperature, and the stirring was continued for another 8 hours. Celite was added to the reaction mixture, and unnecessary materials were removed. The solution was concentrated under reduced pressure, and the residue was purified by column chromatography with toluene as an eluent and silica gel as a stationary phase powder to give 4-(4-(4'-ethoxy-2',3'-difluoro-1,1'-biphenyl-4-yl)but-1-en-1-yl)cyclohexanone (s56) (7.2 g). The yield based on the compound (s55) was 97.8%.

Ninth Step:

n-Propylmagnesium chloride (2.0 M; in diethyl ether; 14 ml) and THF (50 ml) were placed in a reaction vessel under an atmosphere of nitrogen, and cooled to 0° C. The compound (s56) (7.2 g) in THF (20 ml) solution was added dropwise in the temperature range of 0° C. to 5° C., and the stirring was continued for another 8 hours while the mixture was allowed to come to 25° C. The reaction mixture was treated with an aqueous solution of ammonium chloride, and the aqueous layer was extracted with ethyl acetate. The combined organic layers were washed with water, a saturated aqueous solution of sodium hydrogencarbonate and water, and then dried over anhydrous magnesium sulfate. The solvent was distilled off under reduced pressure, and the residue was mixed with p-toluenesulfonic acid (p-TsOH, 0.22 g) and toluene (100 ml). The mixture was heated to reflux for 2 hours. After the reaction mixture had been cooled to 30° C., it was treated with water, and the aqueous layer was extracted with toluene. The combined organic layers were washed with a saturated aqueous solution of sodium hydrogencarbonate and water, and then dried over anhydrous magnesium sulfate. The solvent was distilled off under reduced pressure, and the residue was mixed with sodium benzenesulfonate dihydrate (11.2 g) and Solmix A-11 (50 ml). Then, 6N-hydrochloric acid (28 ml) was added, and the mixture was heated to reflux for 2 hours. The reaction mixture was treated with water, and the aqueous layer was extracted with toluene. The combined organic layers were washed with water, a saturated aqueous solution of sodium hydrogencarbonate and water, and then dried over anhydrous magnesium sulfate. The solvent was distilled off under reduced pressure, and the residue was purified by column chromatography with a mixed solvent of toluene and heptane (toluene:heptane=2:1 by volume) as an eluent and silica gel as a stationary phase powder, and then by recrystallization from a mixed solvent of ethyl acetate and Solmix A-11 (ethyl acetate:Solmix=1:4 by volume) and then by recrystallization from Solmix A-11 to give (E)-4-ethoxy-2,3-difluoro-4'-(4-(trans-4-propylcyclohex-3-en-1-yl)but-3-en-1-yl)-1,1'-biphenyl (No. 152) (2.2 g). The yield based on the compound (s56) was 29.0%.

Chemical shift (δ ppm; CDCl$_3$): 7.41 (d, 2H), 7.24 (d, 2H), 7.08 (t, 1H), 6.78 (t, 1H), 5.46 (m, 2H), 5.36 (m, 1H), 4.15 (q, 2H), 2.70 (t, 2H), 2.33 (m, 2H), 2.14 (m, 1H), 2.10-1.88 (m, 5H), 1.84-1.70 (m, 2H), 1.48 (t, 3H), 1.44-1.30 (m, 3H) and 0.86 (t, 3H).

The physical properties of the compound (No. 152) were as follows. Transition temperature: C, 56.0; N, 96.2; I. $T_{NI}$=90.6° C.; $\Delta\varepsilon$=−5.00; $\Delta$n=0.176; η=56.6 mPa·s.

Example 7

Preparation of (E)-4-ethoxy-2,3-difluoro-4'-(4-(trans-4-(4-propylphenyl)cyclohexyl)but-3-en-1-yl)-1,1'-biphenyl (No. 182)

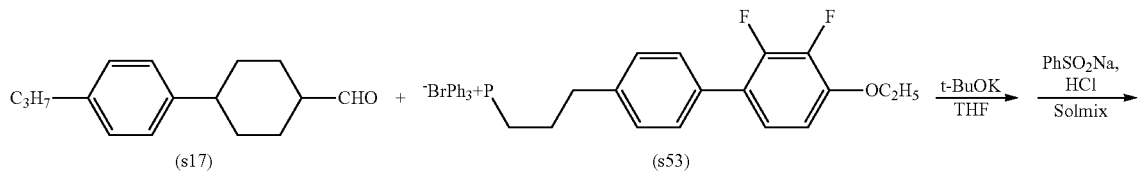

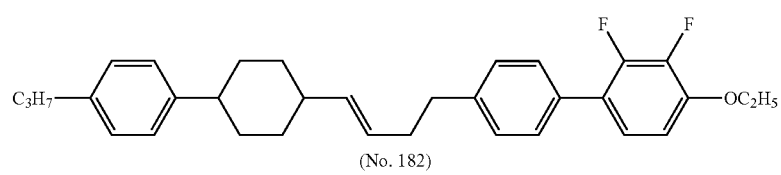

First Step:

Well-dried compound (s53) (25.4 g) was mixed with THF (200 ml) under an atmosphere of nitrogen, and the solution was cooled to −10° C. Potassium t-butoxide (t-BuOK; 4.6 g) was added in two portions in the temperature range of −10° C. to −5° C. After 60 minutes of stirring at −10° C., the compound (s17) (7.9 g) dissolved in THF (30 ml) was added dropwise in the temperature range of −10 to −5° C. After 30 minutes of stirring at 0° C., the reaction mixture was treated with water, and the aqueous layer was extracted with toluene. The combined organic layers were washed with water, and then dried over anhydrous magnesium sulfate. The solution was concentrated under reduced pressure, and the residue was purified by column chromatography with toluene as an eluent and silica gel as a stationary phase powder. The purified product was mixed with sodium benzenesulfonate dihydrate (27.4 g) and Solmix A-11 (100 ml). Then, 6N-hydrochloric acid (23 ml) was added, and the mixture was heated to reflux for 2 hours. The reaction mixture was treated with water, and the aqueous layer was extracted with toluene. The combined organic layers were washed with water, a saturated aqueous solution of sodium hydrogencarbonate and water, and then dried over anhydrous magnesium sulfate. The solvent was distilled off under reduced pressure, and the residue was purified by column chromatography with toluene as an eluent and silica gel as a stationary phase powder, and then by recrystallization from a mixed solvent of ethyl acetate and Solmix A-11 (ethyl acetate:Solmix=1:4 by volume) to give (E)-4-ethoxy-2,3-difluoro-4'-(4-(trans-4-(4-propylphenyl)cyclo hexyl)but-3-en-1-yl)-1,1'-biphenyl (No. 182) (12.5 g). The yield based on the compound (s17) was 74.6%.

Chemical shift (δ ppm; CDCl$_3$): 7.42 (d, 2H), 7.25 (d, 2H), 7.14-7.06 (m, 5H), 6.78 (t, 1H), 5.52-5.40 (m, 2H), 4.15 (q, 2H), 2.71 (t, 2H), 2.55 (t, 2H), 2.43 (tt, 1H), 2.34 (m, 2H), 1.97 (m, 1H), 1.90 (m, 2H), 1.83 (m, 2H), 1.62 (quin, 2H), 1.52-1.42 (m, 5H), 1.27-1.16 (m, 2H) and 0.94 (t, 3H).

The physical properties of the compound (No. 182) were as follows. In this compound, a mixture of 10% by weight of the compound (No. 182) and 90% by weight of the mother liquid crystals (i) was used as a sample for the measurement of physical properties. Transition temperature: C, 135.1; N, 209.8; I. T$_{NI}$=199.6° C.; Δ∈=−4.01; Δn=0.217; η=51.6 mPa·s.

Example 8

Preparation of (E)-4-(4-(trans-4-(4-ethoxy-2,3-difluorophenyl)cyclohexyl)but-3-en-1-yl)-4'-propyl-1, 1'-biphenyl (No. 162)

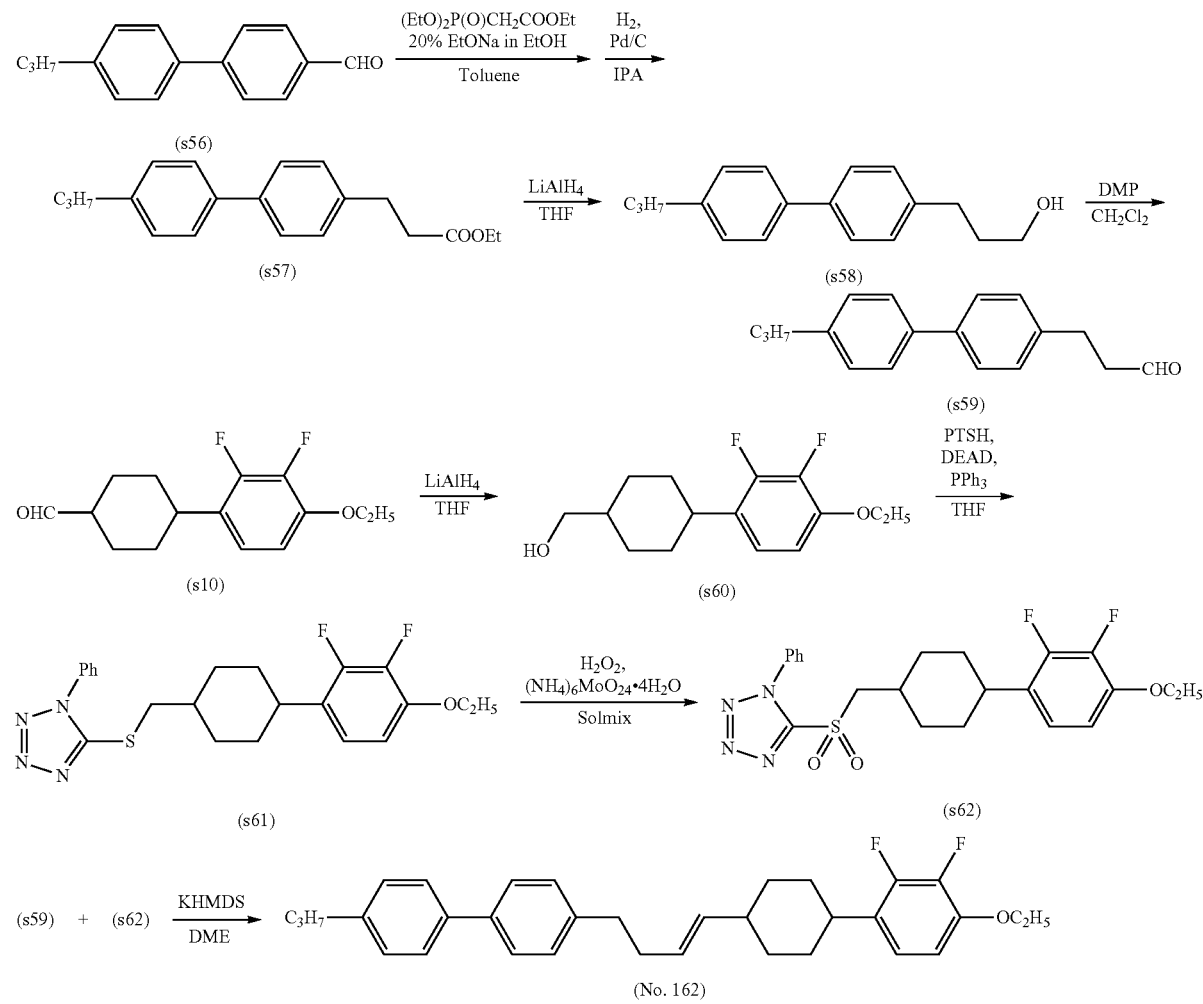

First Step:

4'-Propyl-4-formyl-1,1'-biphenyl (s56) (30.0 g), ethyl diethylphosphonoacetate (36.0 g) and toluene (300 ml) were placed in a reaction vessel under an atmosphere of nitrogen, and cooled to 0° C. Sodium ethoxide in ethanol solution (20%; 54.6 g) was added at the same temperature, and the stirring was continued for another 2 hours. After the reaction mixture had been returned to 25° C., the stirring was continued for another 2 hours. The reaction mixture was treated with water, and the aqueous layer was extracted with toluene. The combined organic layers were washed with water, and then dried over anhydrous magnesium sulfate. The solution was concentrated under reduced pressure, and the residue was purified by column chromatography with a mixed solvent of toluene and heptane (toluene:heptane=2:1 by volume) as an eluent and silica gel as a stationary phase powder. The purified product was dissolved in 2-propanol (300 ml), to which Pd/C (1.5 g) was added. The mixture was stirred at room temperature under a hydrogen atmosphere until hydrogen absorption had ceased. After the reaction had been completed, Pd/C was removed, and then solvent was distilled off. The residue was purified by column chromatography with a mixed solvent of toluene and heptane (toluene:heptane=2:1 by volume) as an eluent and silica gel as a stationary phase powder to give ethyl 3-(4'-propyl-1,1'-biphenyl-4-yl)propionate (s57) (29.8 g). The yield based on the compound (s56) was 75.2%.

Second Step:

Lithium aluminum hydride (4.6 g) was suspended in THF (200 ml). The compound (s57) (29.8 g) was added dropwise to the suspension in the temperature range of −20° C. to −10° C., and the mixture was stirred at the same temperature range for 2 hours. After the completion of reaction had been confirmed by means of GC analysis, ethyl acetate and a saturated aqueous solution of ammonia were added successively to the reaction mixture under ice-cooling, and the deposits were removed by filtration through Celite. The filtrate was extracted with ethyl acetate. The combined organic layers were washed successively with water and brine, and then dried over anhydrous magnesium sulfate. The products were purified by recrystallization from heptane to give 3-(4'-propyl-1,1'-biphenyl-4-yl)propanol (s58) (23.4 g). The yield based on the compound (s57) was 91.5%.

Third Step:

The compound (s58) (10.0 g) and methylene chloride (100 ml) were placed in a reaction vessel under an atmosphere of nitrogen, and cooled to 0° C. Dess-Martin periodinane (DMP; 18.7 g) was added in the temperature range of 0° C. to 5° C. After 1 hour of stirring at 0° C., the reaction mixture was allowed to come to room temperature, and the stirring was continued for another 8 hours. Celite was added to the reaction mixture, and unnecessary materials were removed. The solution was concentrated under reduced pressure, and the residue was purified by column chromatography with toluene as an eluent and silica gel as a stationary phase powder to give 3-(4'-propyl-1,1'-biphenyl-4-yl)propylcarboxaldehyde (s59) (7.1 g). The yield based on the compound (s58) was 71.6%.

Fourth Step:

Lithium aluminum hydride (1.7 g) was suspended in THF (200 ml). The compound (s10) (20.0 g) was added dropwise to the suspension in the temperature range of −20° C. to −10° C., and the mixture was stirred at the same temperature range for 2 hours. After the completion of reaction had been confirmed by means of GC analysis, ethyl acetate and a saturated aqueous solution of ammonia were added successively to the reaction mixture under ice-cooling, and the deposits were removed by filtration through Celite. The filtrate was extracted with ethyl acetate. The combined organic layers were washed successively with water and brine, and then dried over anhydrous magnesium sulfate. The products were purified by recrystallization from heptane to give trans-4-(4-butoxy-2,3-difluorophenyl)-cyclohexylmethanol (s60) (19.8 g). The yield based on the compound (s10) was 98.3%.

Fifth Step:

The compound (s60) (19.8 g), 1-phenyl-5-mercapto-1H-tetrazole (PTSH; 14.3 g) and triphenylphosphine (PPh$_3$; 21.1 g) were mixed with THF (200 ml) under an atmosphere of nitrogen, and the solution was cooled to 0° C. Diethyl azodicarboxylate (DEAD; 40%; in toluene; 36.6 ml) was added dropwise in the temperature range of 0° C. to 5° C. After the completion of the reaction had been confirmed by means of GC analysis, the reaction mixture was treated with water, and the aqueous layer was extracted with toluene. The combined organic layers were washed with water, and then dried over anhydrous magnesium sulfate. The solution was concentrated under reduced pressure, and the residue was purified by column chromatography with toluene as an eluent and silica gel as a stationary phase powder to give 1-phenyl-5-(trans-4-(4-butoxy-2,3-difluorophenyl)cyclohexylmethylthio)-1H-tetrazole (s61) (29.7 g). The yield based on the compound (s60) was 94.2%.

Sixth Step:

The compound (s61) (29.7 g) was mixed with Solmix A-11 (200 ml) under an atmosphere of nitrogen. Hexaammonium heptamolybdate tetrahydrate (4.3 g) dissolved in an aqueous solution of hydrogen peroxide (30%; 63.0 ml) was added dropwise in the temperature range of 35° C. to 40° C. The mixture was stirred at the same temperature range for 8 hours. After the completion of the reaction had been confirmed by means of LC analysis, the reaction mixture was treated with water, and the aqueous layer was extracted with toluene. The combined organic layers were washed with an aqueous solution of sodium hydrogen sulfite and water, and then dried over anhydrous magnesium sulfate. The solution was concentrated under reduced pressure, and the residue was purified by column chromatography with toluene as an eluent and silica gel as a stationary phase powder to give 1-phenyl-5-(4-butoxy-2,3-difluorophenyl)cyclohexylmethylsulfonyl)-1H-tetrazole (s62) (29.0 g). The yield based on the compound (s61) was 90.9%.

Seventh Step:

The compound (s59) (24.6 g) and the compound (s62) (7.1 g) were mixed with dimethoxyethane (DME; 100 ml) under an atmosphere of nitrogen, and the solution was cooled to −60° C. Potassium hexamethyldisilazide (KHMDS; 0.91 M; in THF; 19.6 ml) was added dropwise in the temperature range of −60° C. to −55° C. After 2 hours of stirring at −60° C., the reaction mixture was allowed to come to room temperature, and the stirring was continued for another 8 hours. After the completion of the reaction had been confirmed by means of LC analysis, the reaction mixture was treated with water, and the aqueous layer was extracted with toluene. The combined organic layers were washed with water, and then dried over anhydrous magnesium sulfate. The solution was concentrated under reduced pressure, and the residue was purified by column chromatography with a mixed solvent of toluene and heptane (toluene:heptane=1:1 by volume) as an eluent and silica gel as a stationary phase powder to give (E)-4-(4-(trans-4-(4-ethoxy-2,3-difluorophenyl)cyclohexyl)but-3-en-1-yl)-4'-propyl-1,1'-biphenyl (No. 162) (1.2 g). The yield based on the compound (s59) was 20.7%.

Chemical shift (δ ppm; CDCl$_3$): 7.50 (d, 4H), 7.24 (d, 4H), 6.83 (t, 1H), 6.65 (t, 1H), 5.52-5.39 (m, 2H), 4.08 (q, 2H), 2.78-2.68 (m, 3H), 2.62 (t, 2H), 2.34 (q, 2H), 1.96 (m, 1H), 1.85 (m, 4H), 1.67 (sext, 2H), 1.52-1.41 (m, 5H), 1.30-1.19 (m, 2H) and 0.97 (t, 3H).

The physical properties of the compound (No. 162) were as follows. Transition temperature: C, 73.4; $S_B$, 92.8; N, 214.3; I. $T_{NI}$=205.9° C.; $\Delta\varepsilon$=-4.40; $\Delta n$=0.220; $\eta$=55.7 mPa·s.

Example 9

Preparation of (E)-1-ethoxy-2,3-difluoro-4-(trans-4-(4-(trans-4-(4-propylphenyl)cyclohexyl)but-3-en-1-yl)cyclohexyl)benzene (No. 202)

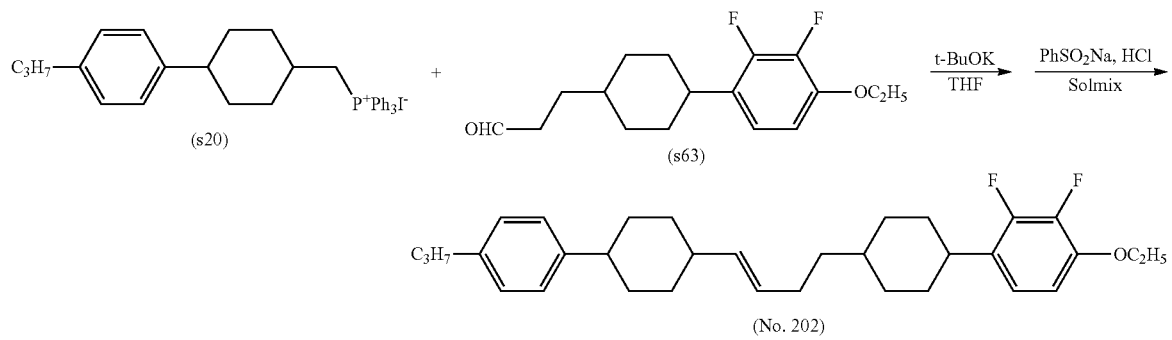

First Step:

Well-dried compound (s20) (9.8 g) was mixed with THF (200 ml) under an atmosphere of nitrogen, and the solution was cooled to −10° C. Potassium t-butoxide (t-BuOK; 1.8 g) was added in two portions in the temperature range of −10° C. to −5° C. After 60 minutes of stirring at −10° C., the compound (s63) (7.4 g) dissolved in THF (30 ml) was added dropwise in the temperature range of −10 to −5° C. After 30 minutes of stirring at 0° C., the reaction mixture was treated with water, and the aqueous layer was extracted with toluene. The combined organic layers were washed with water, and then dried over anhydrous magnesium sulfate. The solution was concentrated under reduced pressure, and the residue was purified by column chromatography with toluene as an eluent and silica gel as a stationary phase powder. The purified product was mixed with sodium benzenesulfonate dihydrate (5.4 g) and Solmix A-11 (100 ml). Then, 6N-hydrochloric acid (16 ml) was added, and the mixture was heated to reflux for 2 hours. The reaction mixture was treated with water, and the aqueous layer was extracted with toluene. The combined organic layers were washed with water, a saturated aqueous solution of sodium hydrogencarbonate and water, and then dried over anhydrous magnesium sulfate. The solvent was distilled off under reduced pressure, and the residue was purified by column chromatography with toluene as an eluent and silica gel as a stationary phase powder, and then by recrystallization from a mixed solvent of ethyl acetate and Solmix A-11 (ethyl acetate:Solmix=1:4 by volume) to give (E)-1-ethoxy-2,3-difluoro-4-(trans-4-(4-(trans-4-(4-propylphenyl)cyclohexyl)but-3-en-1-yl)cyclohexyl)benzene (No. 202) (2.1 g). The yield based on the compound (s63) was 31.5%.

Chemical shift (δ ppm; CDCl₃): 7.11 (q, 4H), 6.84 (t, 1H), 6.66 (t, 1H), 5.41 (m, 2H), 4.08 (q, 2H), 2.74 (m, 1H), 2.54 (m, 2H), 2.43 (m, 1H), 2.07-2.01 (m, 2H), 2.00-1.81 (m, 9H), 1.63 (sext, 2H), 1.53-1.38 (m, 7H), 1.34-1.18 (m, 5H), 1.07 (m, 2H) and 0.94 (t, 3H).

The physical properties of the compound (No. 202) were as follows. Transition temperature: C, 83.8; $S_B$, 139.0; N, 222.5; I. $T_{NI}$=189.3° C.; $\Delta\varepsilon$=-4.09; $\Delta n$=0.154; $\eta$=63.3 mPa·s.

Example 10

Preparation of (E)-2',3'-difluoro-4-(trans-4-pentylcyclohexyl)-4'-(4-(trans-4-propylcyclohexyl)but-3-en-1-yl)-2,3,4,5-tetrahydro-1,1'-biphenyl (No. 284)

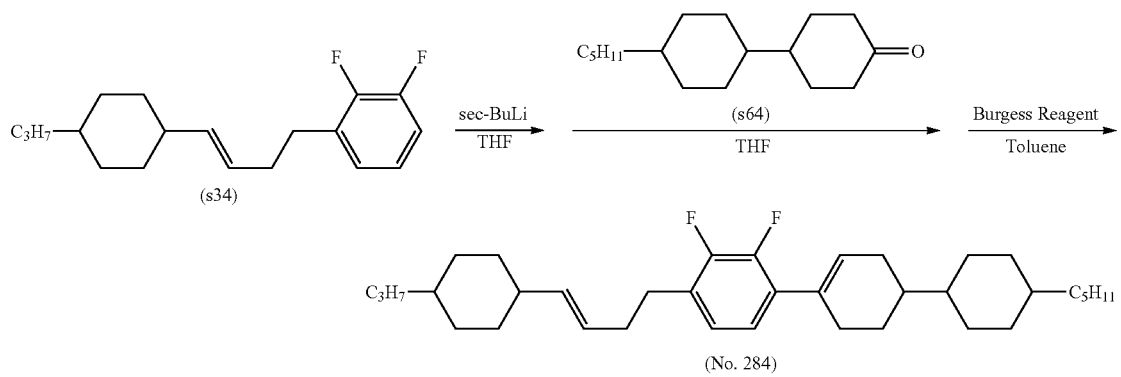

First Step:

The compound (s34) (2.7 g) and THF (100 ml) were placed in a reaction vessel under an atmosphere of nitrogen, and cooled to −74° C. sec-Butyllithium (1.00 M; in n-hexane-cyclohexane; 11 ml) was added dropwise in the temperature range of −74° C. to −70° C., and the stirring was continued for another 2 hours. trans-4'-Pentyl-(1,1'-bicyclohexane)-4-one (s64) (2.8 g) in THF (20 ml) solution was added dropwise in the temperature range of −75° C. to −70° C., and the stirring was continued for another 8 hours while the mixture was allowed to come to 25° C. The reaction mixture was treated with an aqueous solution of ammonium chloride, and the aqueous layer was extracted with ethyl acetate. The combined organic layers were washed with water, a saturated aqueous solution of sodium hydrogencarbonate and water, and then dried over anhydrous magnesium sulfate. The solvent was distilled off under reduced pressure. The residue was mixed with p-toluenesulfonic acid (p-TsOH, 0.08 g) and toluene (100 ml), and the mixture was heated at 50° C. for 2 hours. After the reaction mixture had been cooled to 30° C., it was treated with water, and the aqueous layer was extracted with toluene. The combined organic layers were washed with a saturated aqueous solution of sodium hydrogencarbonate and water, and then dried over anhydrous magnesium sulfate. The solution was concentrated under reduced pressure, and the residue was purified by column chromatography with heptane as an eluent and silica gel as a stationary phase powder, and then by recrystallization from Solmix A-11 to give (E)-2',3'-difluoro-4-(trans-4-pentylcyclohexyl)-4'-(4-(trans-4-propylcyclohexyl)but-3-en-1-yl)-2,3,4,5-tetrahydro-1,1'-biphenyl (No. 284) (0.9 g). The yield based on the compound (s34) was 18.6%.

Chemical shift (δ ppm; CDCl$_3$): 6.87 (t, 1H), 6.81 (t, 1H), 5.94 (m, 1H), 5.42-5.30 (m, 2H), 2.66 (t, 2H), 2.48-2.30 (m, 2H), 2.29-2.18 (m, 3H), 1.99-1.86 (m, 2H), 1.86-1.63 (m, 9H), 1.46-1.19 (m, 10H), 1.19-1.07 (m, 7H), 1.07-0.93 (m, 4H) and 0.93-0.82 (m, 10H).

The physical properties of the compound (No. 284) were as follows. Transition temperature: C, 25.9; S$_B$, 131.4; S$_A$, 163.5; N, 215.0; I. T$_{NI}$=203.3° C.; Δ∈=−2.33; Δn=0.106; η=33.1 mPa·s.

Example 11

Preparation of (E)-trans-4-(4-ethoxy-2,3-difluorophenyl)-trans-4'-(4-(4-propylphenyl)but-1-en-1-yl)-1,1'-bicyclohexane (No. 222)

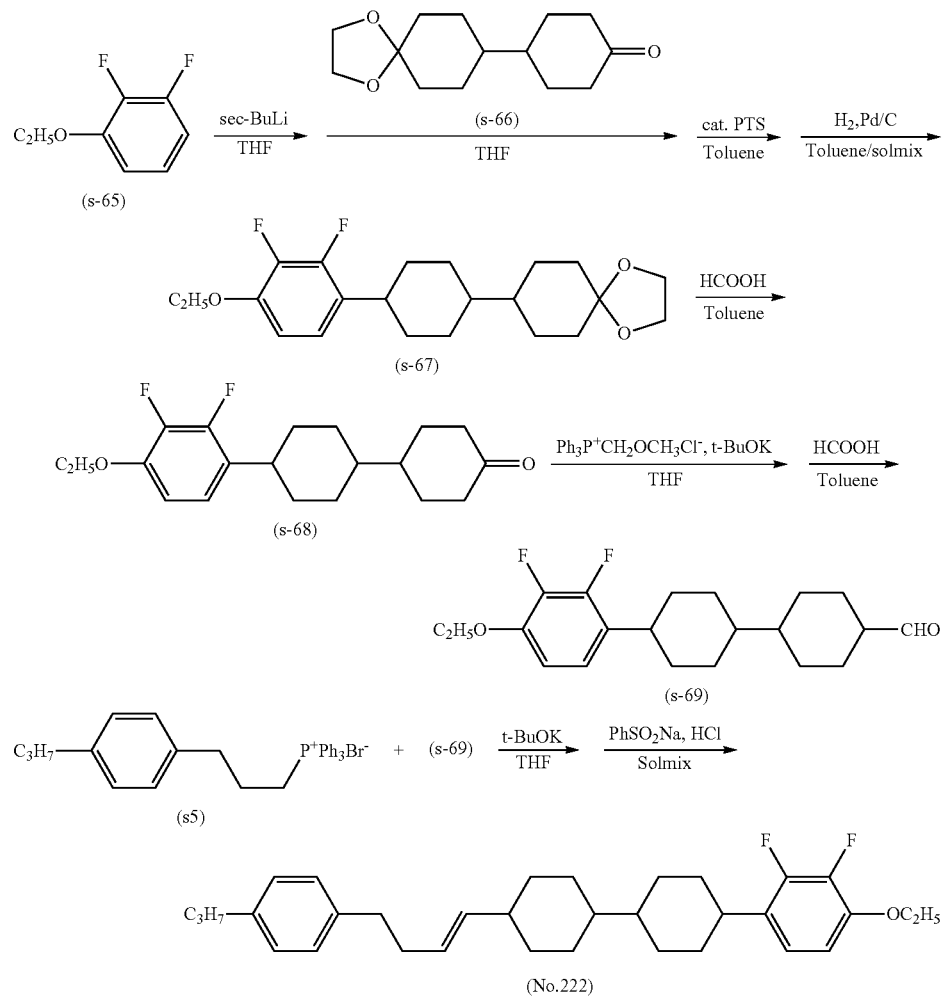

First Step:

3-Ethoxy-1,2-difluorobenzene (s65) (10.0 g) and THF (200 ml) were placed in a reaction vessel under an atmosphere of nitrogen, and cooled to −74° C. sec-Butyllithium (1.00 M, in n-hexane-cyclohexane; 64.0 ml) was added dropwise in the temperature range of −74° C. to −70° C., and the stirring was continued for another 2 hours. 4-(1,4-Dioxaspiro[4.5]decan-8-yl)-cyclohexanone (s66) (12.8 g) in THF (50 ml) solution was added dropwise in the temperature range of −75° C. to −70° C., and the stirring was continued for another 8 hours while the mixture was allowed to come to 25° C. The reaction mixture was treated with an aqueous solution of ammonium chloride (3%), and the aqueous layer was extracted with ethyl acetate. The combined organic layers were washed with water, a saturated aqueous solution of sodium hydrogencarbonate and water, and then dried over anhydrous magnesium sulfate. Distillation of the solvent under reduced pressure gave 4-(1,4-dioxaspiro[4.5]decan-8-yl)-1-(4-ethoxy-2,3-difluorophenyl)-cyclohexanol. The compound was mixed with p-toluenesulfonic acid (0.68 g) and toluene (200 ml), and the mixture was heated to reflux for 2 hours while distilled water was removed. After the reaction mixture had been cooled to 30° C., it was treated with water, and the aqueous layer was extracted with toluene. The combined organic layers were washed with a saturated aqueous solution of sodium hydrogencarbonate and water, and then dried over anhydrous magnesium sulfate. The solution was concentrated under reduced pressure, and the residue was purified by column chromatography with toluene as an eluent and silica gel as a stationary phase powder. Pd/C (0.3 g) was added to the purified product and the mixture was stirred at room temperature under a hydrogen atmosphere until hydrogen absorption had ceased. After the reaction had been completed, Pd/C was removed, and then solvent was distilled off. The residue was purified by recrystallization from a mixed solvent of THF and heptane (THF:heptane=1:9 by volume) to give 8-[4-(4-ethoxy-2,3-difluorophenyl)-cyclohexenyl]-1,4-dioxaspiro[4.5]decane (s67) (7.7 g). The yield based on the compound (s65) was 35.2%.

Second Step:

The compound (s67) (7.7 g), formic acid (87%; 8.7 g) and toluene (100 ml) were mixed, and the mixture was heated to reflux for 2 hours. After the reaction mixture had been cooled to 30° C., it was treated with water, and the aqueous layer was extracted with toluene (200 ml). The combined organic layers were washed with water, a saturated aqueous solution of sodium hydrogencarbonate and water, and then dried over anhydrous magnesium sulfate. The solvent was distilled off under reduced pressure, and the residue was purified by recrystallization from heptane to give trans-4'-(4-ethoxy-2,3-difluorophenyl)-bicyclohexyl-4-one (s68) (6.8 g). The yield based on the compound (s67) was 99.0%.

Third Step:

Well-dried methoxymethyltriphenylphosphonium chloride (7.9 g) was mixed with THF (100 ml) under an atmosphere of nitrogen, and the solution was cooled to −30° C. Potassium t-butoxide (t-BuOK; 2.6 g) was added in four portions in the temperature range of −30° C. to −20° C. After 30 minutes of stirring at −20° C., the compound (s68) (6.8 g) dissolved in THF (35 ml) was added dropwise in the temperature range of −30 to −20° C. After 30 minutes of stirring at −10° C., the reaction mixture was treated with water, and the aqueous layer was extracted with toluene. The combined organic layers were washed with water, and then dried over anhydrous magnesium sulfate. The solution was concentrated under reduced pressure, and the residue was purified by column chromatography with toluene as an eluent and silica gel as a stationary phase powder to give trans-4-(4-ethoxy-2,3-difluorophenyl)-4'-methoxymethylene-bicyclohexyl. The compound was mixed with formic acid (87%; 8.4 g) and toluene (100 ml), and the mixture was heated to reflux for 2 hours. After the reaction mixture had been cooled to 30° C., it was treated with water, and the aqueous layer was extracted with toluene. The combined organic layers were washed with water, a saturated aqueous solution of sodium hydrogencarbonate and water, and then dried over anhydrous magnesium sulfate. The solvent was distilled off under reduced pressure, and the residue was purified by recrystallization from a mixed solvent of heptane and THF (heptane:THF=9:1 by volume) to give trans-4'-(4-ethoxy-2,3-difluorophenyl)-bicyclohexyl-trans-4-carboxaldehyde (s69) (6.0 g). The yield based on the compound (s68) was 82.5%.

Fourth Step:

Well-dried compound (s5) (6.9 g) was mixed with THF (100 ml) under an atmosphere of nitrogen, and the solution was cooled to −10° C. Potassium t-butoxide (t-BuOK; 1.5 g) was added in the temperature range of −10° C. to −5° C. After 60 minutes of stirring at −10° C., the compound (s68) (4.0 g) dissolved in THF (30 ml) was added dropwise in the temperature range of −10 to −5° C. After 30 minutes of stirring at 0° C., the reaction mixture was treated with water, and the aqueous layer was extracted with toluene. The combined organic layers were washed with water, and then dried over anhydrous magnesium sulfate. The solution was concentrated under reduced pressure, and the residue was purified by column chromatography with toluene as an eluent and silica gel as a stationary phase powder. The purified product was mixed with sodium benzenesulfonate dihydrate (22.8 g) and Solmix A-11 (100 ml). Then, 6N-hydrochloric acid (19 ml) was added, and the mixture was heated to reflux for 2 hours. The reaction mixture was treated with water, and the aqueous layer was extracted with toluene. The combined organic layers were washed with water, a saturated aqueous solution of sodium hydrogencarbonate and water, and then dried over anhydrous magnesium sulfate. The solvent was distilled off under reduced pressure, and the residue was purified by column chromatography with toluene as an eluent and silica gel as a stationary phase powder, and then by recrystallization from a mixed solvent of ethyl acetate and Solmix A-11 (ethyl acetate:Solmix=1:4 by volume) to give (E)-trans-4-(4-ethoxy-2,3-difluorophenyl)-trans-4'-(4-(4-propylphenyl)but-1-en-1-yl)-1,1'-bicyclohexane (No. 222) (1.5 g). The yield based on the compound (s68) was 26.6%.

Chemical shift (δ ppm; CDCl$_3$): 7.09 (s, 4H), 6.83 (t, 1H), 6.66 (t, 1H), 5.60 (m, 2H), 4.08 (q, 2H), 2.72 (tt, 1H), 2.62 (t, 2H), 2.56 (t, 2H), 2.27 (m, 2H), 1.90-1.79 (m, 5H), 1.78-1.71 (m, 4H), 1.61 (sext, 2H), 1.46-1.36 (m, 5H), 1.22-1.11 (m, 3H), 1.04 (m, 5H) and 0.94 (t, 3H).

The physical properties of the compound (No. 222) were as follows. Transition temperature: C, 74.2; S$_B$, 155.2; N, 228.8; I. T$_{NI}$=205.3° C.; Δ∈=−4.55; Δn=0.153; η=55.7 mPa·s.

Example 12

Preparation of (E)-4-ethoxy-2,3-difluoro-4'-(trans-4-(4-(4-propylphenyl)but-1-en-1-yl)cyclohexyl)-1,1'-biphenyl (No. 242)

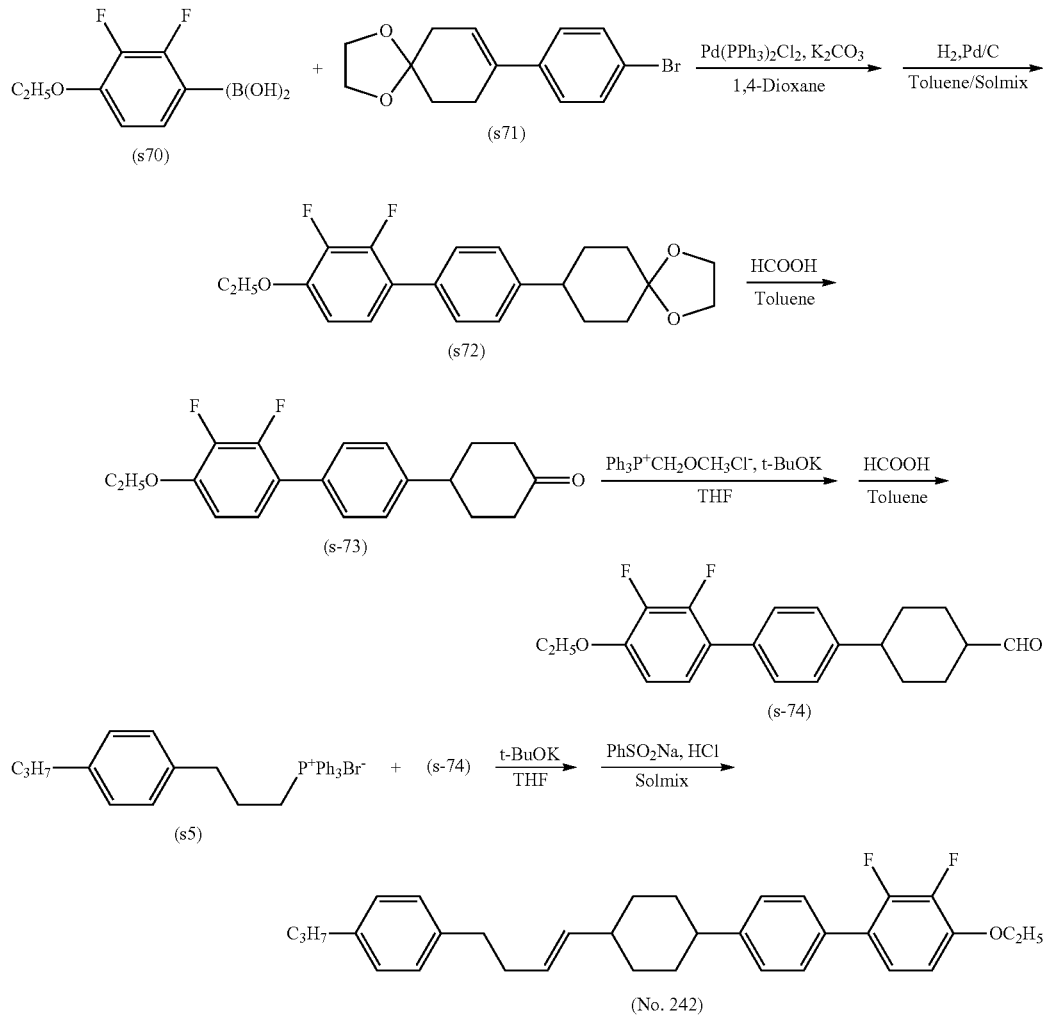

First Step:

8-(4-Bromophenyl)-1,4-dioxaspiro(4.5)dec-7-ene (s71) (30.0 g), 4-ethoxy-2,3-difluorophenylboronic acid (s70) (24.6 g), potassium phosphate ($K_3PO_4$; 64.7 g), dichlorobis-triphenylphosphine palladium (II) ($Pd(Ph_3P)_2Cl_2$; 2.1 g) and 1,4-dioxane (300 ml) were placed in a reaction vessel under an atmosphere of nitrogen, and heated to reflux for 2 hours. After the reaction mixture had been cooled to 25° C., it was treated with water, and the aqueous layer was extracted with toluene. The combined organic layers were washed with water, and then dried over anhydrous magnesium sulfate. The solution was concentrated under reduced pressure, and the residue was purified by column chromatography with toluene as an eluent and silica gel as a stationary phase powder. Pd/C (1.5 g) was added to the purified product, and the mixture was stirred at room temperature under a hydrogen atmosphere until hydrogen absorption had ceased. After the reaction had been completed, Pd/C was removed, and then solvent was distilled off. The residue was purified by column chromatography with toluene as an eluent and silica gel as a stationary phase powder, and then by recrystallization from a mixed solvent of toluene and heptane (toluene:heptane=1:1 by volume) to give 8-(4'-ethoxy-2',3'-difluoro-(1,1'-biphenyl)-4-yl)-1,4-dioxaspiro(4.5)decane (s72) (28.8 g). The yield based on the compound (s71) was 75.7%.

Second Step:

The compound (s72) (28.8 g), formic acid (87%; 17.7 g) and toluene (200 ml) were mixed, and the mixture was heated to reflux for 2 hours. After the reaction mixture had been cooled to 30° C., it was treated with water, and the aqueous layer was extracted with toluene. The combined organic layers were washed with water, a saturated aqueous solution of sodium hydrogencarbonate and water, and then dried over anhydrous magnesium sulfate. The solvent was distilled off under reduced pressure, and the residue was purified by recrystallization from heptane to give 4-(4'-ethoxy-2',3'-difluoro-(1,1'-biphenyl)-4-yl)cyclohexanone (s73) (22.2 g). The yield based on the compound (s72) was 87.4%.

Third Step:

Well-dried methoxymethyltriphenylphosphonium chloride (18.7 g) was mixed with THF (200 ml) under an atmosphere of nitrogen, and the solution was cooled to −30° C. Potassium t-butoxide (t-BuOK; 6.1 g) was added in two portions in the temperature range of −30° C. to −20° C. After 30 minutes of stirring at −20° C., the compound (s73) (15.0 g) dissolved in THF (20 ml) was added dropwise in the temperature range of −30 to −20° C. After 30 minutes of stirring at −10° C., the reaction mixture was treated with water, and the aqueous layer was extracted with toluene. The combined organic layers were washed with water, and then dried over anhydrous magnesium sulfate. The solution was concentrated under reduced pressure, and the residue was purified by column chromatography with toluene as an eluent and silica gel as a stationary phase powder to give 4-(4'-ethoxy-2',3'-difluoro-(1,1'-biphenyl)-4-yl)methoxymethylenecyclohexane. The compound was mixed with formic acid (87%; 7.2 g) and toluene (100 ml), and the mixture was heated to reflux for 2 hours. After the reaction mixture had been cooled to 30° C., it was treated with water, and the aqueous layer was extracted with toluene. The combined organic layers were washed with water, a saturated aqueous solution of sodium hydrogencarbonate and water, and then dried over anhydrous magnesium sulfate. The solvent was distilled off under reduced pressure, and the residue was purified by recrystallization from a mixed solvent of heptane and THF (heptane:THF=9:1 by volume) to give 4-(4'-ethoxy-2',3'-difluoro-(1,1'-biphenyl)-4-yl)cyclohexanecarboxaldehyde (s74) (9.8 g). The yield based on the compound (s73) was 62.7%.

Fourth Step:

Well-dried compound (s5) (7.0 g) was mixed with THF (100 ml) under an atmosphere of nitrogen, and the solution was cooled to −10° C. Potassium t-butoxide (t-BuOK; 1.6 g) was added in the temperature range of −10° C. to −5° C. After 60 minutes of stirring at −10° C., the compound (s74) (4.0 g) dissolved in THF (30 ml) was added dropwise in the temperature range of −10 to −5° C. After 30 minutes of stirring at 0° C., the reaction mixture was treated with water, and the aqueous layer was extracted with toluene. The combined organic layers were washed with water, and then dried over anhydrous magnesium sulfate. The solution was concentrated under reduced pressure, and the residue was purified by column chromatography with toluene as an eluent and silica gel as a stationary phase powder. The purified product was mixed with sodium benzenesulfonate dihydrate (23.2 g) and Solmix A-11 (100 ml). Then, 6N-hydrochloric acid (19 ml) was added, and the mixture was heated to reflux for 2 hours. The reaction mixture was treated with water, and the aqueous layer was extracted with toluene. The combined organic layers were washed with water, a saturated aqueous solution of sodium hydrogencarbonate and water, and then dried over anhydrous magnesium sulfate. The solvent was distilled off under reduced pressure, and the residue was purified by column chromatography with toluene as an eluent and silica gel as a stationary phase powder, and then by recrystallization from a mixed solvent of ethyl acetate and Solmix A-11 (ethyl acetate:Solmix=1:4 by volume) to give (E)-4-ethoxy-2,3-difluoro-4'-(trans-4-(4-(4-propylphenyl)but-1-en-1-yl)cyclohexyl)-1,1'-biphenyl (No. 242) (2.9 g). The yield based on the compound (s74) was 51.1%.

Chemical shift (δ ppm; CDCl$_3$): 7.44 (d, 2H), 7.27 (d, 2H), 7.10 (s, 4H), 7.09 (td, 1H), 6.78 (t, 1H), 5.46 (m, 2H), 4.15 (q, 2H), 2.65 (t, 2H), 2.55 (t, 2H), 2.50 (tt, 1H), 2.30 (q, 2H), 2.03-1.90 (m, 3H), 1.85 (m, 2H), 1.64 (sext, 2H), 1.51 (dd, 2H), 1.47 (t, 3H), 1.23 (qd, 2H) and 0.94 (t, 3H).

The physical properties of the compound (No. 242) were as follows. Transition temperature: C, 97.9; S$_B$, 100.7; N, 230.4; I. T$_{NI}$=207.9° C.; Δ∈=−4.32; Δn=0.219; η=56.3 mPa·s.

Example 13

Preparation of (E)-4-ethoxy-2,2',3,3'-tetrafluoro-4'-(trans-4-(4-(4-propylphenyl)but-1-en-1-yl)cyclohexyl)-1,1'-biphenyl (No. 262)

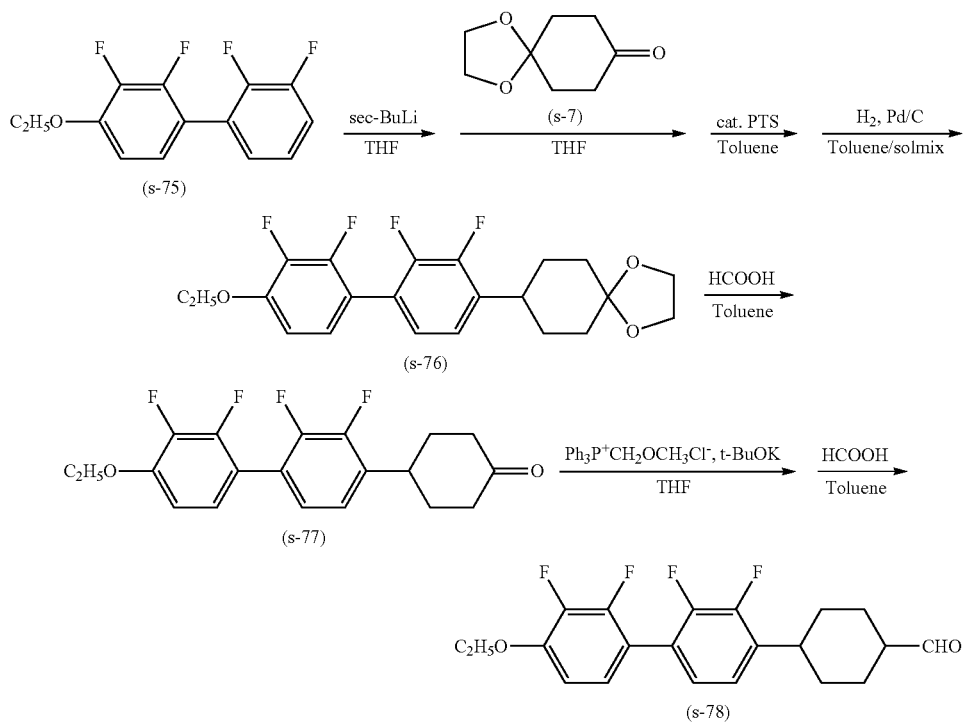

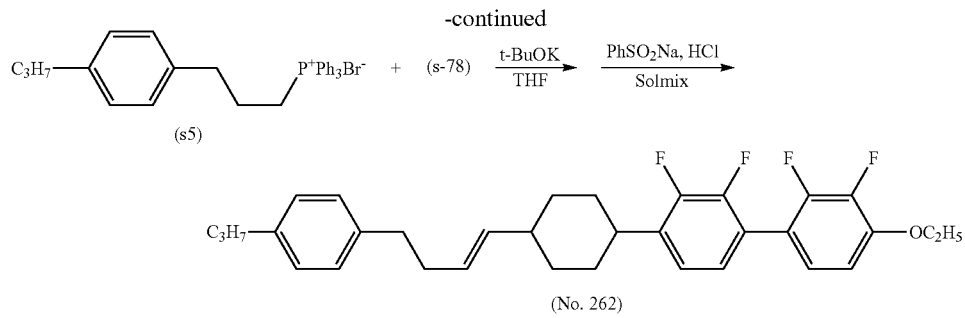

(No. 262)

First Step:

4'-Ethoxy-2,2',3,3'-tetrafluoro-1,1'-biphenyl (s75) (50.0 g) and THF (500 ml) were placed in a reaction vessel under an atmosphere of nitrogen, and cooled to −74° C. sec-Butyllithium (1.00 M; in n-hexane-cyclohexane; 222 ml) was added dropwise in the temperature range of −74° C. to −70° C., and the stirring was continued for another 2 hours. 1,4-Dioxaspiro[4.5]decan-8-one (s7) (28.8 g) in THF (200 ml) solution was added dropwise in the temperature range of −75° C. to −70° C., and the stirring was continued for another 8 hours while the mixture was allowed to come to 25° C. The reaction mixture was treated with an aqueous solution of ammonium chloride (3%), and the aqueous layer was extracted with ethyl acetate. The combined organic layers were washed with water, a saturated aqueous solution of sodium hydrogencarbonate and water, and then dried over anhydrous magnesium sulfate. Distillation of the solvent under reduced pressure gave 8-(4'-ethoxy-2,2',3,3'-tetrafluoro-1,1'-biphenyl-4-yl)-1,4-dioxaspiro[4.5]decan-8-ol. The compound was mixed with p-toluenesulfonic acid (1.5 g) and toluene (300 ml), and the mixture was heated to reflux for 2 hours while distilled water was removed. After the reaction mixture had been cooled to 30° C., it was treated with water, and the aqueous layer was extracted with toluene. The combined organic layers were washed with a saturated aqueous solution of sodium hydrogencarbonate and water, and then dried over anhydrous magnesium sulfate. The solution was concentrated under reduced pressure, and the residue was purified by column chromatography with toluene as an eluent and silica gel as a stationary phase powder. The purified product was dissolved in a mixed solvent of toluene (100 ml) and Solmix A-11 (100 ml), to which Pd/C (2.5 g) was added. The mixture was stirred at room temperature under a hydrogen atmosphere until hydrogen absorption had ceased. After the reaction had been completed, Pd/C was removed, and then solvent was distilled off. The residue was purified by column chromatography with toluene as an eluent and silica gel as a stationary phase powder, and then by recrystallization from Solmix A-11 to give 8-(4'-ethoxy-2,2',3,3'-tetrafluoro-1,1'-biphenyl-4-yl)-1,4-dioxaspiro[4.5]decane (s76) (31.9 g). The yield based on the compound (s75) was 42.0%.

Second Step:

The compound (s76) (31.9 g), formic acid (87%; 10.7 g) and toluene (200 ml) were mixed, and the mixture was heated to reflux for 2 hours. After the reaction mixture had been cooled to 30° C., it was treated with water, and the aqueous layer was extracted with toluene. The combined organic layers were washed with water, a saturated aqueous solution of sodium hydrogencarbonate and water, and then dried over anhydrous magnesium sulfate. The solvent was distilled off under reduced pressure, and the residue was purified by column chromatography with toluene as an eluent and silica gel as a stationary phase powder, and then by recrystallization from a mixed solvent of heptane and toluene (heptane:toluene=2:1 by volume) to give 1-(4'-ethoxy-2,2',3,3'-tetrafluoro-1,1'-biphenyl-4-yl)-cyclohexan-4-one (s77) (21.8 g). The yield based on the compound (s76) was 76.6%.

Third Step:

Well-dried methoxymethyltriphenylphosphonium chloride (20.4 g) was mixed with THF (200 ml) under an atmosphere of nitrogen, and the solution was cooled to −30° C. Potassium t-butoxide (t-BuOK) (6.7 g) was added in two portions in the temperature range of −30° C. to −20° C. After 30 minutes of stirring at −20° C., the compound (s77) (16.8 g) dissolved in THF (35 ml) was added dropwise in the temperature range of −30 to −20° C. After 30 minutes of stirring at −10° C., the reaction mixture was treated with water, and the aqueous layer was extracted with toluene. The combined organic layers were washed with water, and then dried over anhydrous magnesium sulfate. The solution was concentrated under reduced pressure, and the residue was purified by column chromatography with toluene as an eluent and silica gel as a stationary phase powder to give 4'-ethoxy-2,2',3,3'-tetrafluoro-1,1'-biphenyl-4-yl-methoxymethylenecyclohexane. The compound was mixed with formic acid (87%; 4.2 g) and toluene (100 ml), and the mixture was heated to reflux for 2 hours. After the reaction mixture had been cooled to 30° C., it was treated with water, and the aqueous layer was extracted with toluene. The combined organic layers were washed with water, a saturated aqueous solution of sodium hydrogencarbonate and water, and then dried over anhydrous magnesium sulfate. The solvent was distilled off under reduced pressure, and the residue was purified by recrystallization from a mixed solvent of heptane and THF (heptane:THF=9:1 by volume) to give 4'-ethoxy-2,2',3,3'-tetrafluoro-1,1'-biphenyl-4-yl-cyclohexanecarboxaldehyde (s78) (11.7 g). The yield based on the compound (s77) was 67.1%.

Fourth Step:

Well-dried compound (s5) (6.4 g) was mixed with THF (100 ml) under an atmosphere of nitrogen, and the solution was cooled to −10° C. Potassium t-butoxide (t-BuOK; 1.4 g) was added in the temperature range of −10° C. to −5° C. After 60 minutes of stirring at −10° C., the compound (s78) (4.0 g) dissolved in THF (30 ml) was added dropwise in the temperature range of −10 to −5° C. After 30 minutes of stirring at 0° C., the reaction mixture was treated with water, and the aqueous layer was extracted with toluene. The combined organic layers were washed with water, and then dried over anhydrous magnesium sulfate. The solution was concentrated under reduced pressure, and the residue was purified by column chromatography with toluene as an eluent and silica gel as a stationary phase powder. The purified product was mixed with sodium benzenesulfonate dihydrate (20.2 g) and Solmix A-11 (100 ml). Then, 6N-hydrochloric acid (16.8 ml) was added, and the mixture was heated to reflux for 2 hours. The reaction mixture was treated with water, and the aqueous layer was extracted with toluene. The combined organic layers were washed with water, a saturated aqueous solution of sodium hydrogencarbonate and water, and then dried over anhydrous magnesium sulfate. The solvent was distilled off under reduced pressure, and the residue was purified by column chromatography with toluene as an eluent and silica gel as a stationary phase powder, and then by recrystallization from a mixed solvent of ethyl acetate and Solmix A-11 (ethyl acetate:Solmix=1:4 by volume) to give (E)-4-ethoxy-2,2',3,3'-tetrafluoro-4'-(trans-4-(4-(4-propylphenyl)but-1-en-1-yl)cyclohexyl)-1,1'-biphenyl (No. 262) (3.6 g). The yield based on the compound (s78) was 65.3%.

Chemical shift (δ ppm; CDCl$_3$): 7.10 (s, 4H), 7.03 (m, 3H), 6.80 (t, 1H), 5.52-5.38 (m, 2H), 4.16 (q, 2H), 2.87 (tt, 1H), 2.65 (t, 2H), 2.56 (t, 2H), 2.30 (m, 2H), 1.99 (m, 1H), 1.92 (m, 2H), 1.86 (m, 2H), 1.63 (quin, 2H), 1.59-1.45 (m, 5H), 1.32-1.22 (m, 2H) and 0.94 (t, 3H).

The physical properties of the compound (No. 262) were as follows. Transition temperature: C, 113.5; N, 198.2; I. $T_{NI}$=175.9° C.; Δ∈=−5.41; Δn=0.194; η=86.8 mPa·s.

Example 14

The compounds (No. 1) to (No. 300) shown below can be prepared by synthetic methods similar to those described in Examples 1 to 13. Appended data were obtained according to the methods described above. The transition temperature was expressed in terms of measured values of the compound itself. The maximum temperature ($T_{NI}$), the dielectric anisotropy (Δ∈), the optical anisotropy (Δn) and the viscosity (η) were expressed in terms of extrapolated values, according to the extrapolation described above of measured values of a sample in which the compound was mixed with the mother liquid crystals (i). In the compound (No. 182), the sample was prepared from 90% by weight of the mother liquid crystals and 10% by weight of the compound. In the residual compounds, the sample was prepared from 85% by weight of the mother liquid crystals and 15% by weight of each compound.

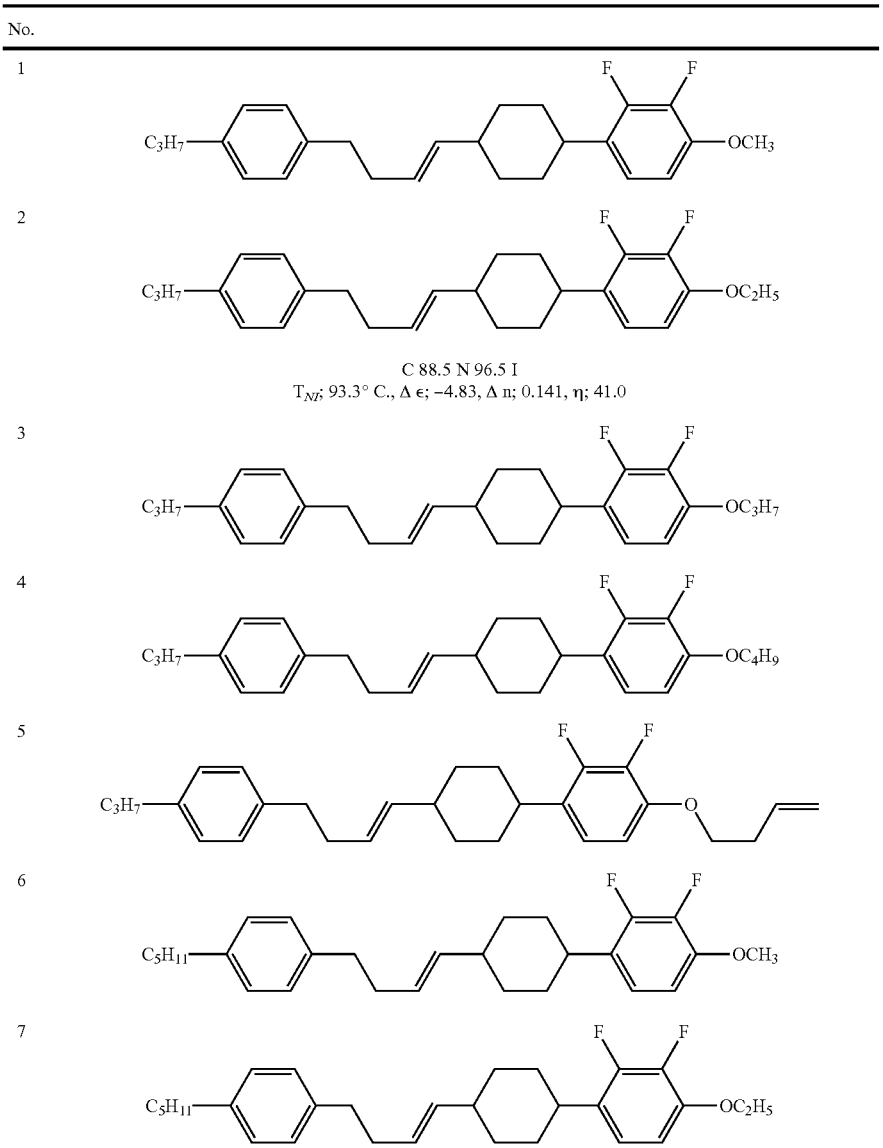

No. 2: C 88.5 N 96.5 I
$T_{NI}$; 93.3° C., Δ ε; −4.83, Δ n; 0.141, η; 41.0

-continued
| No. |
|---|
8
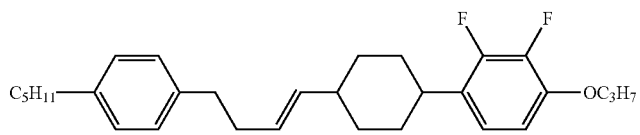
9
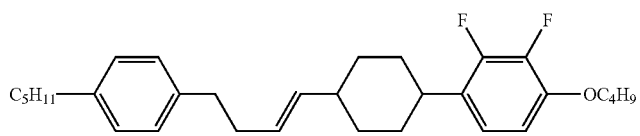
10
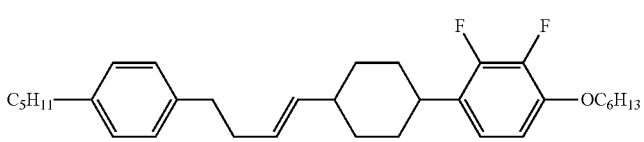
11
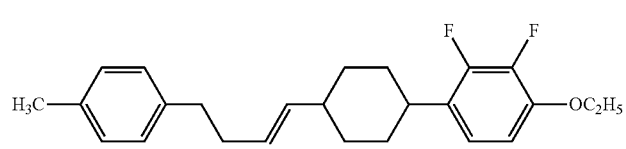
12
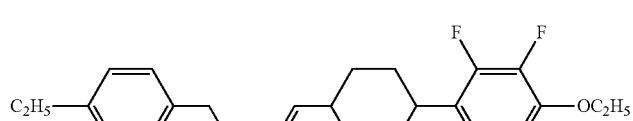
13
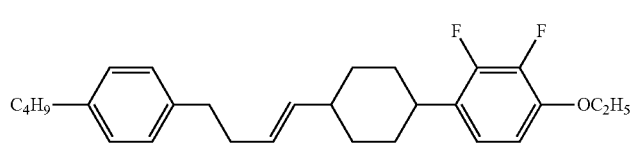
14
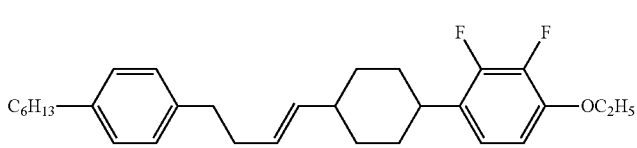
15
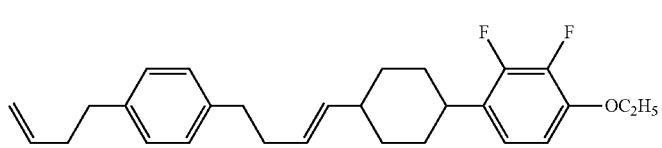 [SMILES: C=CCCc1ccc(CC/C=C/C2CCC(c3ccc(OCC)c(F)c3F)CC2)cc1]
16
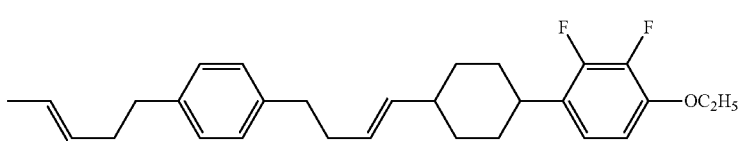 [SMILES: C/C=C/CCc1ccc(CC/C=C/C2CCC(c3ccc(OCC)c(F)c3F)CC2)cc1]
17
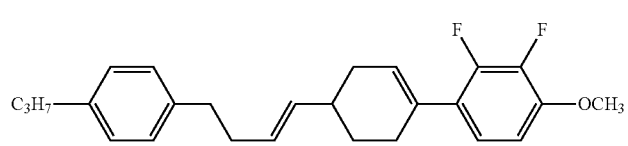
18
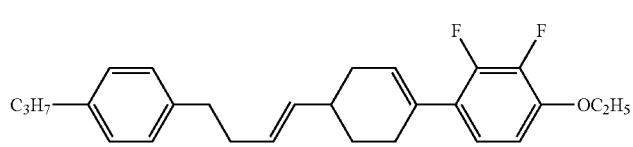

-continued
| No. | |
|---|---|
| 19 | 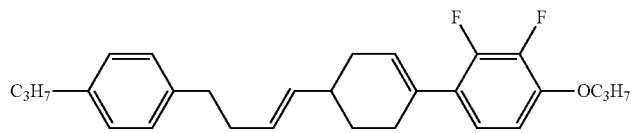 |
| 20 | 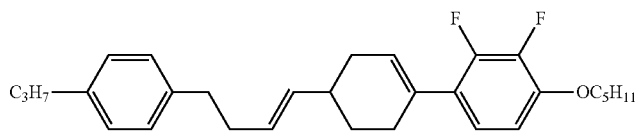 |
| 21 | 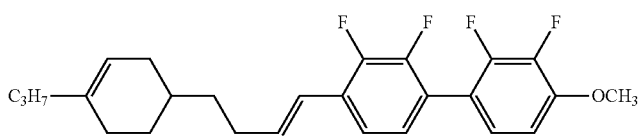 |
| 22 | 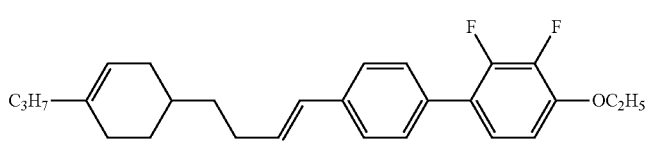 |
| 23 | 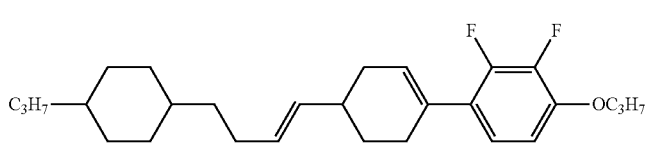 |
| 24 | 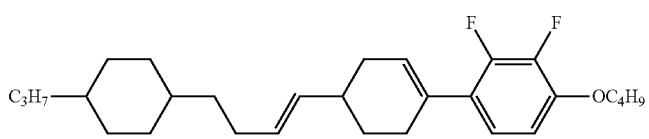 |
| 25 | 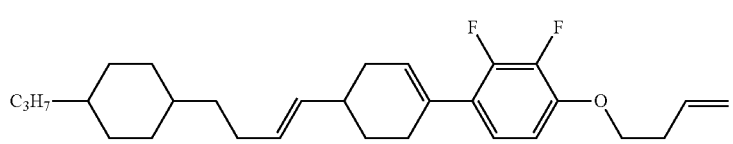 |
| 26 | 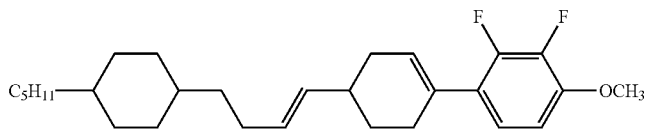 |
| 27 | 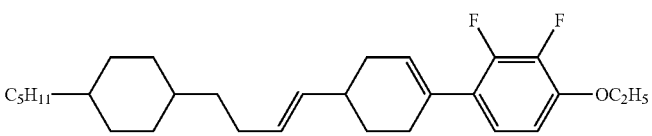 |
| 28 | 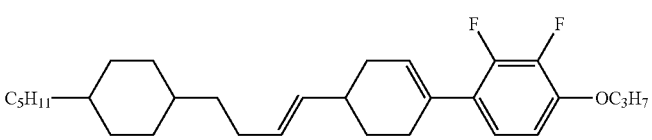 |
| 29 | 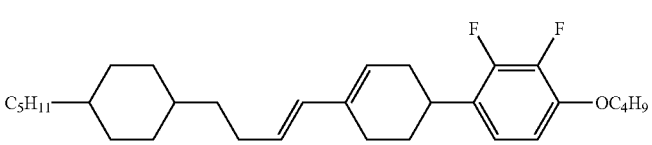 |

-continued
| No. | |
|---|---|
| 30 | 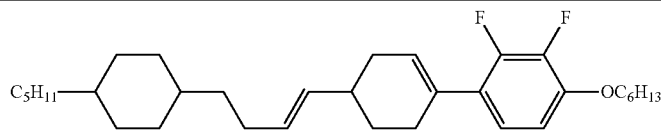 |
| 31 | 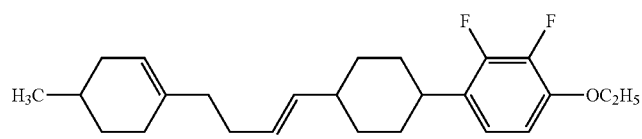 [SMILES: CCOc1ccc(C2CCC(/C=C/CCC3=CCC(C)CC3)CC2)c(F)c1F] |
| 32 | 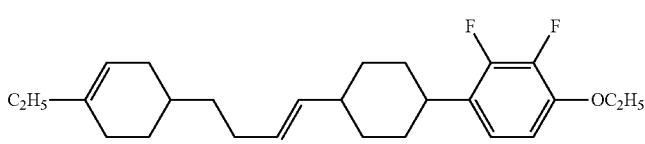 [SMILES: CCOc1ccc(C2CCC(/C=C/CCC3CC=C(CC)CC3)CC2)c(F)c1F] |
| 33 | 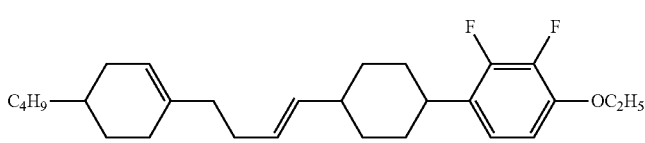 |
| 34 | 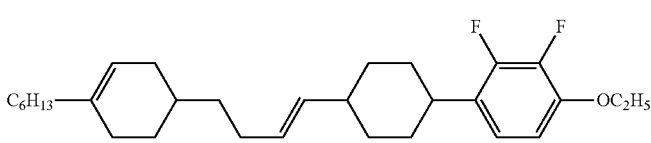 |
| 35 | 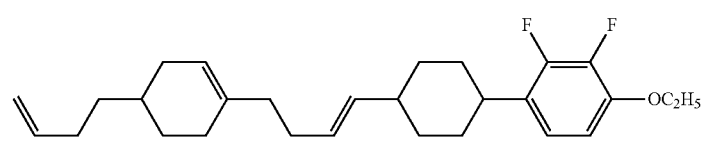 [SMILES: C=CCCC1CC=C(CC/C=C/C2CCC(c3ccc(OCC)c(F)c3F)CC2)CC1] |
| 36 | 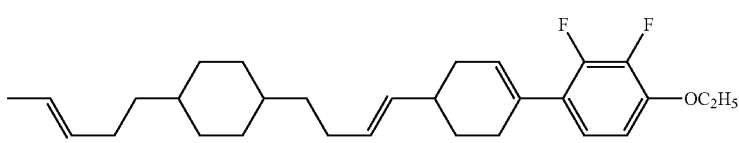 [SMILES: C/C=C/CCC1CCC(CC/C=C/C2CC=C(c3ccc(OCC)c(F)c3F)CC2)CC1] |
| 37 | 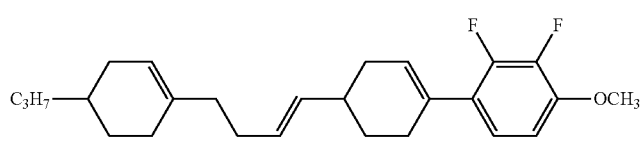 |
| 38 | 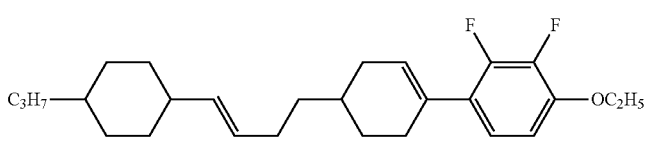 |
C 75.8 N 119.6 I
$T_{NI}$; 115.3° C., $\Delta \epsilon$; −4.99, $\Delta$ n; 0.136, η; 41.6
| 39 | 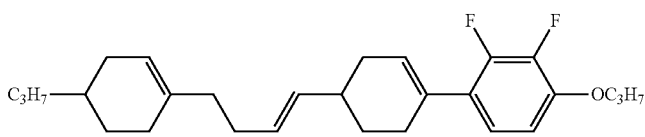 |
|---|---|
| 40 | 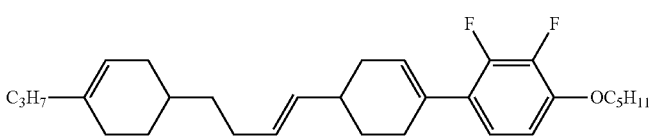 |

-continued
| No. | |
|---|---|
| 41 | 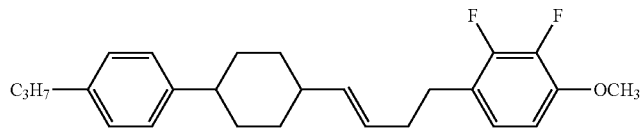 |
| 42 | 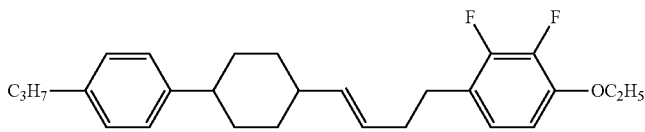<br>C 64.8 N 82.1 I<br>T$_{NI}$; 79.9° C., Δ ε; −4.06, Δ n; 0.136, η; 34.8 |
| 43 | 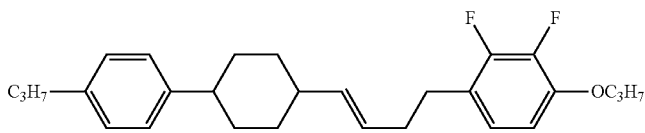 |
| 44 | 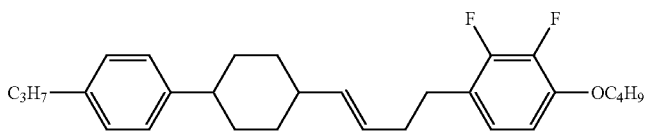 |
| 45 | 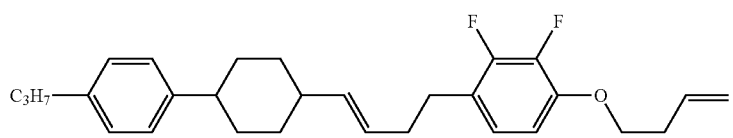 |
| 46 | 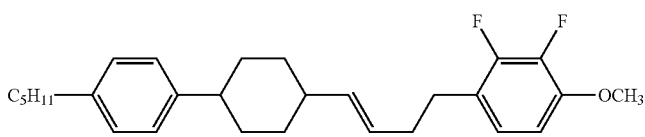 |
| 47 | 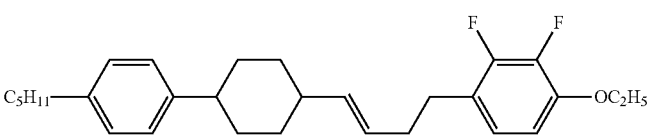 |
| 48 | 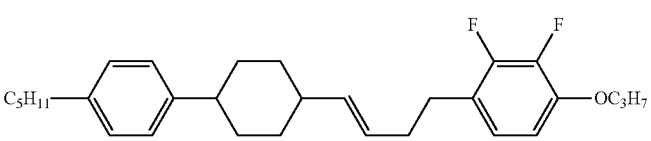 |
| 49 | 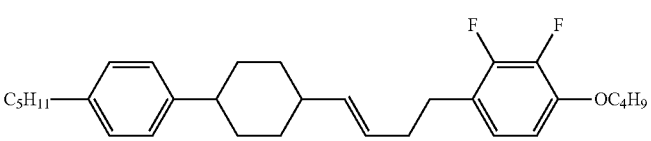 |
| 50 | 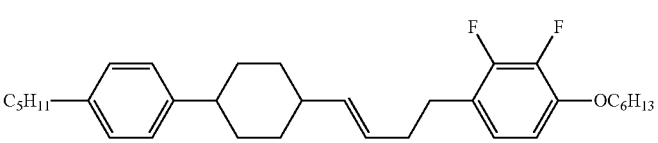 |

| No. |
|---|
| 51 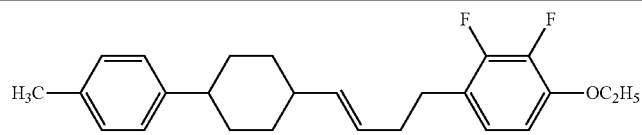 |
| 52 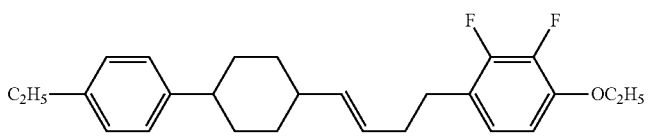 |
| 53 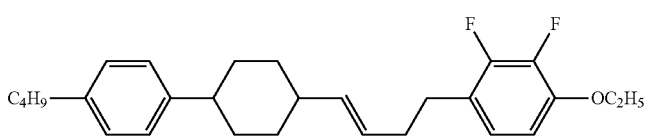 |
| 54 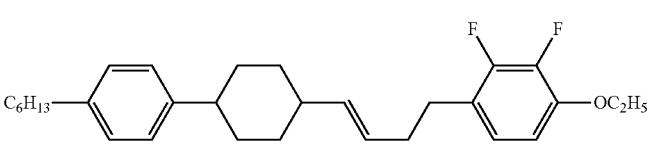 |
| 55 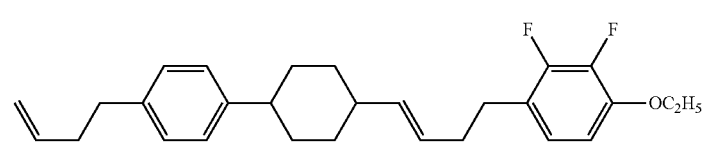 [SMILES: C=CCCc1ccc(C2CCC(/C=C/CCc3ccc(OCC)c(F)c3F)CC2)cc1] |
| 56 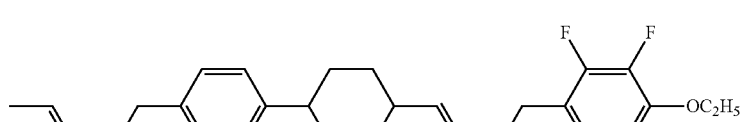 |
| 57 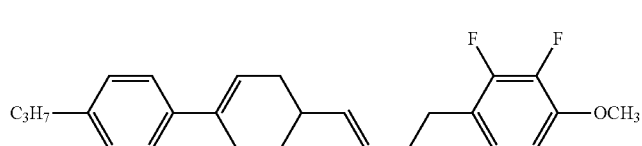 |
| 58 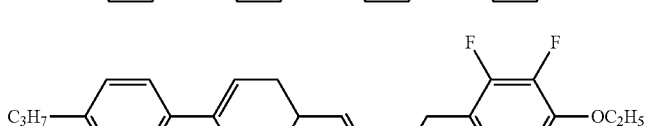 |
| 59  |
| 60 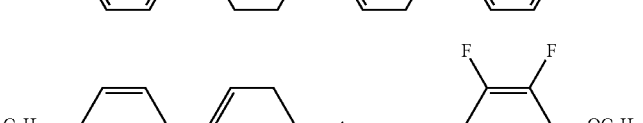 |
| 61 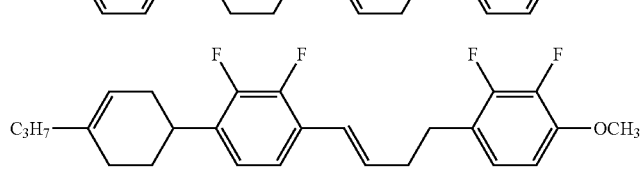 |

| No. | |
|---|---|
| 62 | 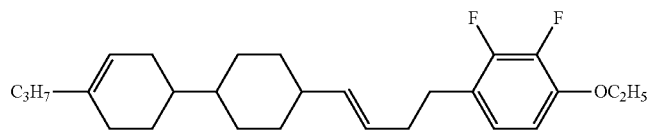 |
| 63 | 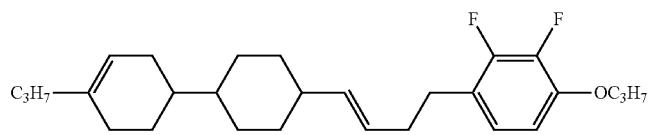 |
| 64 | 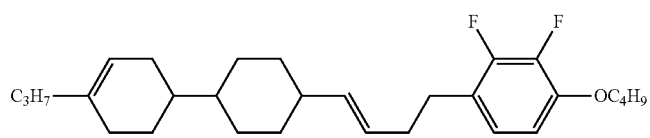 |
| 65 | 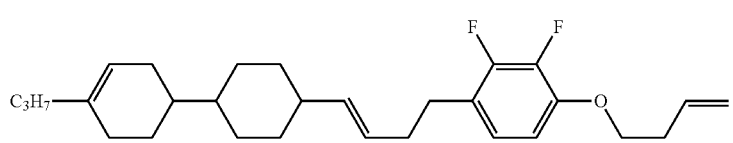 |
| 66 | 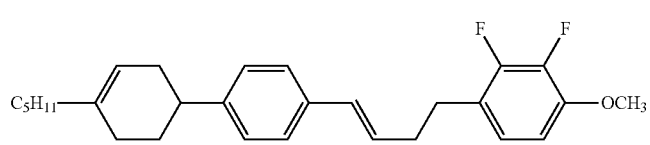 |
| 67 | 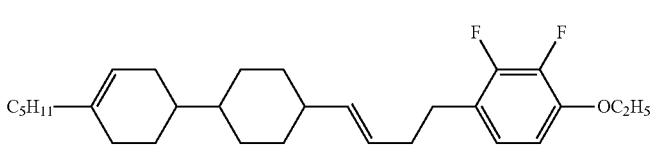 |
| 68 | 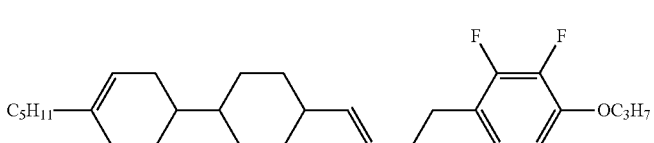 |
| 69 | 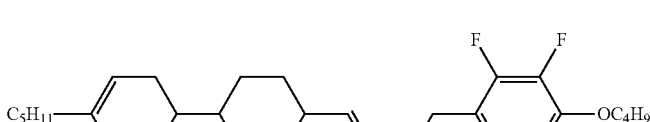 |
| 70 | 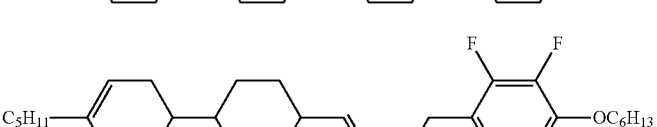 |
| 71 |  |
| 72 | 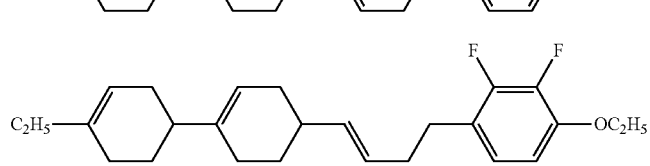 |

-continued
| No. | |
|---|---|
| 73 | 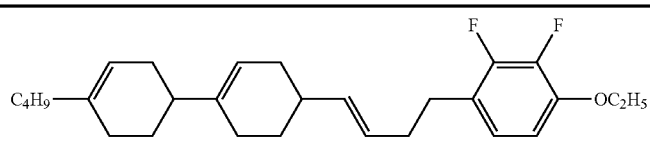 |
| 74 | 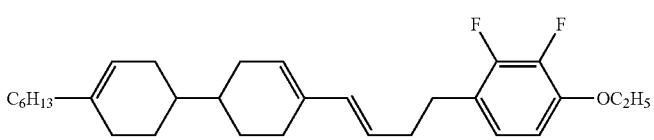 |
| 75 | 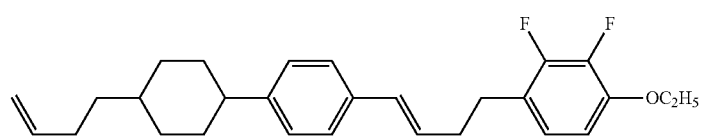 |
| 76 | 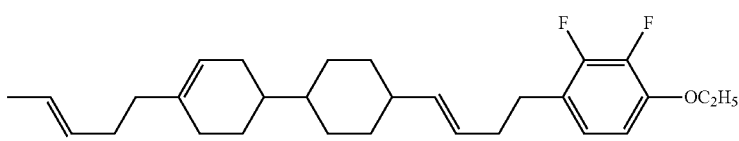 [SMILES: C/C=C/CCC1=CCC(C2CCC(/C=C/CCc3ccc(OCC)c(F)c3F)CC2)CC1] |
| 77 | 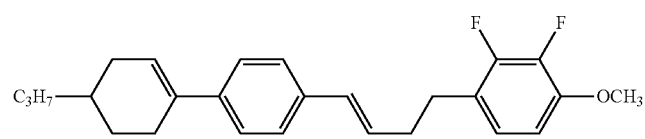 |
| 78 | 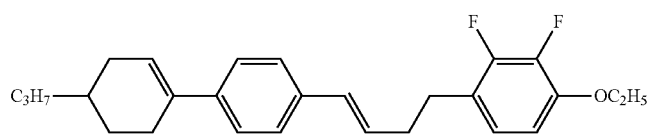 |
| 79 | 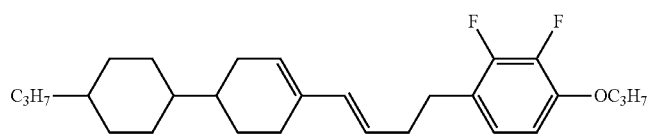 |
| 80 | 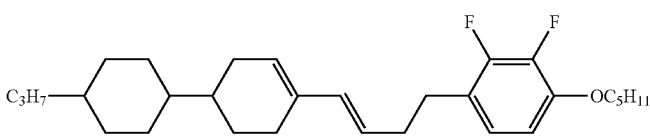 |
| 81 | 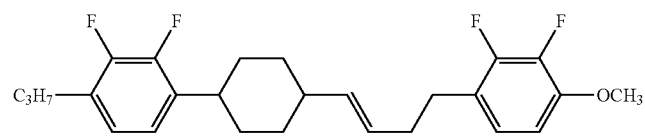 |
| 82 | 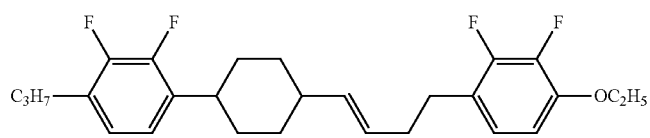 |
| | C 63.8 N 90.8 I |
| | $T_{NI}$; 87.9° C., Δ ϵ; −7.79, Δ n; 0.141, η; 69.6 |
| 83 | 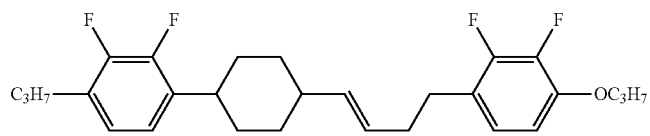 |

-continued
| No. |
|---|
| 84 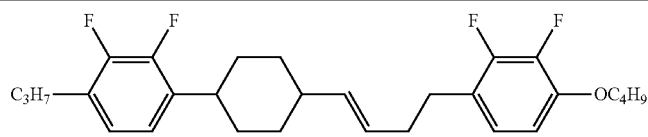 |
| 85 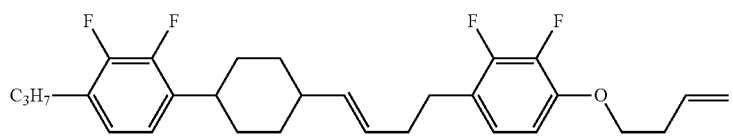 |
| 86 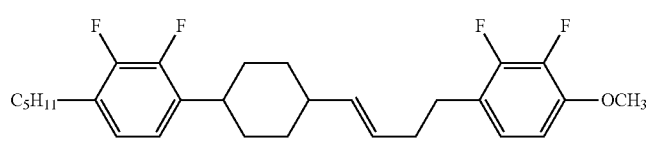 |
| 87 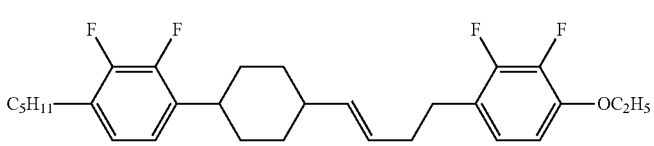 |
| 88 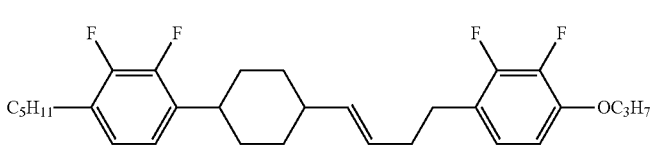 |
| 89 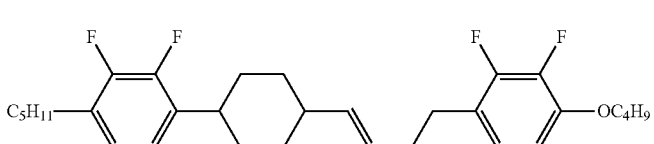 |
| 90 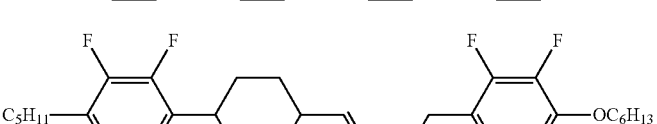 |
| 91 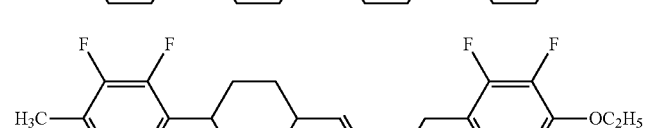 |
| 92 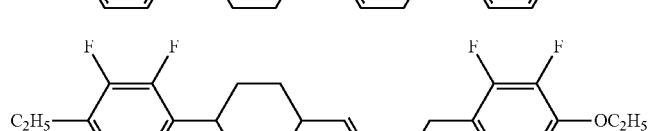 |
| 93 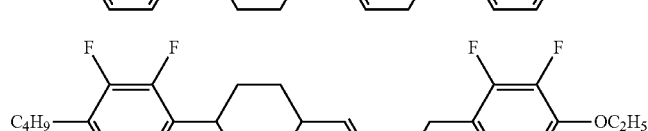 |
| 94 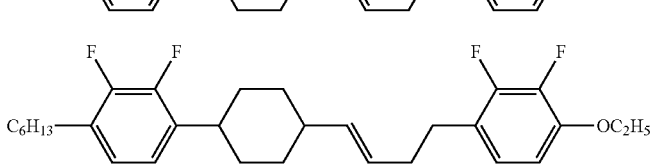 |

| No. |
| --- |
| 95 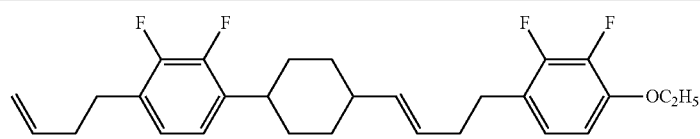 |
| 96 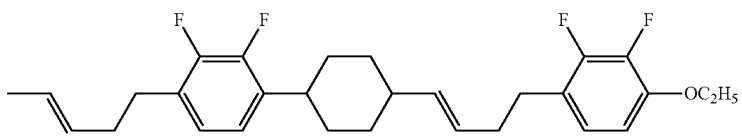 [SMILES: C/C=C/CCc1ccc(C2CCC(/C=C/CCc3ccc(OCC)c(F)c3F)CC2)c(F)c1F] |
| 97 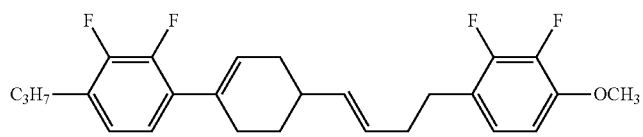 |
| 98 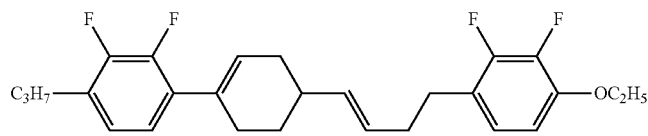 |
| 99 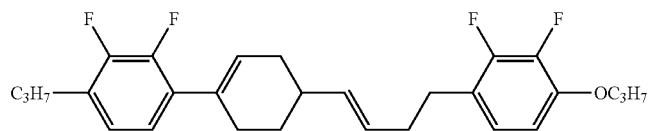 |
| 100 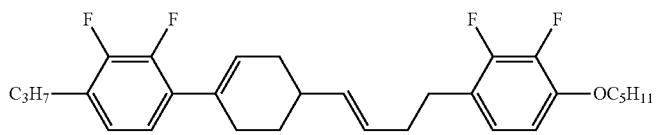 |
| 101 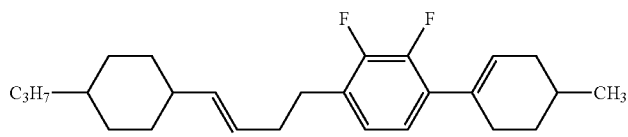 |
| 102 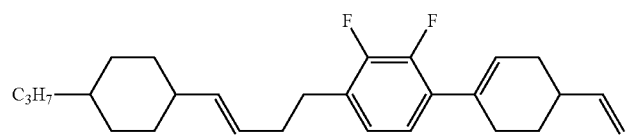<br>C 20.2 N 77.4 I<br>$T_{NI}$; 71.9° C., Δ ε; −2.06, Δ n; 0.128, η; 23.6 |
| 103 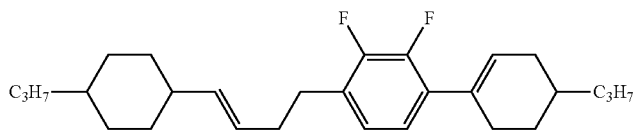 |
| 104 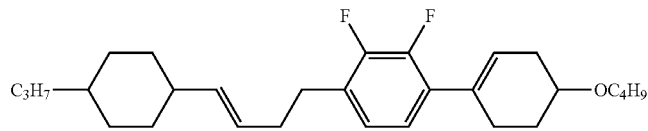 |

| No. | |
|---|---|
| 105 | 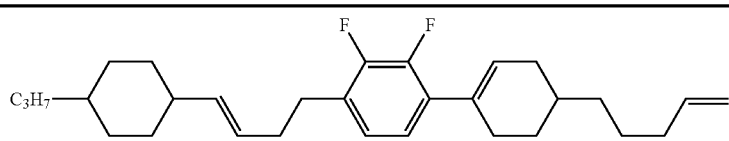 |
| 106 | 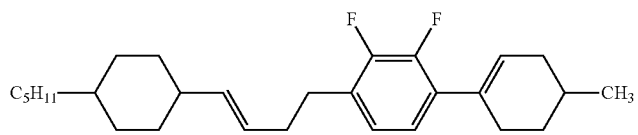 |
| 107 | 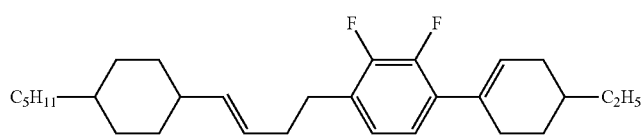 |
| 108 | 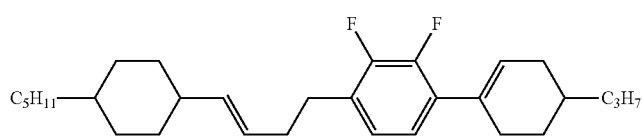 |
| 109 | 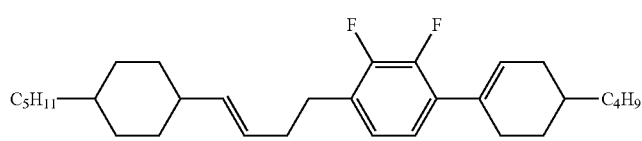 |
| 110 | 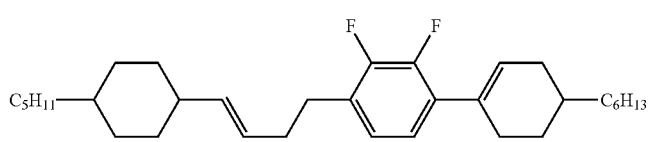 |
| 111 | 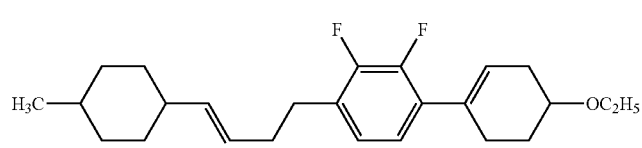 [SMILES: CCOC1CC=C(c2ccc(CC/C=C/C3CCC(C)CC3)c(F)c2F)CC1] |
| 112 | 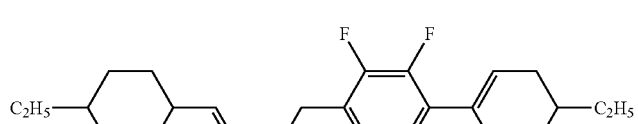 |
| 113 | 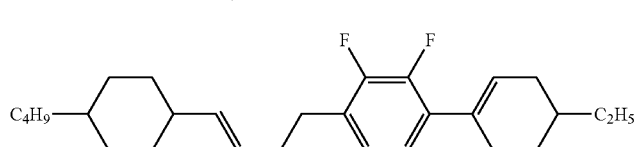 |
| 114 | 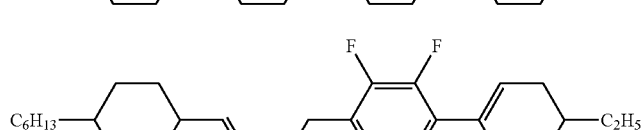 |
| 115 | 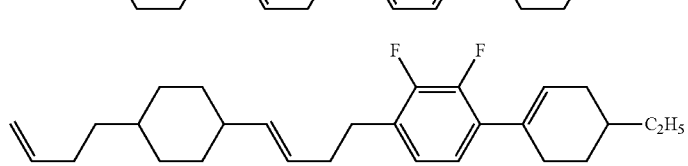 |

-continued
| No. | |
|---|---|
| 116 | 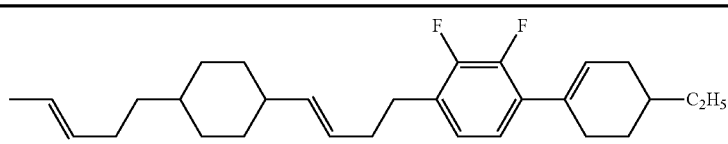 |
| 117 | 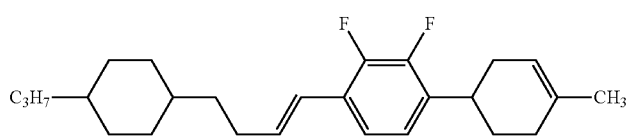 |
| 118 | 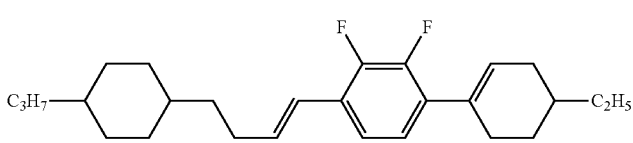 |
| 119 | 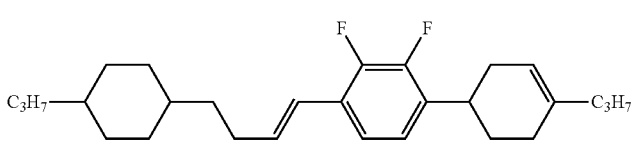 |
| 120 | 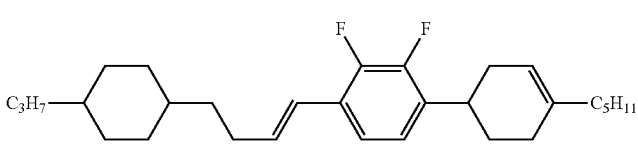 |
| 121 | 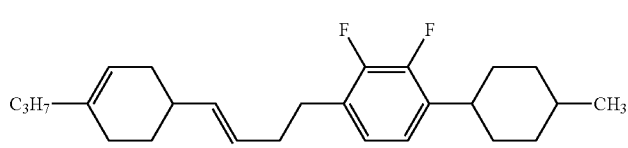 |
| 122 | 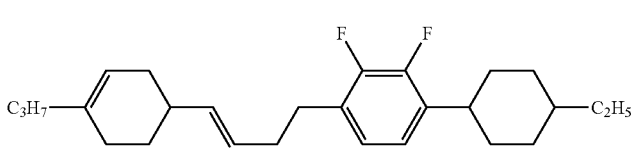 |
| 123 | 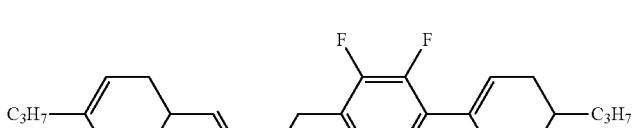 |
| 124 | 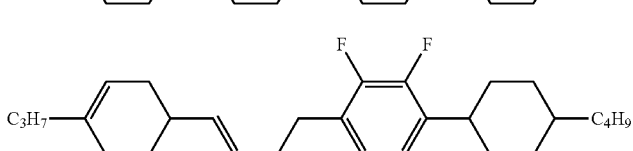 |
| 125 | 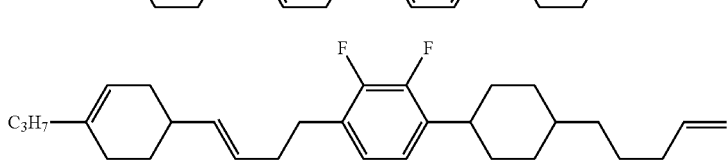 |
| 126 | 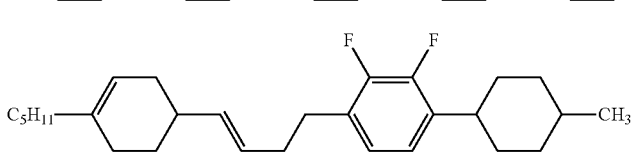 |

-continued
| No. | |
|---|---|
| 127 | 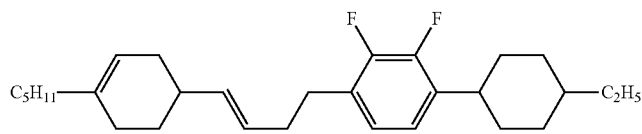 |
| 128 | 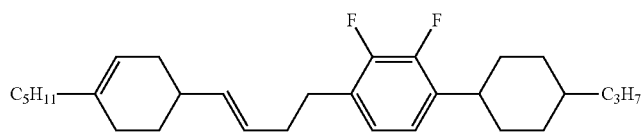 |
| 129 | 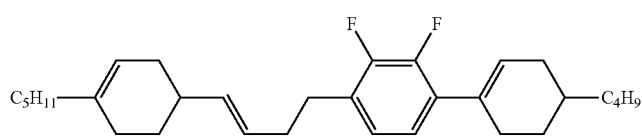 |
| 130 | 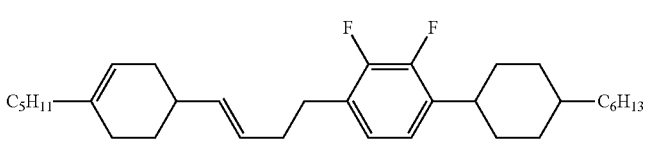 |
| 131 | 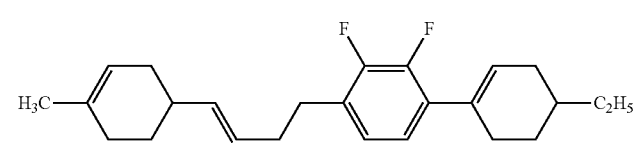 |
| 132 | 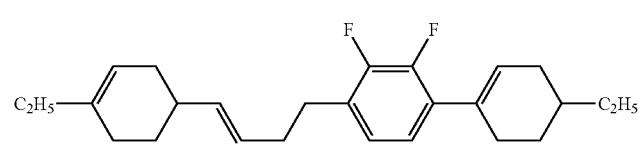 [SMILES: CCC1=CCC(/C=C/CCc2ccc(C3=CCC(CC)CC3)c(F)c2F)CC1] |
| 133 | 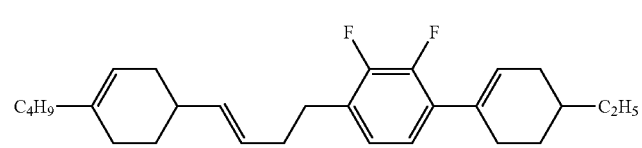 |
| 134 | 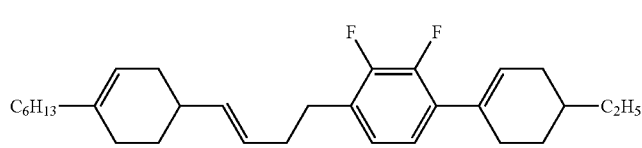 |
| 135 | 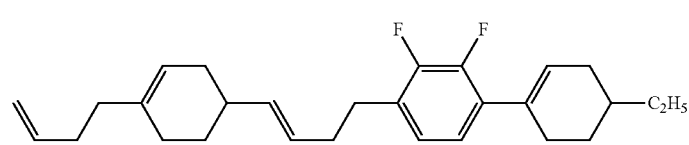 [SMILES: C=CCCC1=CCC(/C=C/CCc2ccc(C3=CCC(CC)CC3)c(F)c2F)CC1] |
| 136 | 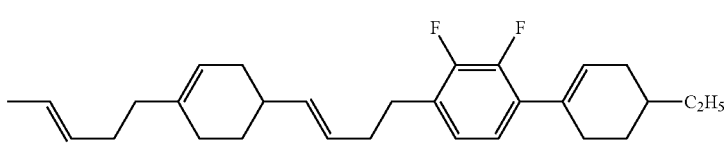 [SMILES: C/C=C/CCC1=CCC(/C=C/CCc2ccc(C3=CCC(CC)CC3)c(F)c2F)CC1] |
| 137 | 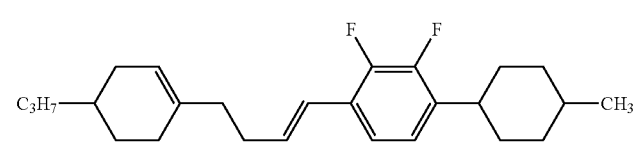 |

| No. | |
|---|---|
| 138 | 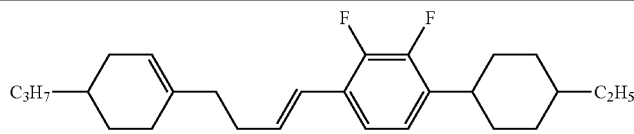 |
| 139 | 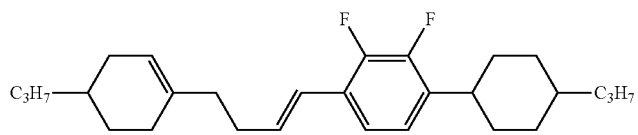 |
| 140 | 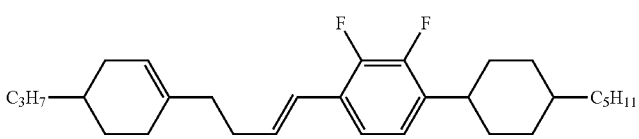 |
| 141 | 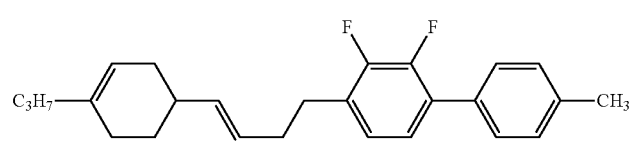 |
| 142 | 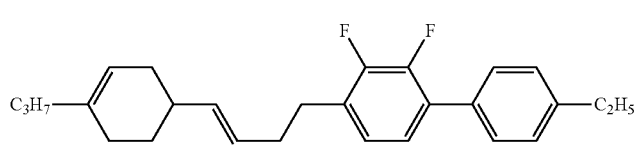 |
| 143 | 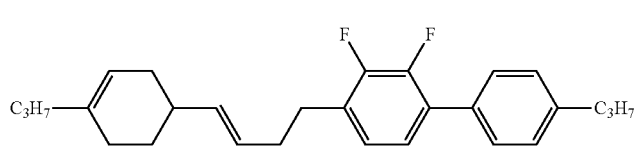 |
| 144 | 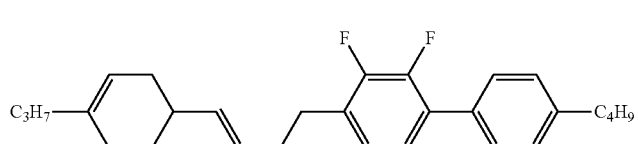 |
| 145 | 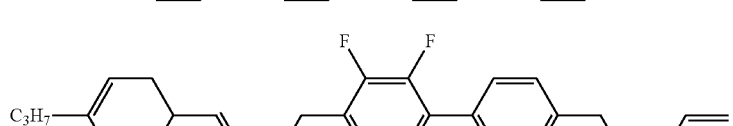 |
| 146 | 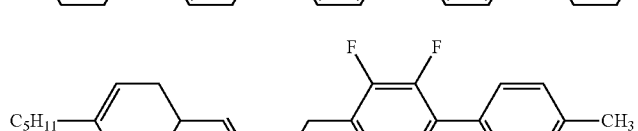 |
| 147 | 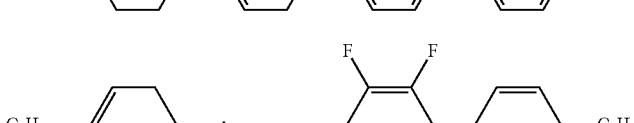 |
| 148 | 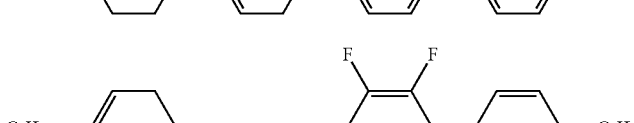 |

-continued
| No. | |
|---|---|
| 149 | 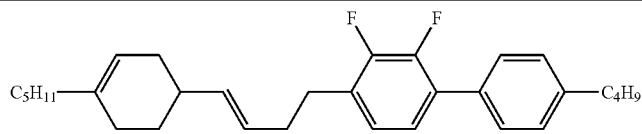 |
| 150 | 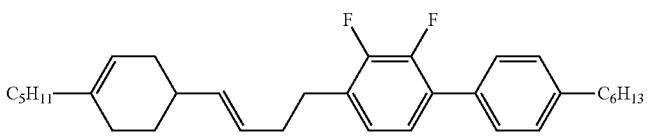 |
| 151 | 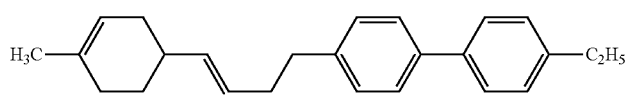 [SMILES: CCc1ccc(-c2ccc(CC/C=C/C3CC=C(C)CC3)cc2)cc1] |
| 152 | 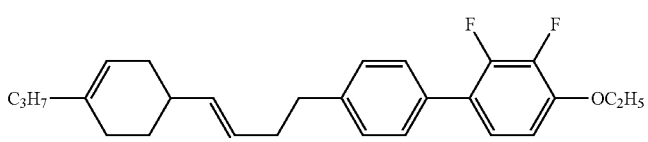<br>C 56.0 N 96.2 I<br>$T_{Ni}$; 90.6° C., $\Delta \epsilon$; −5.00, $\Delta$ n; 0.176, $\eta$; 56.6 |
| 153 | 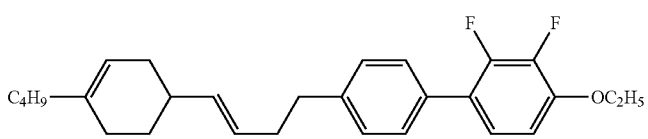 |
| 154 | 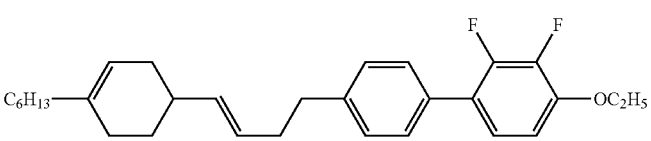 |
| 155 | 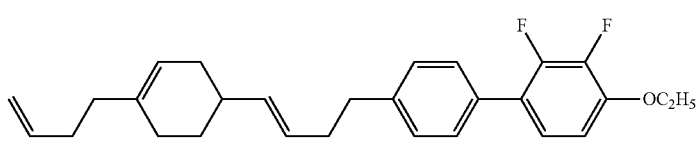 [SMILES: C=CCCC1=CCC(/C=C/CCc2ccc(-c3ccc(OCC)c(F)c3F)cc2)CC1] |
| 156 | 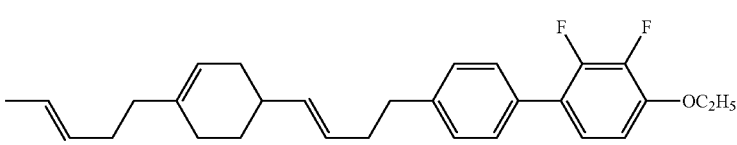 [SMILES: C/C=C/CCC1=CCC(/C=C/CCc2ccc(-c3ccc(OCC)c(F)c3F)cc2)CC1] |
| 157 | 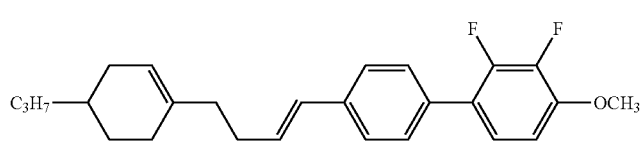 |
| 158 | 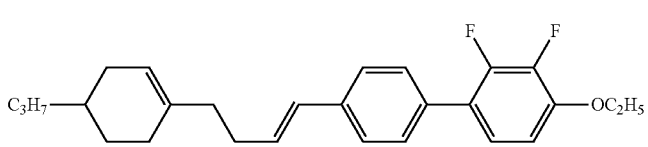 |
| 159 | 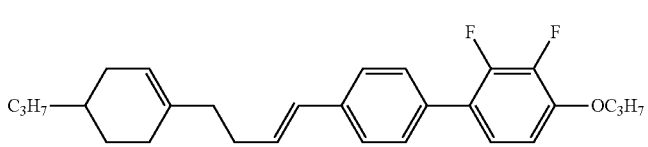 |

-continued
| No. | |
|---|---|
| 160 | 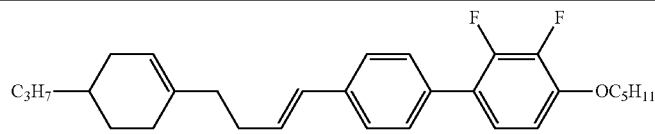 |
| 161 | 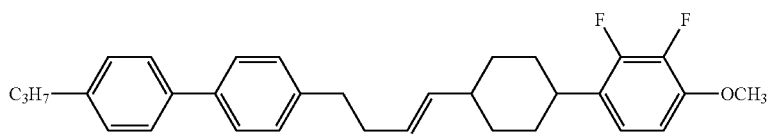 |
| 162 | 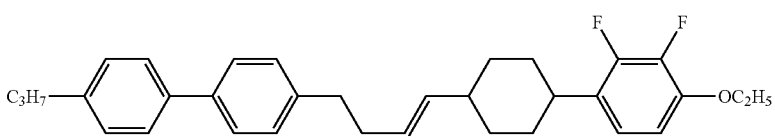<br>C 73.4 S$_B$ 92.8 N 214.3 I<br>T$_{NI}$; 205.9° C., Δ ε; −4.40, Δ n; 0.220, η; 55.7 |
| 163 | 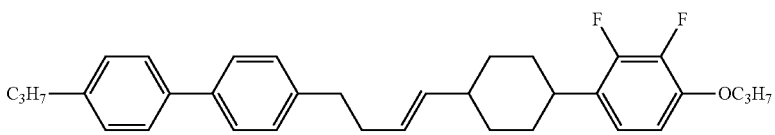 |
| 164 | 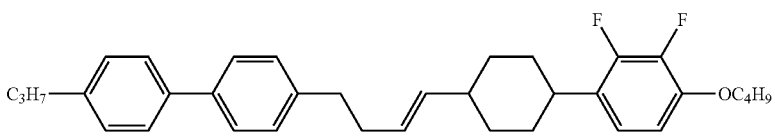 |
| 165 | 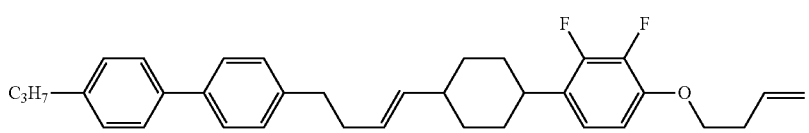 |
| 166 | 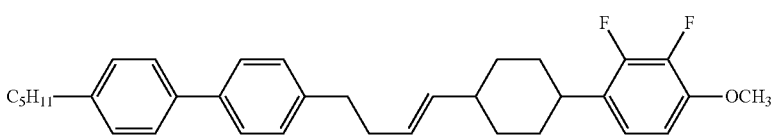 |
| 167 | 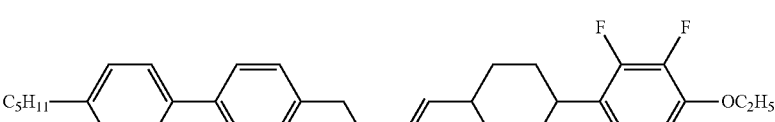 |
| 168 | 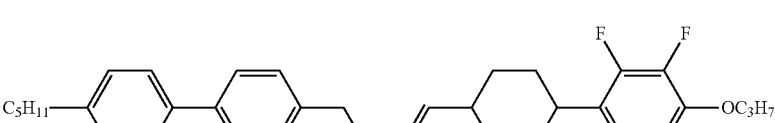 |
| 169 | 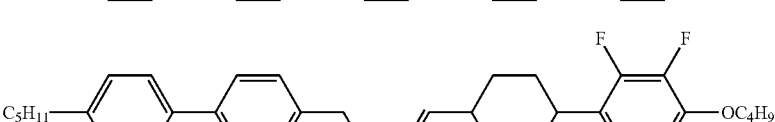 |
| 170 | 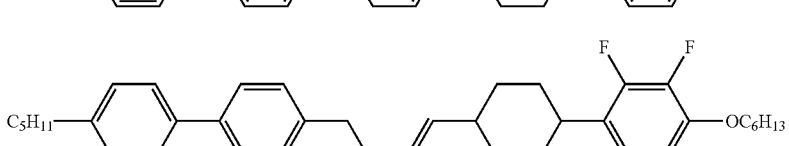 |

-continued
| No. | |
|---|---|
| 171 | 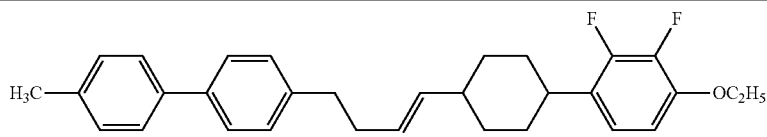 |
| 172 | 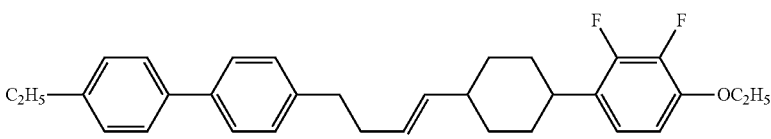 |
| 173 | 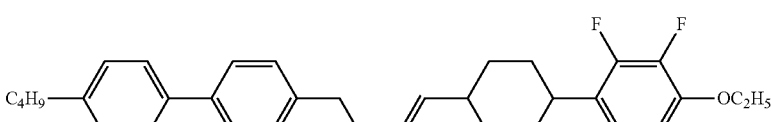 |
| 174 | 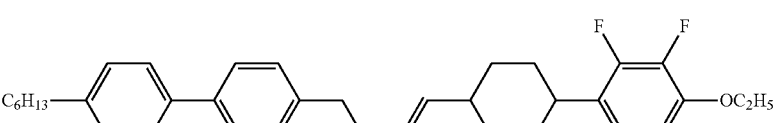 |
| 175 | 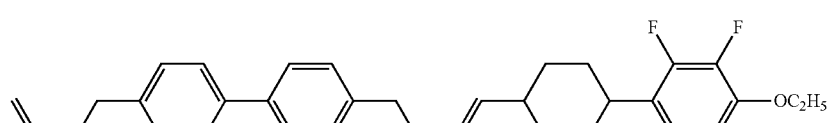 |
| 176 | 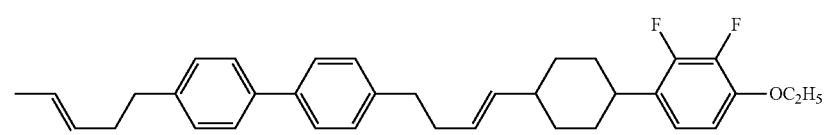 [SMILES: C/C=C/CCc1ccc(-c2ccc(CC/C=C/C3CCC(c4ccc(OCC)c(F)c4F)CC3)cc2)cc1] |
| 177 | 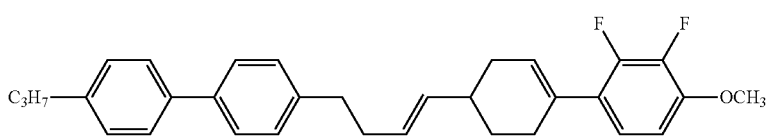 |
| 178 | 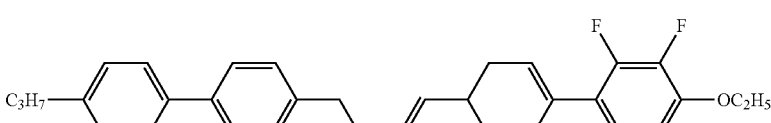 |
| 179 | 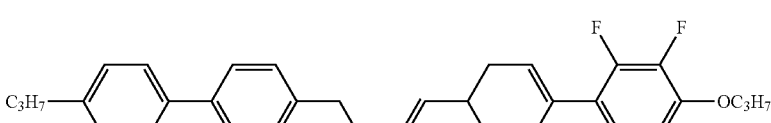 |
| 180 | 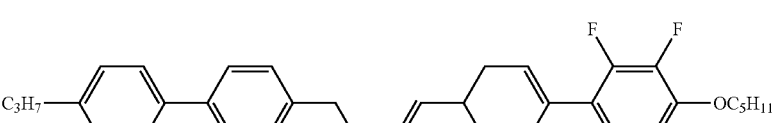 |
| 181 | 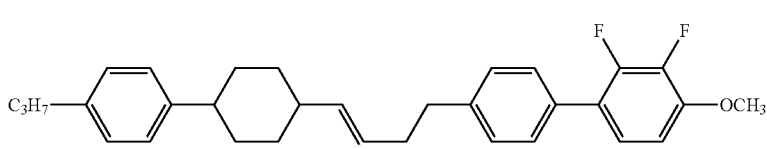 |

-continued
| No. | |
|---|---|
| 182 |  C 135.1 N 209.8 I  T$_{NI}$; 199.6° C., Δ ε; −4.01, Δ n; 0.217, η; 51.6 |
| 183 | 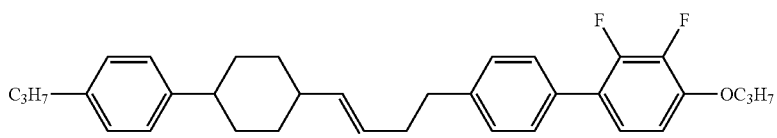 |
| 184 | 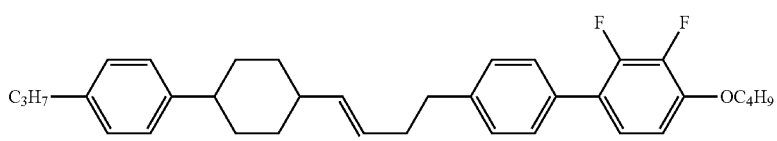 |
| 185 | 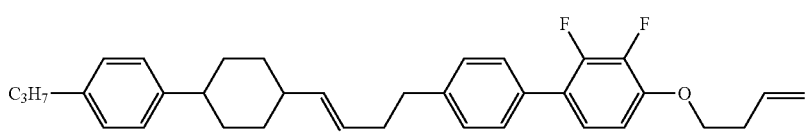 |
| 186 | 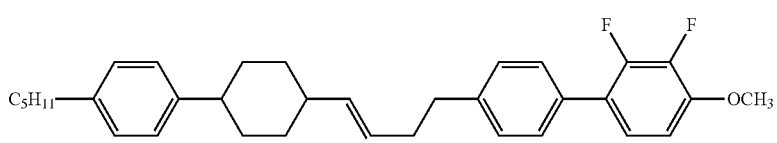 |
| 187 | 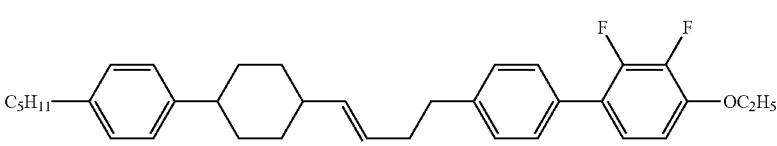 |
| 188 | 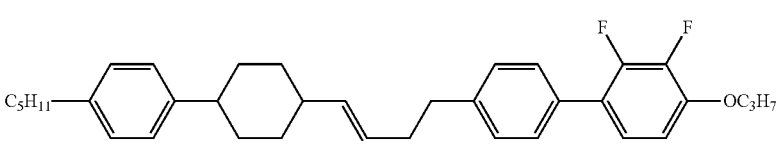 |
| 189 | 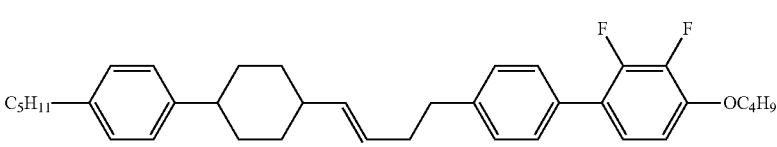 |
| 190 | 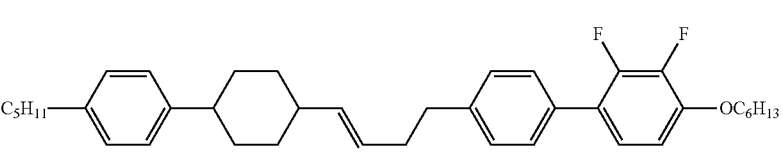 |
| 191 | 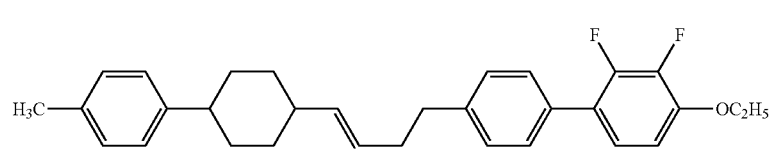 [SMILES: CCOc1ccc(-c2ccc(CC/C=C/C3CCC(c4ccc(C)cc4)CC3)cc2)c(F)c1F] |

-continued
| No. | |
|---|---|
| 192 | 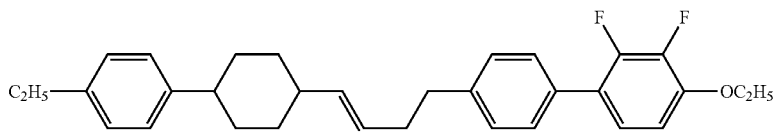 |
| 193 | 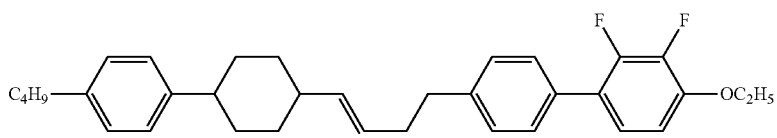 |
| 194 | 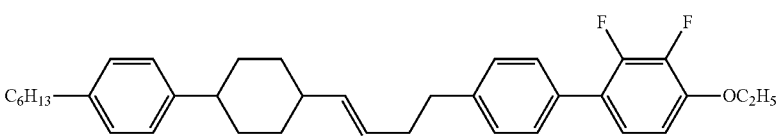 |
| 195 | 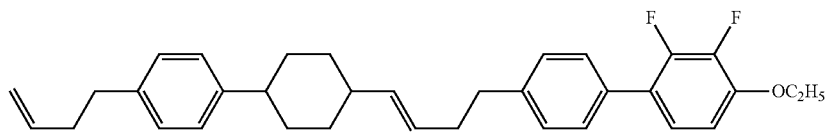 [SMILES: C=CCCc1ccc(C2CCC(/C=C/CCc3ccc(-c4ccc(OCC)c(F)c4F)cc3)CC2)cc1] |
| 196 | 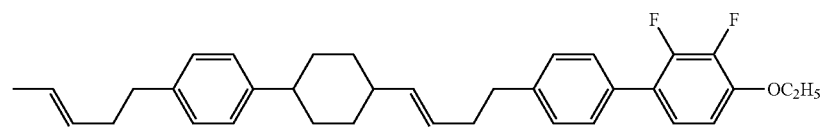 |
| 197 | 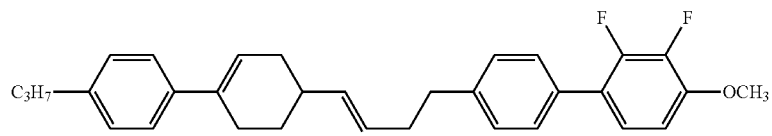 |
| 198 | 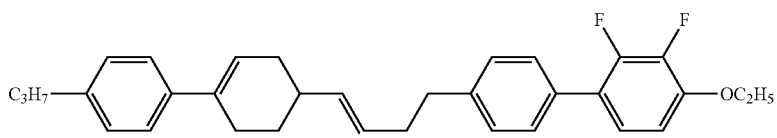 |
| 199 | 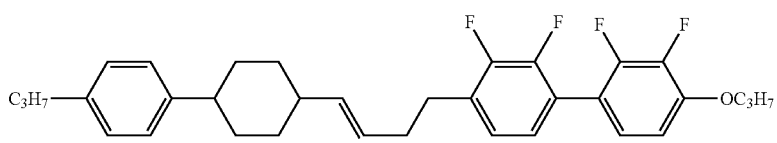 |
| 200 | 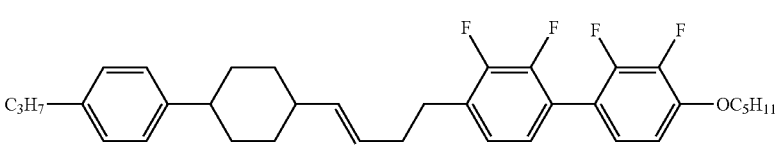 |
| 201 | 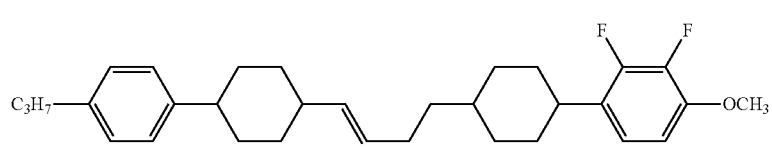 |

-continued
| No. | |
|---|---|
| 202 | 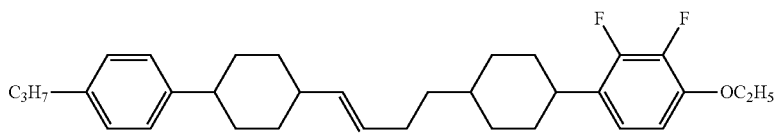 C 83.8 S$_B$ 139.0 N 222.5 I<br>T$_{NI}$; 189.3° C., Δ ε; −4.09, Δ n; 0.154, η; 63.3 |
| 203 | 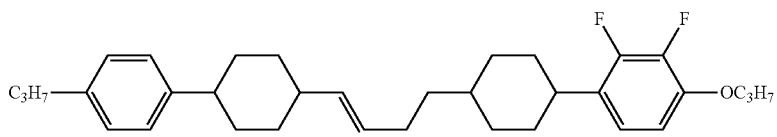 |
| 204 | 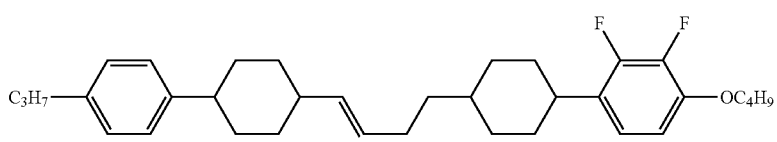 |
| 205 | 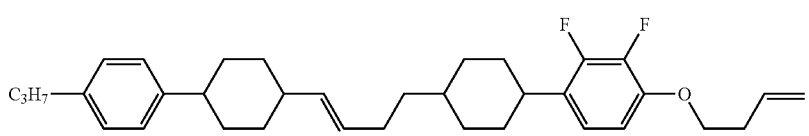 |
| 206 | 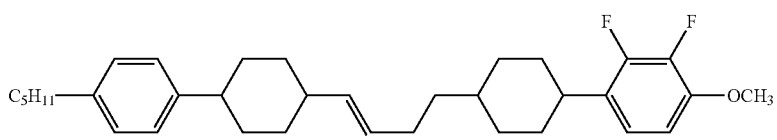 |
| 207 | 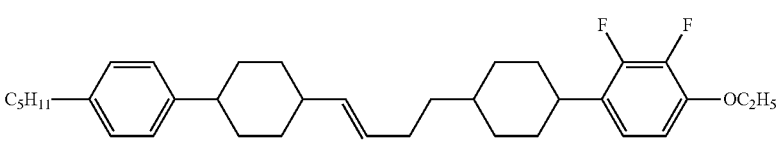 |
| 208 | 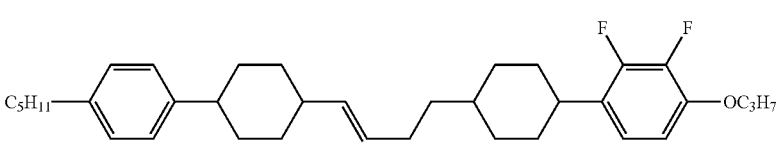 |
| 209 | 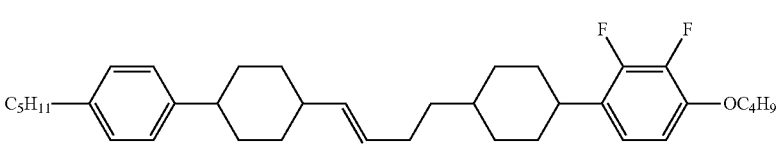 |
| 210 | 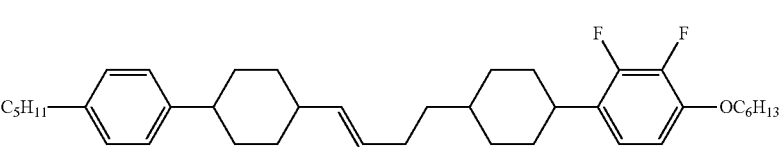 |
| 211 | 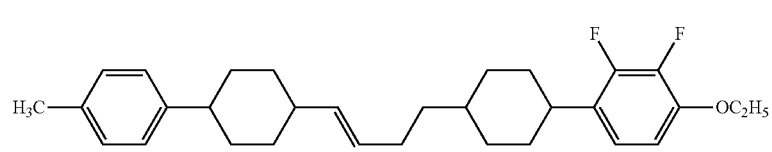 [SMILES: CCOc1ccc(C2CCC(CC/C=C/C3CCC(c4ccc(C)cc4)CC3)CC2)c(F)c1F] |

-continued
| No. |  |
|---|---|
| 212 | 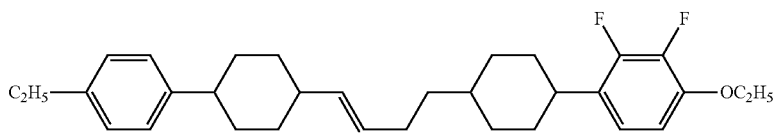 |
| 213 | 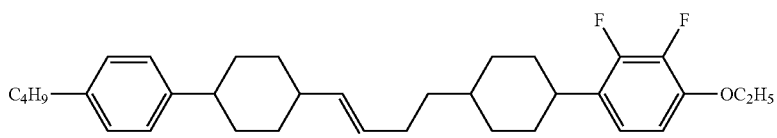 |
| 214 | 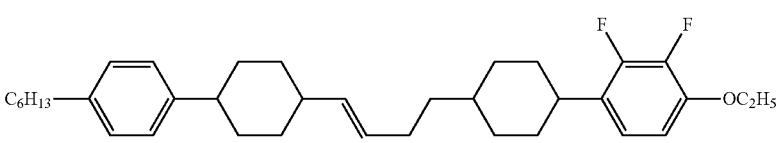 |
| 215 | 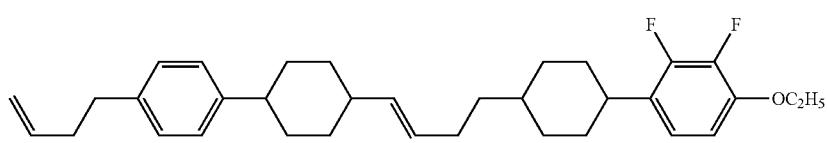 |
| 216 | 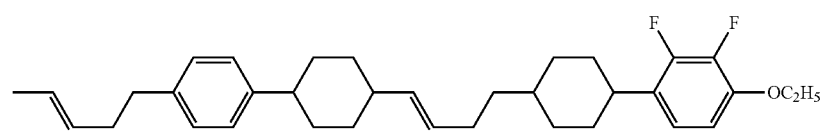 |
| 217 | 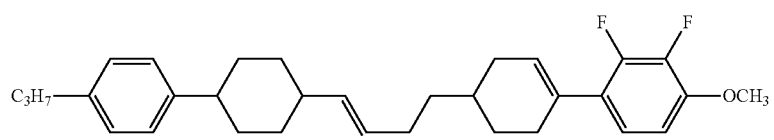 |
| 218 | 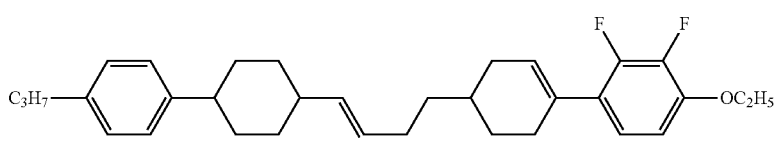 |
| 219 | 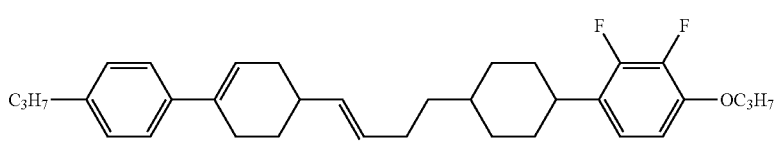 |
| 220 | 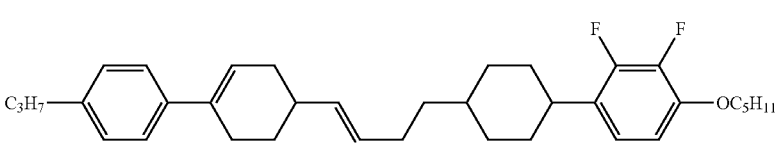 |
| 221 | 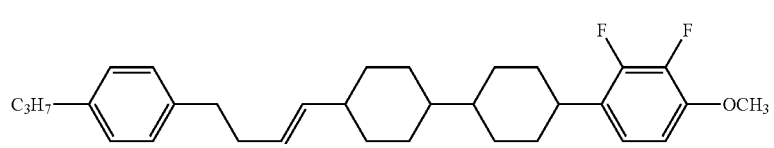 |

| No. | |
|---|---|
| 222 | 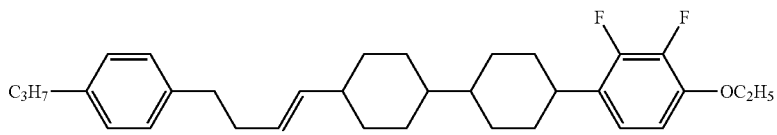 |
C 74.2 S$_B$ 155.2 N 228.8 I
T$_{NI}$; 205.3° C., Δ ϵ; −4.55, Δ n; 0.153, η; 55.7
| | |
|---|---|
| 223 | 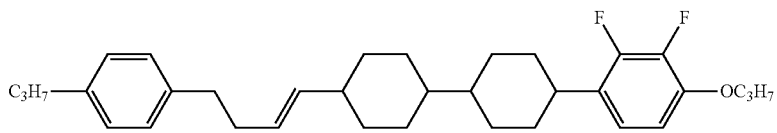 |
| 224 | 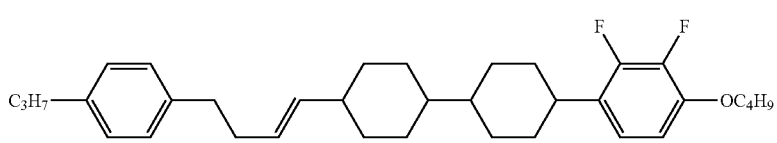 |
| 225 | 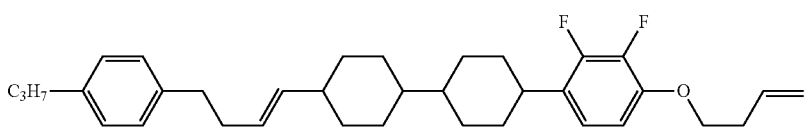 |
| 226 | 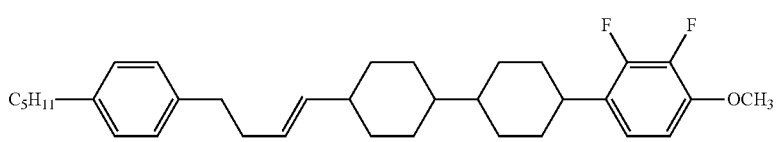 |
| 227 | 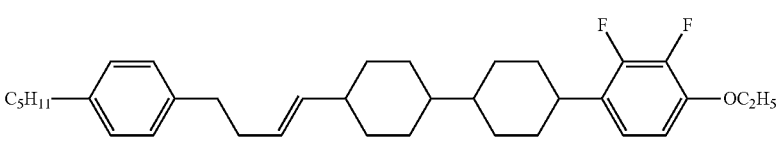 |
| 228 | 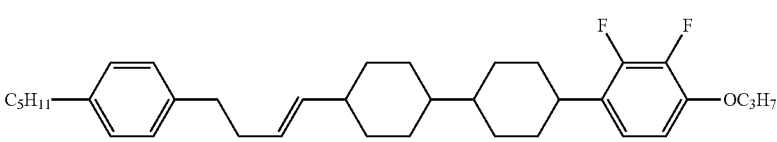 |
| 229 | 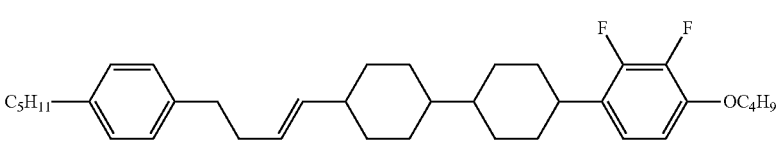 |
| 230 | 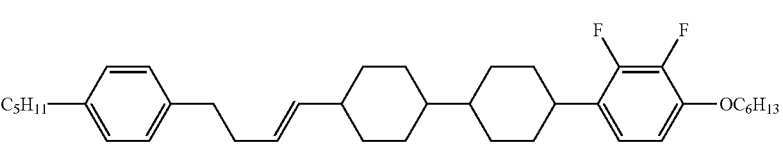 |
| 231 | 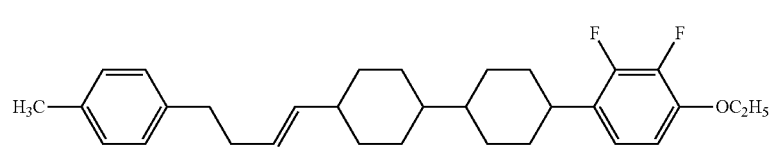 [SMILES: CCOc1ccc(C2CCC(C3CCC(/C=C/CCc4ccc(C)cc4)CC3)CC2)c(F)c1F] |
| 232 | 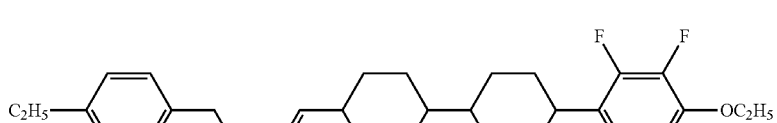 |

| No. | |
|---|---|
| 233 | 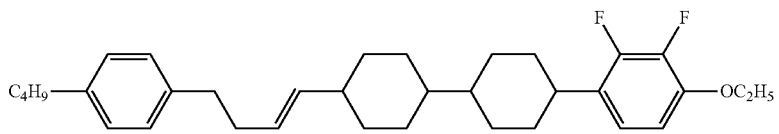 |
| 234 | 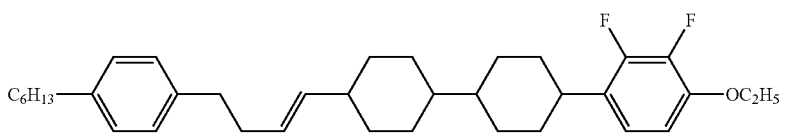 |
| 235 | 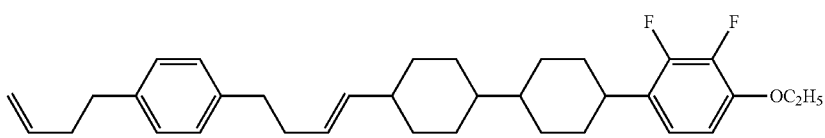 [SMILES: C=CCCc1ccc(CC/C=C/C2CCC(C3CCC(c4ccc(OCC)c(F)c4F)CC3)CC2)cc1] |
| 236 | 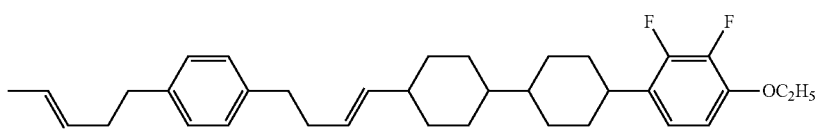 [SMILES: C/C=C/CCc1ccc(CC/C=C/C2CCC(C3CCC(c4ccc(OCC)c(F)c4F)CC3)CC2)cc1] |
| 237 | 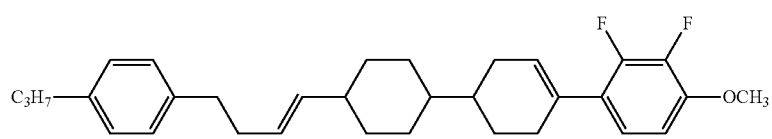 |
| 238 | 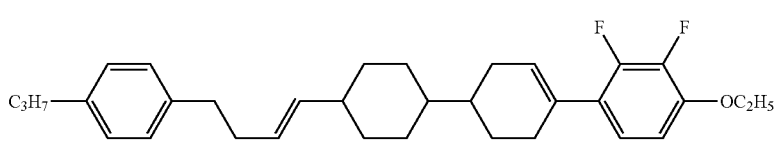 |
| 239 | 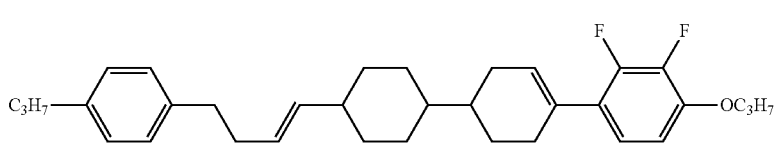 |
| 240 | 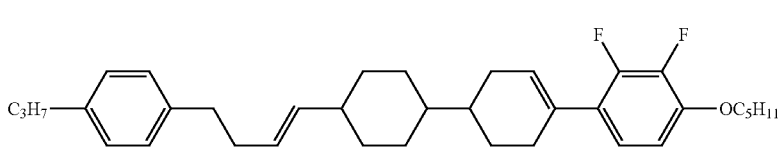 |
| 241 | 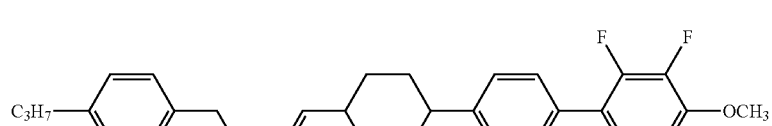 |
| 242 | 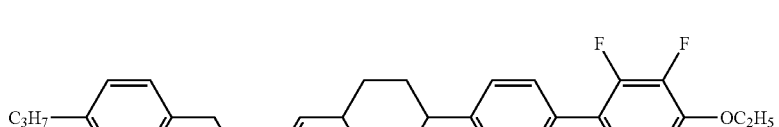 |
C 97.9 $S_B$ 100.7 N 230.4 I
$T_{NI}$; 207.9° C., $\Delta \epsilon$; −4.32, $\Delta$ n; 0.219, η; 56.3

| No. | |
|---|---|
| 243 | 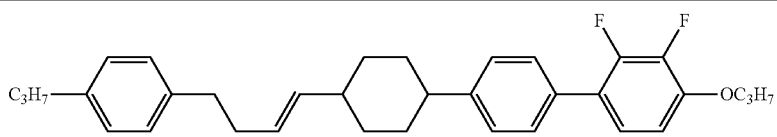 |
| 244 | 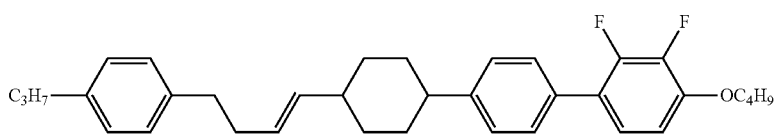 |
| 245 | 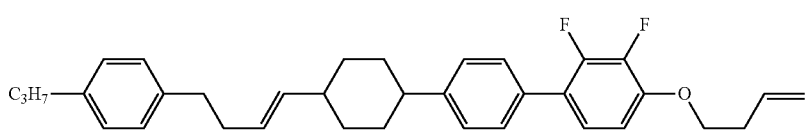 |
| 246 | 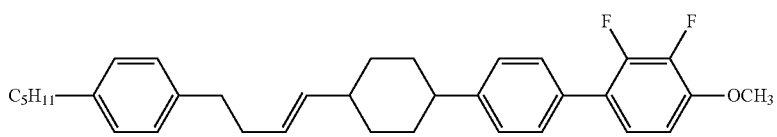 |
| 247 | 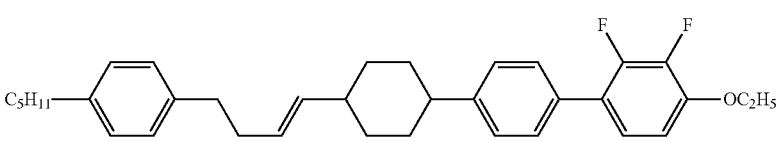 |
| 248 | 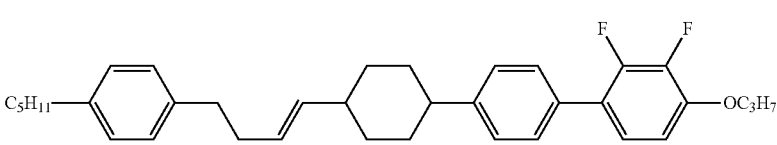 |
| 249 | 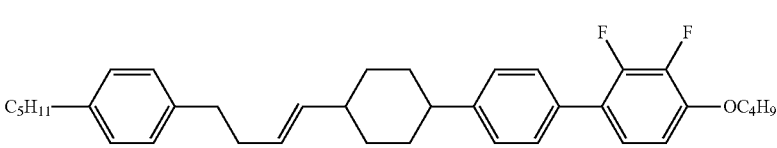 |
| 250 | 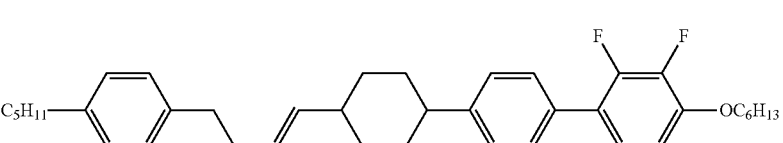 |
| 251 | 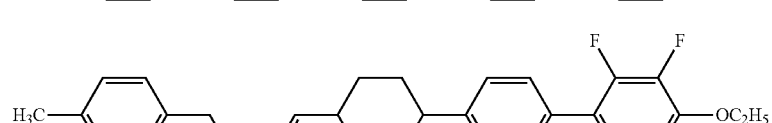 |
| 252 | 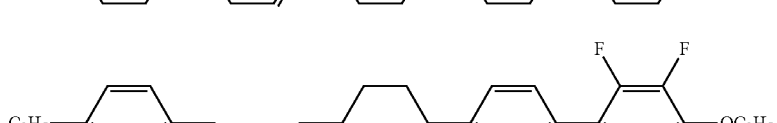 |
| 253 | 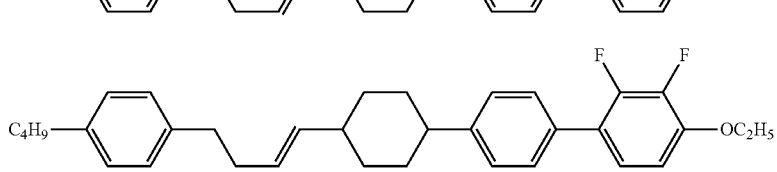 |

-continued
| No. | |
|---|---|
| 254 | 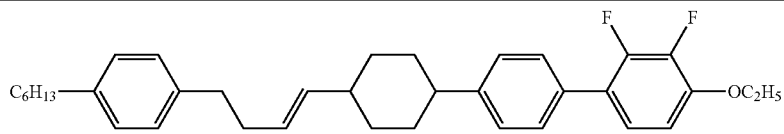 |
| 255 | 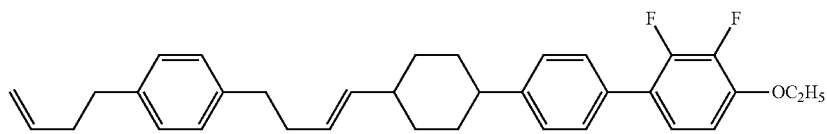 [SMILES: C=CCCc1ccc(CC/C=C/C2CCC(c3ccc(-c4ccc(OCC)c(F)c4F)cc3)CC2)cc1] |
| 256 | 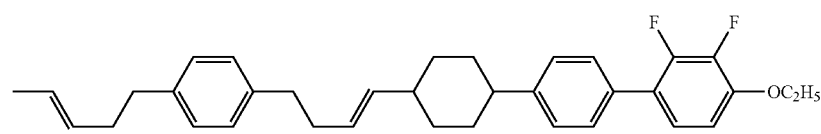 |
| 257 | 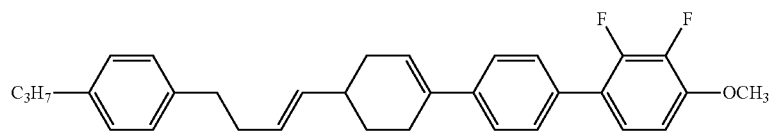 |
| 258 | 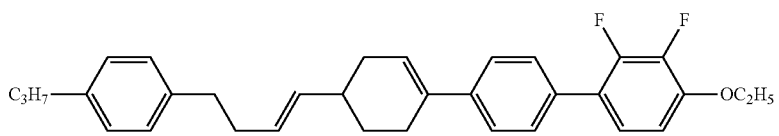 |
| 259 | 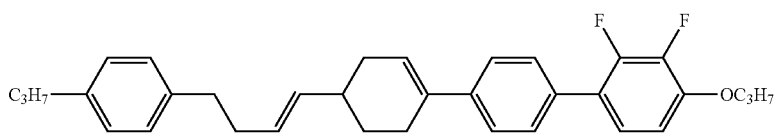 |
| 260 | 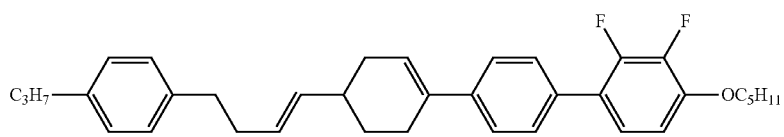 |
| 261 | 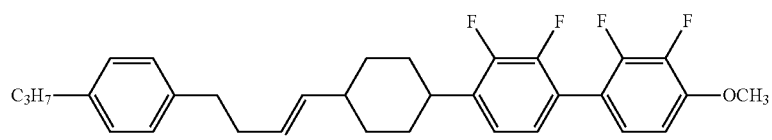 |
| 262 | 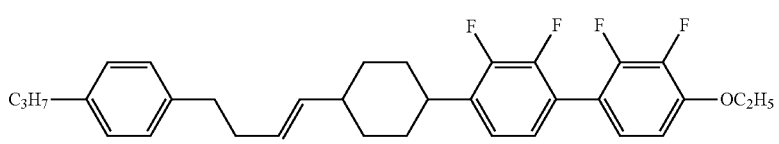<br>C 113.5 N 198.2 I<br>$T_{NI}$; 175.9° C., Δ ε; −5.41, Δ n; 0.194, η; 86.8 |
| 263 | 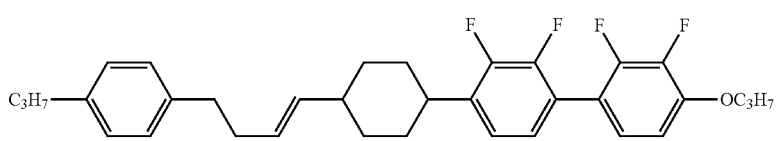 |
| 264 | 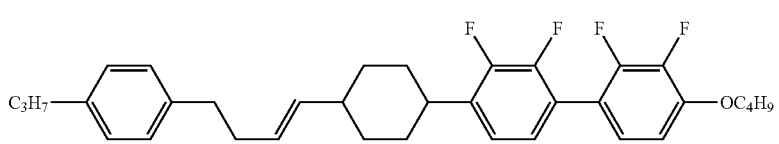 |

| No. | |
|---|---|
| 265 | 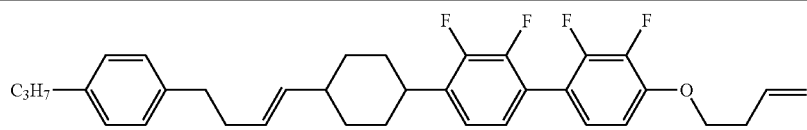 |
| 266 | 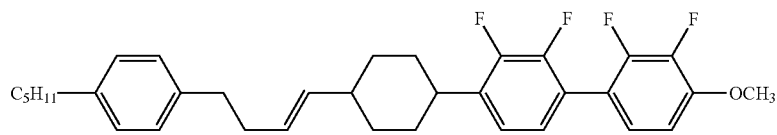 |
| 267 | 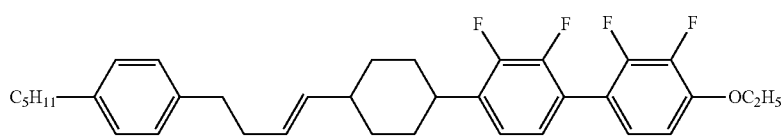 |
| 268 | 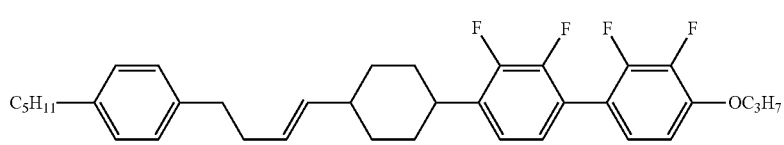 |
| 269 | 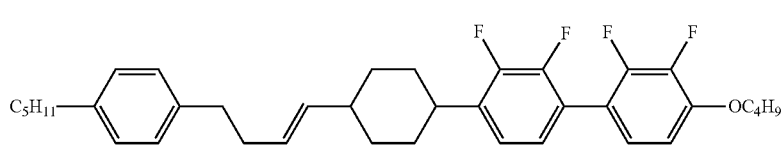 |
| 270 | 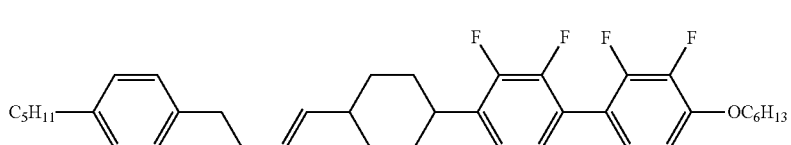 |
| 271 | 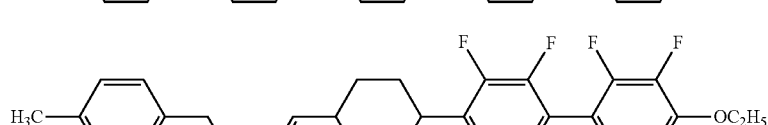 |
| 272 | 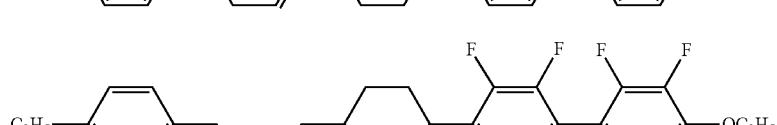 |
| 273 | 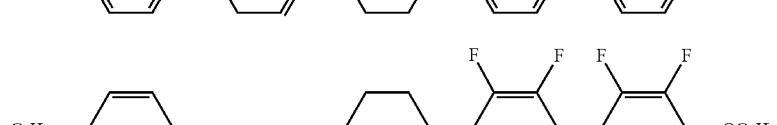 |
| 274 | 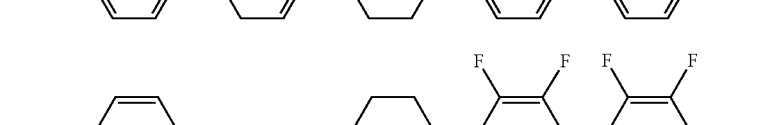 |
| 274 | 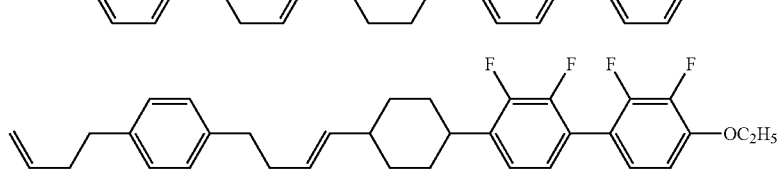 |

-continued
| No. | |
|---|---|
| 276 | 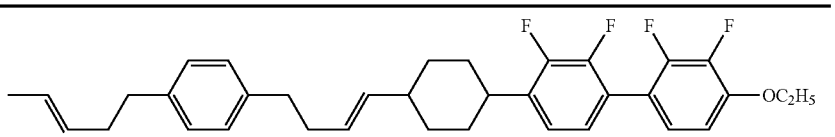 |
| 277 | 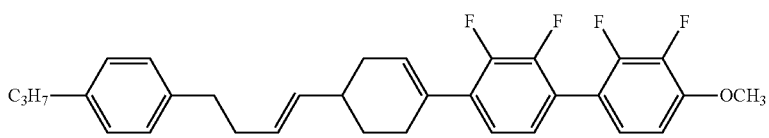 |
| 278 | 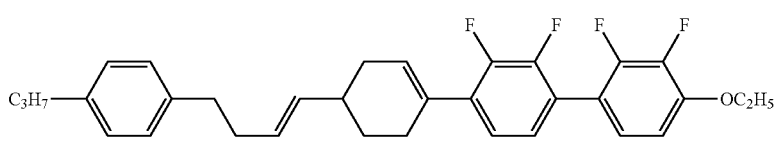 |
| 279 | 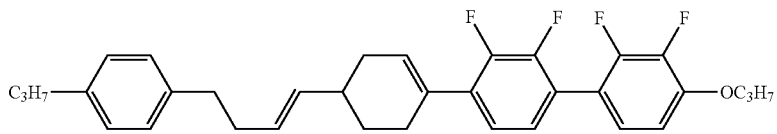 |
| 280 | 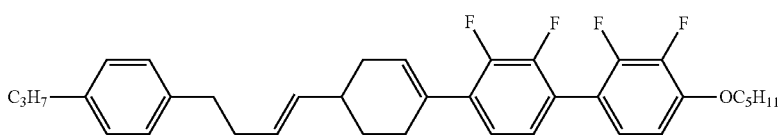 |
| 281 | 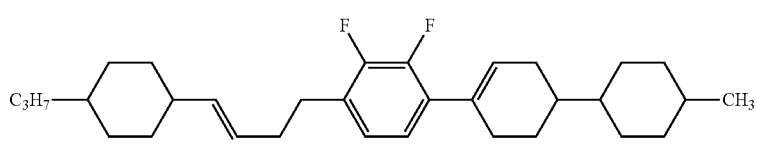 |
| 282 | 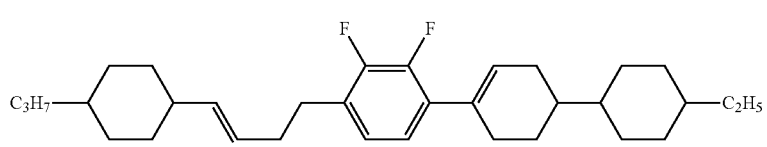 |
| 283 | 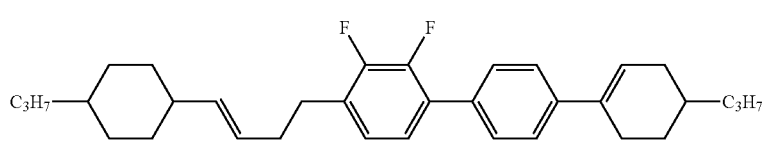 |
| 284 | 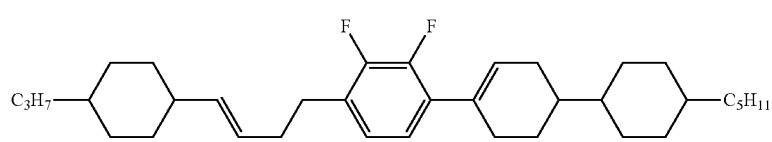 |
| | C 25.9 $S_B$ 131.4 $S_A$ 163.5 N 215.0 I<br>$T_{NI}$; 203.3° C., Δ ϵ; −2.33, Δ n; 0.106, η; 33.1 |
| 285 | 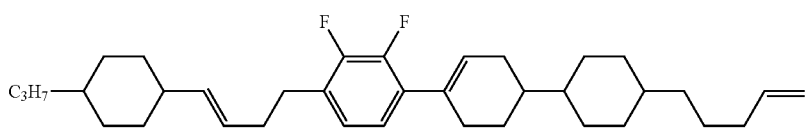 |
| 286 | 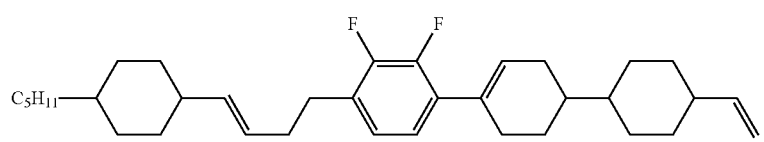 |

| No. | |
|---|---|
| 287 | 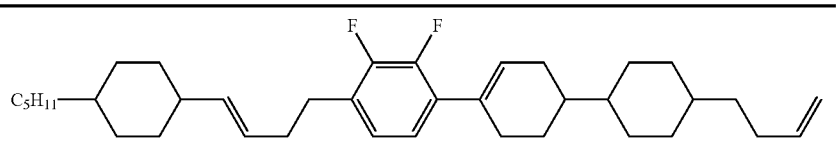 |
| 288 | 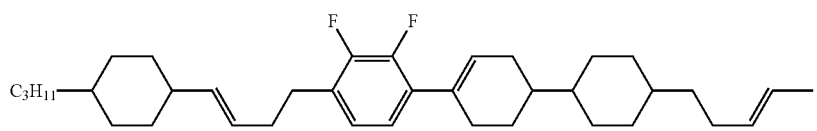 |
| 289 | 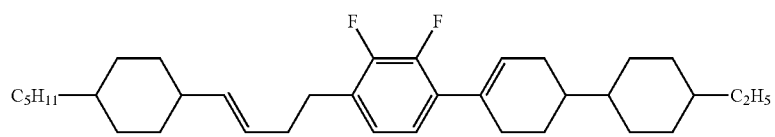 |
| 290 |  |
| 291 | 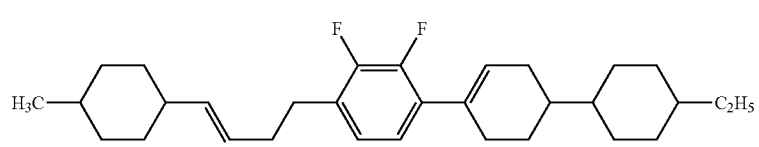 |
| 292 | 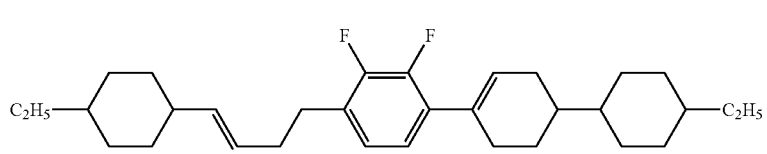 |
| 293 | 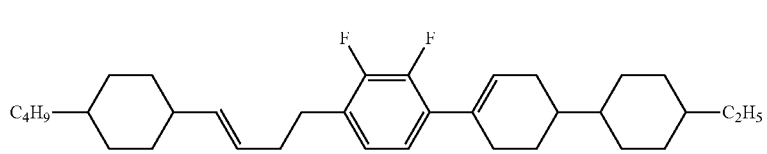 |
| 294 | 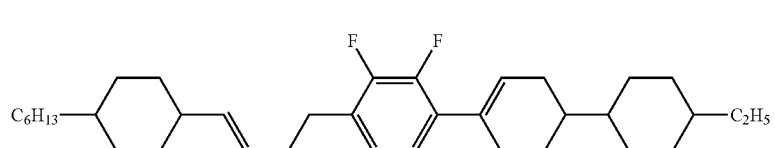 |
| 295 | 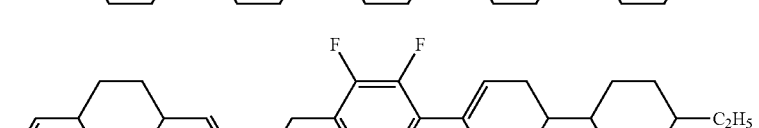 |
| 296 | 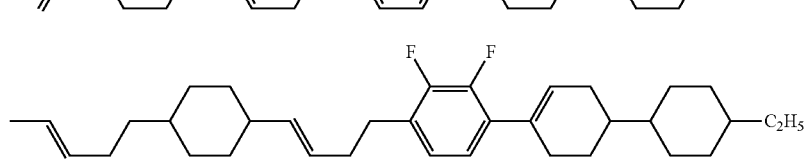 |
| 297 | 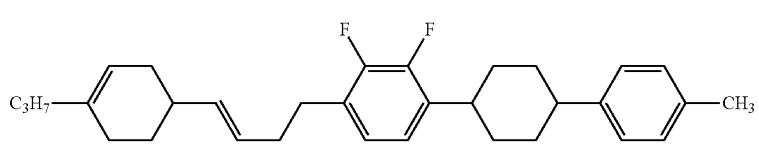 |

-continued
| No. | |
|---|---|
| 298 | 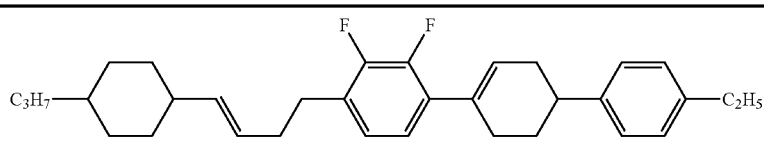 |
| 299 | 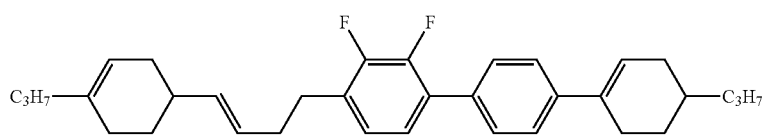 |
| 300 | 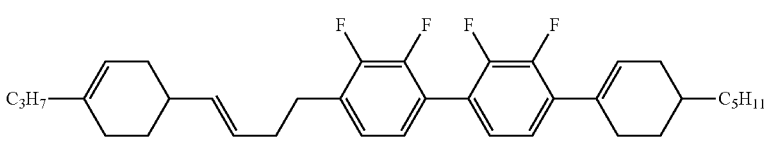 |
| 281 | 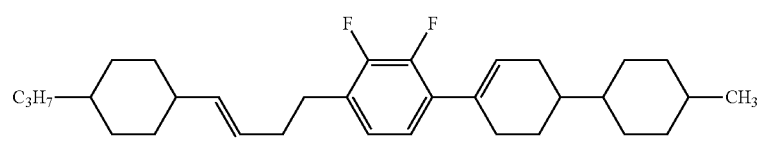 |
| 282 | 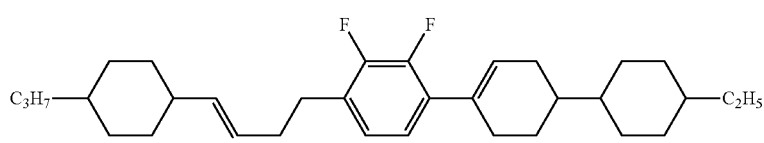 |
| 283 | 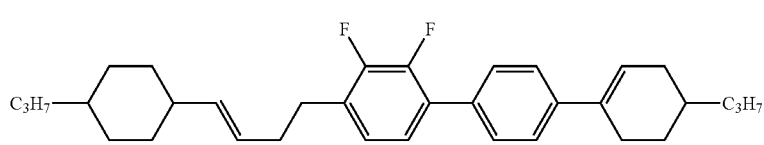 |
| 284 | 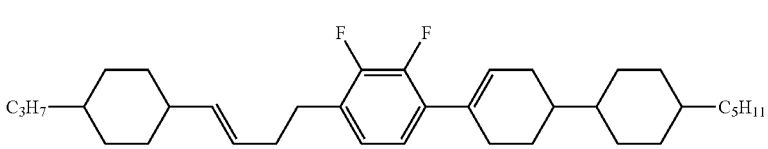 |
C 25.9 $S_B$ 131.4 $S_A$ 163.5 N 215.0 I
$T_{NI}$; 203.3° C., Δ ϵ; −2.33, Δ n; 0.106, η; 33.1
| 285 | 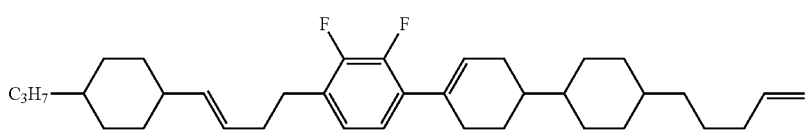 |
|---|---|
| 286 | 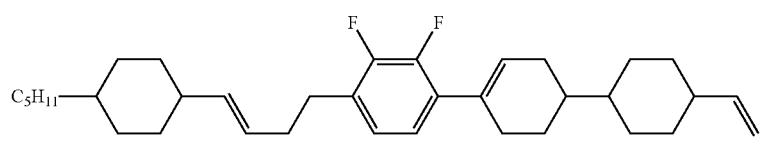 |
| 287 | 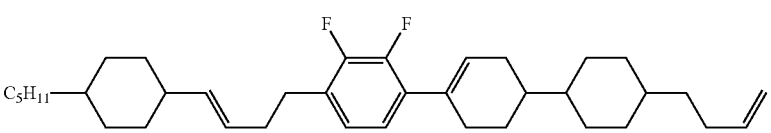 |
| 288 | 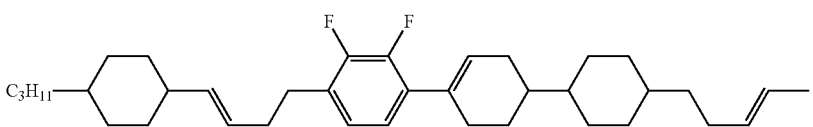 |

| No. |
|---|
| 289 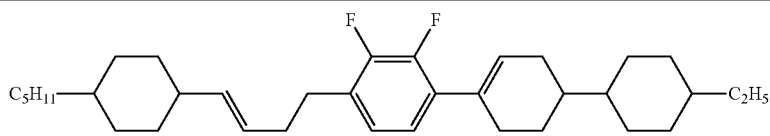 |
| 290  |
| 291 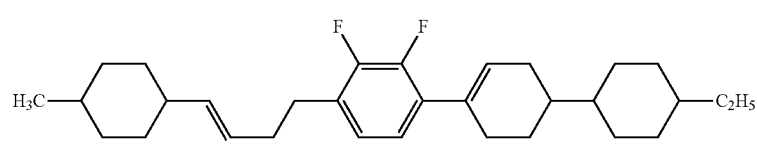 |
| 292 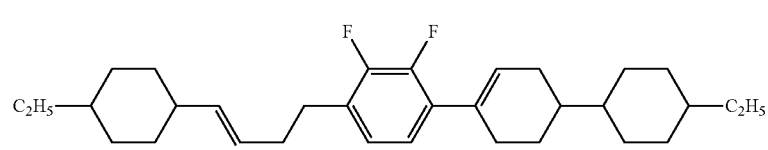 |
| 293 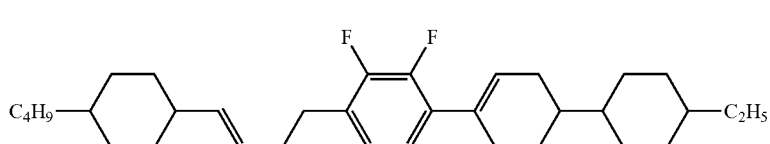 |
| 294 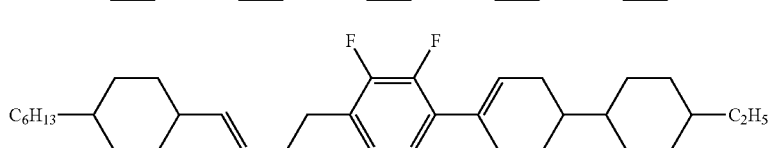 |
| 295 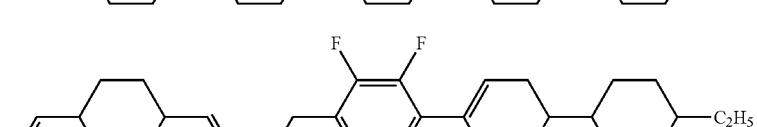 |
| 296 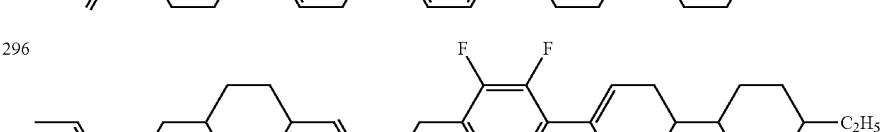 |
| 297 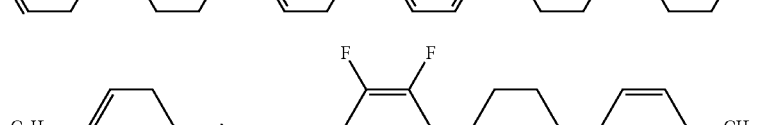 |
| 298 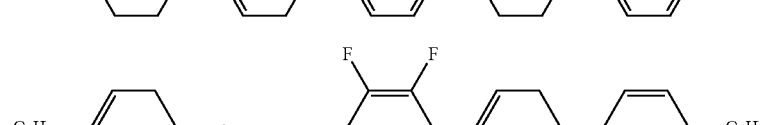 |
| 299 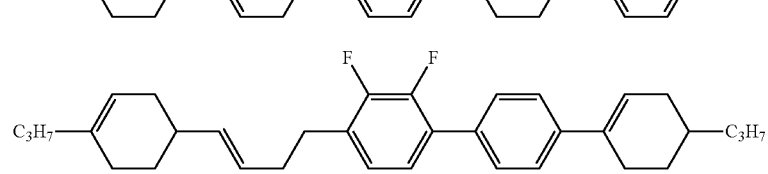 |

| No. | |
|---|---|
| 300 |  |

Example 15

Physical Properties of the Compound (No. 38)

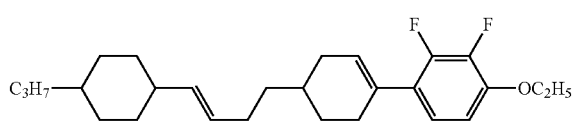
(No. 38)

The composition (iii) was prepared from 85% by weight of the mother liquid crystals (i) and 15% by weight of the compound (No. 38) obtained in Example 3. The physical properties of the compound (No. 38) were calculated by measuring the physical properties of the composition (iii) and by extrapolating the measured values. The extrapolated values were as follows. Maximum temperature $(T_{NI})$=115.3° C.; viscosity ($\eta$)=41.6 mPa·s. The elastic constant $K_{33}$ in the composition (iii) was 16.83 pN.

Comparative Example 1

2,3-Difluoro-4-((trans-4-pentylcyclohexyl)methoxy)-4'-propyl-1,1'-biphenyl (C') was prepared for comparison. This is because the comparative compound (C') is similar to 2,3-difluoro-4-((trans-4-pentylcyclohexyl)methoxy)-4'-pentyl-1,1'-biphenyl (C) that is disclosed in DE 3,906,058 A. The difference between them is only in a right terminal group.

The compound (C) disclosed in DE 3,906,058 A:

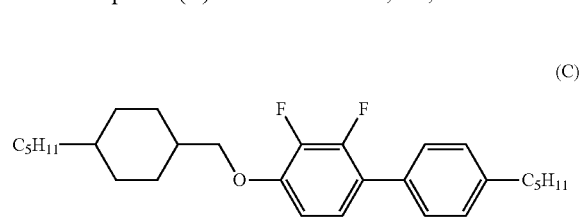

The comparative compound (C'):

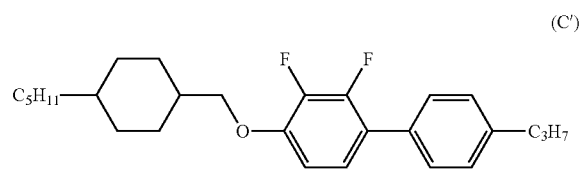

Chemical shift ($\delta$ ppm; $CDCl_3$) of the comparative compound (C'): 7.43 (td, 1H), 7.40 (d, 2H), 7.35 (d, 2H), 7.08 (td, 1H), 4.15 (q, 2H), 2.71 (t, 2H), 1.93 (m, 1H), 1.70-1.41 (m, 19H) and 0.92-0.88 (m, 6H).

The transition temperature of the comparative compound (C') was as follows. Transition temperature: C, 50.4; N, 116.8; I.

The composition (ii) was prepared from 85% by weight of the mother liquid crystals (i) and 15% by weight of the comparative compound (C'). The physical properties of the comparative compound (C') were calculated by measuring the physical properties of the composition (ii) and by extrapolating the measured values. The extrapolated values were as follows. Maximum temperature $(T_{NI})$=115.3° C.; viscosity ($\eta$)=61.2 mPa·s. The elastic constant $K_{33}$ in the composition (ii) was 16.67 pN.

TABLE

| Comparative experiment-1 | | |
|---|---|---|
| | Compound (No. 38) | Comparative compound (C') |
| Maximum temperature | 115.3° C. | 115.3° C. |
| Viscosity | 41.6 mPa·s | 61.2 mPa·s |
| Elastic constant | 16.83 pN | 16.67 pN |

As the table above shows, it was found that the compound (No. 38) had a large maximum temperature $(T_{NI})$, a small viscosity ($\eta$) and a large elastic constant $K_{33}$. It was found that the compound (No. 38) had a quite small viscosity (n), although the maximum temperature $(T_{NI})$ and the elastic constant $K_{33}$ are equivalent, in comparison with the comparative compound (C').

Example 16

Physical properties of the compound (No. 152)

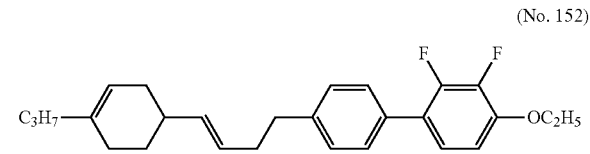
(No. 152)

The composition (v) was prepared from 85% by weight of the mother liquid crystals (i) and 15% by weight of the compound (No. 152) obtained in Example 6. The physical properties of the compound (No. 152) were calculated by measuring the physical properties of the composition (v) and by extrapolating the measured values. The extrapolated values were as follows. Dielectric anisotropy ($\Delta\epsilon$=−5.00; viscosity ($\eta$)=56.6 mPa·s. The elastic constant $K_{33}$ in the composition (v) was 16.75 pN.

Comparative Example 2

(E)-4-(4-(trans-4-Propylcyclohexyl)but-3-en-1-yl)phenyl 4-dodecyloxy-2,3-difluorobenzenecarboxylate (F') was prepared for comparison. The comparative compound (F') is similar to (E)-4-(4-(trans-4-pentylcyclohexyl)but-3-en-1-yl) phenyl 4-dodecyloxy-2,3-difluorobenzenecarboxylate (F) that is disclosed in JP H04-330019 A (1992). The difference between them is in a left terminal group.

The compound (F) disclosed in JP H04-330019 A (1992):

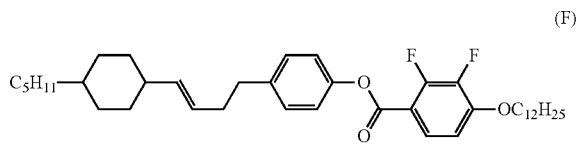
(F)

The comparative compound (F'):

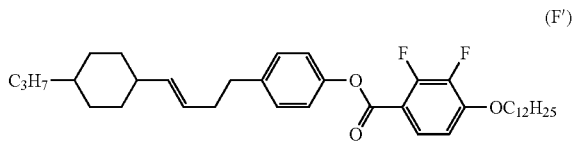
(F')

Chemical shift (δ ppm; CDCl$_3$) of the comparative compound (F'): 7.83 (td, 1H), 7.21 (d, 2H), 7.10 (d, 2H), 6.81 (t, 1H), 5.38 (m, 2H), 4.12 (q, 2H), 2.61 (t, 2H), 1.88 (quin, 2H), 1.71 (m, 4H), 1.59 (quin, 2H), 1.48 (quin, 2H), 1.40-1.23 (m, 16H), 1.23-1.11 (m, 6H) and 0.91-0.82 (m, 10H).

The transition temperature of the comparative compound (F') was as follows. Transition temperature: C, 57.7; S$_A$, 95.2; N, 114.9; I.

The composition (iv) was prepared from 85% by weight of the mother liquid crystals (i) and 15% by weight of the comparative compound (F'). The physical properties of the comparative compound (F') were calculated by measuring the physical properties of the composition (iv) and by extrapolating the measured values. The extrapolated values were as follows. Dielectric anisotropy (Δ∈)=−3.04; viscosity (η)=100.5 mPa·s. The elastic constant K$_{33}$ in the composition (ii) was 16.00 pN.

TABLE

| | Comparative experiment-2 | |
| --- | --- | --- |
| | Compound (No. 152) | Comparative compound (F') |
| Dielectric anisotropy | −5.00° C. | −3.04° C. |
| Viscosity | 56.6 mPa·s | 100.5 mPa·s |
| Elastic constant | 16.75 pN | 16.00 pN |

As the table above shows, it was found that the compound (No. 152) had a large negative dielectric anisotropy (Δ∈), a low viscosity (η) and a large elastic constant K$_{33}$. It was found that the compound (No. 152) had a large negative dielectric anisotropy (Δ|), a low viscosity (η) and a large elastic constant K$_{33}$ in comparison with the comparative compound (F').

Examples of the Composition (1)

The liquid crystal composition of the invention will be explained in detail by way of Examples. The invention is not limited by Examples described below. The compounds described in Examples will be expressed in terms of symbols according to the definition in the following table. In the table, the configuration of 1,4-cyclohexylene is trans. The parenthesized number next to a symbolized compound in Example corresponds to the number of the compound. The symbol (−) means any other liquid crystal compound. Ratios (percentage) of liquid crystal compounds mean the percentages by weight (% by weight) based on the total weight of the liquid crystal composition. Last, the characteristic values of the composition are summarized.

TABLE 1

Method of Description of Compounds using Symbols
R—(A$_1$)—Z$_1$—...—Z$_n$—(A$_n$)—R'

| 1) Left-terminal Group R— | Symbol |
| --- | --- |
| C$_n$H$_{2n+1}$— | n- |
| C$_n$H$_{2n+1}$O— | nO— |
| C$_m$H$_{2m+1}$OC$_n$H$_{2n}$— | mOn- |
| CH$_2$=CH— | V— |
| C$_n$H$_{2n+1}$—CH=CH— | nV— |
| CH$_2$=CH—C$_n$H$_{2n}$— | Vn- |
| C$_m$H$_{2m+1}$—CH=CH—C$_n$H$_{2n}$— | mVn- |
| CF$_2$=CH— | VFF— |
| CF$_2$=CH—C$_n$H$_{2n}$— | VFFn- |

| 2) Right-terminal Group —R' | Symbol |
| --- | --- |
| —C$_n$H$_{2n+1}$ | -n |
| —OC$_n$H$_{2n+1}$ | —On |
| —CH=CH$_2$ | —V |
| —CH=CH—C$_n$H$_{2n+1}$ | —Vn |
| —C$_n$H$_{2n}$—CH=CH$_2$ | -nV |
| —C$_m$H$_{2m}$—CH=CH—C$_n$H$_{2n+1}$ | -mVn |
| —CH=CF$_2$ | —VFF |
| —COOCH$_3$ | -EMe |
| —F | —F |
| —Cl | —CL |
| —CN | —C |
| —OCF$_3$ | —OCF3 |

TABLE 1-continued
Method of Description of Compounds using Symbols
R—(A$_1$)—Z$_1$—...—Z$_n$—(A$_n$)—R'
| 3) Bonding Group —Z$_n$— | Symbol |
|---|---|
| —C$_n$H$_{2n}$— | n |
| —COO— | E |
| —CH=CH— | V |
| —CH$_2$O— | 1O |
| —OCH$_2$— | O1 |
| —CF$_2$O— | X |
| —C≡C— | T |
| 4) Ring Structure —A$_n$— | Symbol |
|---|---|
|  | B |
| 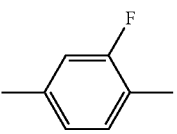 | B(F) |
| 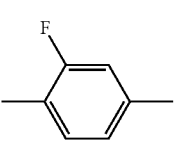 | B(2F) |
| 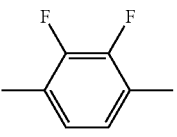 | B(2F,3F) |
| 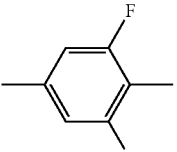 | B(F,F) |
| 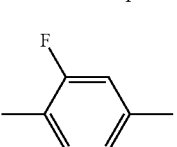 | B(2F,5F) |
| 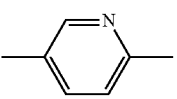 | Pr |
| 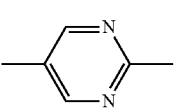 | Py |
|  | H |
| 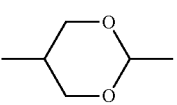 | G |

TABLE 1-continued

Method of Description of Compounds using Symbols
R—(A₁)—Z₁—...—Zₙ—(Aₙ)—R'

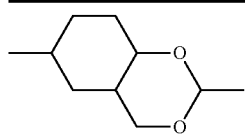 Gd

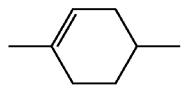 Ch

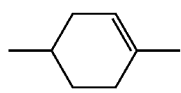 ch

5) Examples of Description

Example 1. 3-B2VHB(2F,3F)—O2

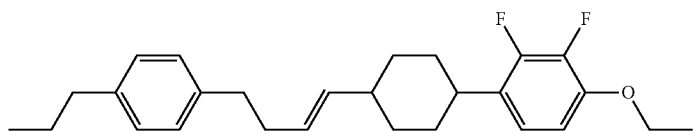 [SMILES: CCCc1ccc(CC/C=C/C2CCC(c3ccc(OCC)c(F)c3F)CC2)cc1]

Example 2. 3-BHV2B(2F,3F)—O2

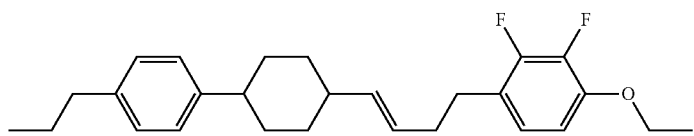

Example 3. 5-HBB(F)B-3

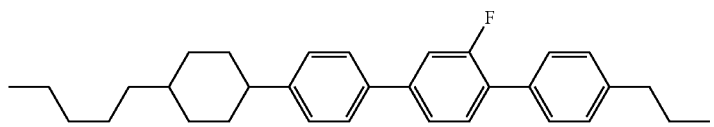

Example 4. 3-HH-4

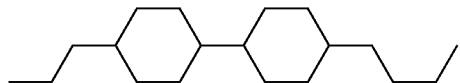

The characteristics of the liquid crystal composition such as the maximum temperature of a nematic phase and the optical anisotropy were measured according to the methods described above. Measured values were herein described as they were.

Example 17

| | | |
|---|---|---|
| 3-B2VHB(2F,3F)—O2 | (No. 2) | 4% |
| 3-BHV2B(2F,3F)—O2 | (No. 42) | 3% |
| 3-HH—O1 | (8-1) | 7% |
| 5-HH—O1 | (8-1) | 3% |
| 3-HH-4 | (8-1) | 5% |
| 3-HB(2F,3F)—O2 | (2-1) | 16% |
| 5-HB(2F,3F)—O2 | (2-1) | 21% |
| 3-HHB(2F,3F)-1 | (3-1) | 7% |
| 3-HHB(2F,3F)—O2 | (3-1) | 14% |

-continued

| | | |
|---|---|---|
| 5-HHB(2F,3F)—O2 | (3-1) | 20% |

NI = 63.2° C.;
ΔN = 0.082;
H = 24.0 MPA · S;
ΔE = −4.3.

Example 18

| | | |
|---|---|---|
| 3-B(2F,3F)HV2B(2F,3F)—O2 | (No. 82) | 3% |
| 3-ChV2BB(2F,3F)—O2 | (No. 152) | 7% |
| 3-HB—O1 | (8-5) | 15% |
| 3-HH-4 | (8-1) | 5% |
| 3-HB(2F,3F)—O2 | (2-1) | 12% |
| 5-HB(2F,3F)—O2 | (2-1) | 12% |
| 2-HHB(2F,3F)-1 | (3-1) | 6% |

-continued

| | | |
|---|---|---|
| 3-HHB(2F,3F)-1 | (3-1) | 12% |
| 3-HHB(2F,3F)—O2 | (3-1) | 9% |
| 5-HHB(2F,3F)—O2 | (3-1) | 13% |
| 3-HHB-1 | (9-1) | 6% |

NI = 83.5° C.;
$\Delta n$ = 0.097;
$\eta$ = 37.7 mPa · s;
$\Delta\epsilon$ = −3.6.

Example 19

| | | |
|---|---|---|
| 3-HV2chB(2F,3F)—O2 | (No. 38) | 4% |
| 3-HV2B(2F,3F)Ch-V | (No. 102) | 3% |
| 3-HH-4 | (8-1) | 4% |
| 3-H2B(2F,3F)—O2 | (2-4) | 22% |
| 5-H2B(2F,3F)—O2 | (2-4) | 22% |
| 2-HHB(2F,3CL)—O2 | (3-12) | 2% |
| 3-HHB(2F,3CL)—O2 | (3-12) | 3% |
| 5-HHB(2F,3CL)—O2 | (3-12) | 2% |
| 3-HBB(2F,3F)—O2 | (3-7) | 9% |
| 5-HBB(2F,3F)—O2 | (3-7) | 9% |
| V—HHB-1 | (9-1) | 6% |
| 3-HHB-3 | (9-1) | 6% |
| 3-HHEBH-3 | (10-6) | 3% |
| 3-HHEBH-4 | (10-6) | 3% |
| 3-HHEBH-5 | (10-6) | 2% |

NI = 92.3° C.;
$\Delta n$ = 0.104;
$\eta$ = 29.9 mPa · s;
$\Delta\epsilon$ = −4.2.

Example 20

| | | |
|---|---|---|
| 3-BHV2BB(2F,3F)—O2 | (No. 182) | 3% |
| 3-BHV2HB(2F,3F)—O2 | (No. 202) | 3% |
| 3-BB2VHB(2F,3F)—O2 | (No. 162) | 3% |
| 3-HB—O1 | (8-5) | 12% |
| 3-HH-4 | (8-1) | 4% |
| 3-HB(2F,3F)—O2 | (2-1) | 12% |
| 5-HB(2F,3F)—O2 | (2-1) | 12% |
| 2-HHB(2F,3F)-1 | (3-1) | 10% |
| 3-HHB(2F,3F)-1 | (3-1) | 12% |
| 3-HHB(2F,3F)—O2 | (3-1) | 10% |
| 5-HHB(2F,3F)—O2 | (3-1) | 13% |
| 6-HEB(2F,3F)—O2 | (2-6) | 6% |

NI = 92.0° C.;
$\Delta n$ = 0.097;
$\eta$ = 37.5 mPa · s;
$\Delta\epsilon$ = −3.8.

The helical pitch was 60.1 μm when 0.25 part by weight of the optically active compound (Op-5) was added to 100 parts of the preceding composition.

Example 21

| | | |
|---|---|---|
| 3-B2VHHB(2F,3F)—O2 | (No. 222) | 4% |
| 3-B2VHBB(2F,3F)—O2 | (No. 242) | 4% |
| 2-HH-5 | (8-1) | 3% |
| 3-HH-4 | (8-1) | 15% |
| 3-HH-5 | (8-1) | 4% |
| 3-HB—O2 | (8-5) | 12% |

-continued

| | | |
|---|---|---|
| 3-H2B(2F,3F)—O2 | (2-4) | 15% |
| 5-H2B(2F,3F)—O2 | (2-4) | 15% |
| 3-HHB(2F,3CL)—O2 | (3-12) | 3% |
| 2-HBB(2F,3F)—O2 | (3-7) | 3% |
| 3-HBB(2F,3F)—O2 | (3-7) | 7% |
| 5-HBB(2F,3F)—O2 | (3-7) | 9% |
| 3-HHB-1 | (9-1) | 3% |
| 3-HHB—O1 | (9-1) | 3% |

NI = 80.3° C.;
$\Delta n$ = 0.098;
$\eta$ = 20.5 mPa · s;
$\Delta\epsilon$ = −4.2.

Example 22

| | | |
|---|---|---|
| 3-B2VHB(2F,3F)B(2F,3F)—O2 | (No. 262) | 5% |
| 3-HV2B(2F,3F)ChH-5 | (No. 284) | 3% |
| 3-HB—O1 | (8-5) | 15% |
| 3-HH-4 | (8-1) | 5% |
| 3-HB(2F,3F)—O2 | (2-1) | 12% |
| 5-HB(2F,3F)—O2 | (2-1) | 12% |
| 2-HHB(2F,3F)-1 | (3-1) | 12% |
| 3-HHB(2F,3F)-1 | (3-1) | 6% |
| 3-HHB(2F,3F)—O2 | (3-1) | 11% |
| 5-HHB(2F,3F)—O2 | (3-1) | 13% |
| 3-HHB-1 | (9-1) | 6% |

NI = 90.8° C.;
$\Delta n$ = 0.095;
$\eta$ = 38.1 mPa · s;
$\Delta\epsilon$ = −3.5.

INDUSTRIAL APPLICABILITY

The compound of the invention has a high stability to heat, light or the like, a wide temperature range of a nematic phase, a small viscosity, a suitable optical anisotropy, a large elastic constant $K_{33}$, a large negative dielectric anisotropy and an excellent compatibility with other liquid crystal compounds. A liquid crystal composition including the compound has a high stability to heat, light or the like, a small viscosity, a suitable optical anisotropy, a large elastic constant $K_{33}$, a suitable negative dielectric anisotropy, a low threshold voltage, a high maximum temperature of a nematic phase and a low minimum temperature of a nematic phase. A liquid crystal display device containing the composition has a short response time, low electric power consumption, a low driving voltage, a large contrast and a wide temperature range in which the device can be used. Accordingly, the compound of the invention is suitable for use in a display device operated in an IPS mode or a VA mode.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

What is claimed is:

1. A compound represented by formula (1):

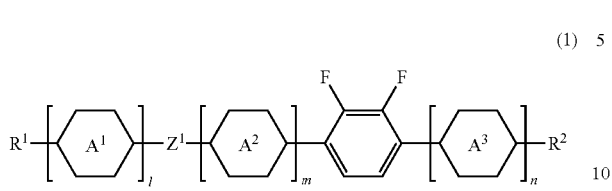
(1)

wherein
- $R^1$ and $R^2$ are each independently hydrogen, alkyl having 1 to 10 carbons, alkenyl having 2 to 10 carbons, alkoxy having 1 to 9 carbons, alkoxyalkyl having 2 to 9 carbons or alkenyloxy having 2 to 9 carbons;
- ring $A^1$, ring $A^2$ and ring $A^3$ are each independently 1,4-cyclohexylene, 1,4cyclohexenylene, 1,4-phenylene or 2,3-difluoro-1,4-phenylene;
- at least one of ring $A^2$ and ring $A^3$ is 1,4-cyclohexenylene when ring $A^1$ is 1,4-cyclohexylene;
- $Z^1$ is —$(CH_2)_2$—CH=CH— or —CH=CH—$(CH_2)_2$—;
- l is 1 or 2, m and n are each independently 0, 1 or 2, the sum of m and n is 1 or 2, and the sum of l, m and n is 2 or 3;
- when l and m are 1, n is 0, ring $A^1$ is 1,4-phenylene or 2,3-difluoro-1,4-phenylene and ring $A^2$ is 1,4-cyclohexylene or 1,4-cyclohexenylene, and
- when l is 2, m is 1 and n is 0, if one ring $A^1$ is 1,4-cyclohexylene or 1,4-cyclohexenylene, then the other ring $A^1$ is 1,4-phenylene, and ring $A^2$ is 1,4-phenylene.

2. The compound according to claim 1, wherein the compound is represented by formula (1-1) or (1-2):

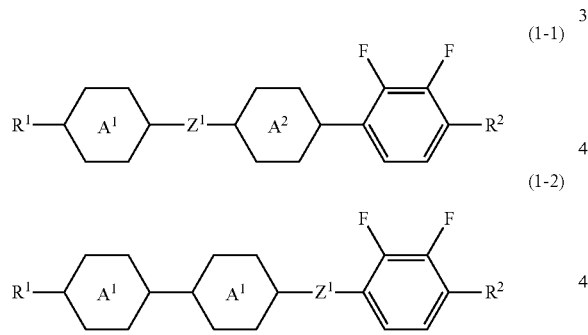
(1-1)
(1-2)

wherein
- $R^1$ and $R^2$ are each independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons;
- each ring $A^1$ is independently 1,4cyclohexenylene, 1,4-phenylene or 2,3-difluoro-1,4-phenylene and the ring $A^2$ is independently 1,4-cyclohexylene, 1,4-cyclohexenylene, 1,4-phenylene or 2,3-difluoro-1,4-phenylene;
- $Z^1$ is —$(CH_2)_2$—CH=CH— or —CH=CH—$(CH_2)_2$—;
- in formula (1-1), when either rind $A^1$ or ring $A^2$ is 1,4-phenylene, the other is 1,4-cyclohexylene or 1,4-cyclohexenylene; and
- in formula (1-2), when one ring $A^1$ is 1,4-phenylene, the other ring $A^1$ is 1,4-cyclohexylene or 1,4-cyclohexenylene.

3. The compound according to claim 2, wherein the compound is represented by any one of formulas (1-1-1), (1-1-2) and (1-2-2):

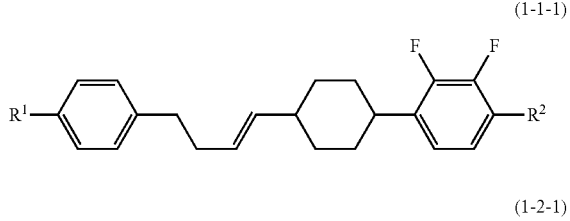
(1-1-1)

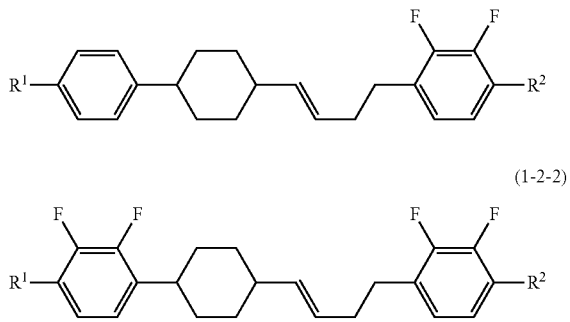
(1-2-1)
(1-2-2)

wherein
- $R^1$ and $R^2$ are each independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons.

4. The compound according to claim 1, wherein the compound is represented by formula (1-3) or (1-4):

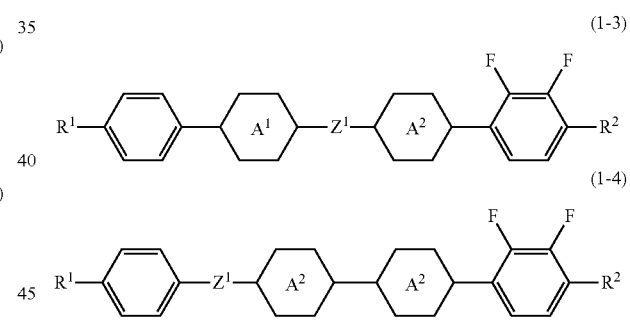
(1-3)
(1-4)

wherein
- $R^1$ and $R^2$ are each independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons;
- ring $A^1$ and ring $A^2$ are each independently 1,4-cyclohexylene, 1,4-cyclohexenylene or 1,4-phenylene;
- $Z^1$ is —$(CH_2)_2$—CH=CH— or —CH=CH—$(CH_2)_2$—;
- in formula (1-3), when either ring $A^1$ or ring $A^2$ is 1,4-phenylene, the other is 1,4-cyclohexylene or 1,4-cyclohexenylene; and
- in formula (1-4), when one ring $A^2$ is 1,4-phenylene, the other ring $A^2$ is 1,4-cyclohexylene or 1,4-cyclohexenylene.

5. The compound according to claim 4, wherein the compound is represented by any one of formulas (1-3-1) to (1-3-3) and formulas (1-4-1) to (1-4-3):

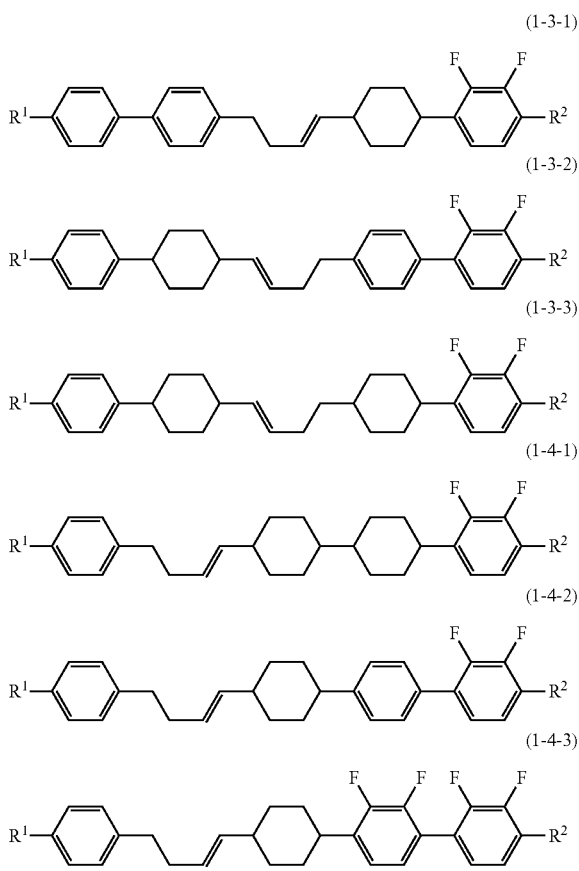

wherein $R^1$ and $R^2$ are each independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons.

6. The compound according to claim 1, wherein the compound is represented by formula (1-5):

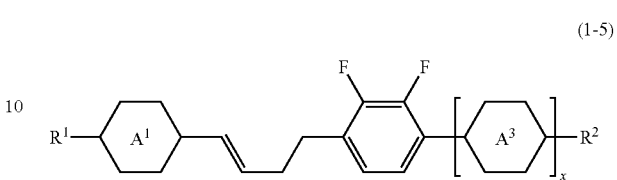

wherein
$R^1$ and $R^2$ are each independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons;
ring $A^1$ is 1,4-cyclohexylene or 1,4-cyclohexenylene, and ring $A^3$ is 1,4-cyclohexylene, 1,4-cyclohexenylene or 1,4-phenylene;
ring $A^3$ is 1,4-cyclohexenylene when ring $A^1$ is 1,4-cyclohexylene; and
x is 1 or 2.

7. A liquid crystal composition comprising at least one of compounds according to claim 1.

8. A liquid crystal composition comprising at least one of compounds according to claim 2.

9. A liquid crystal composition comprising at least one of compounds according to claim 4.

10. A liquid crystal composition comprising at least one of compounds according to claim 6.

11. The liquid crystal composition according to claim 7, further comprising at least one compound selected from the group of compounds represented by formulas (2), (3), (4), (5), (6) and (7):

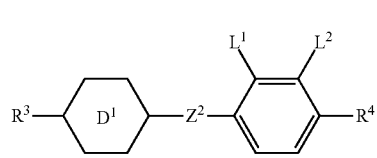

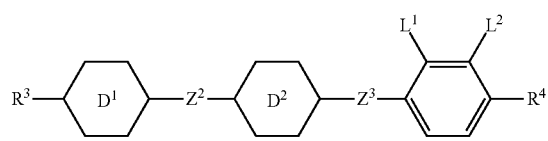

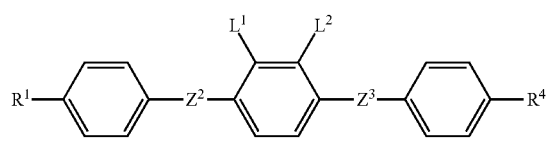

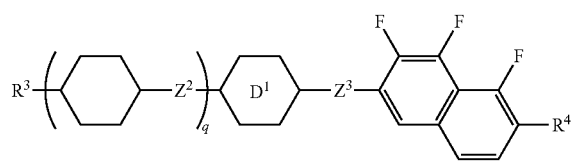

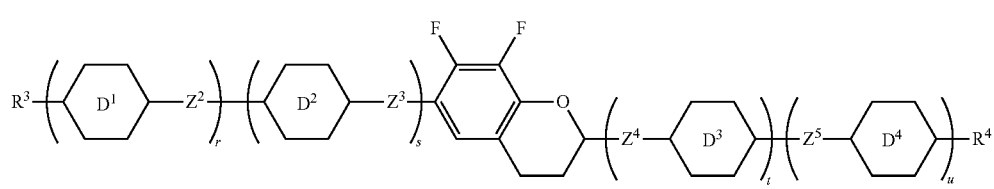

(7)

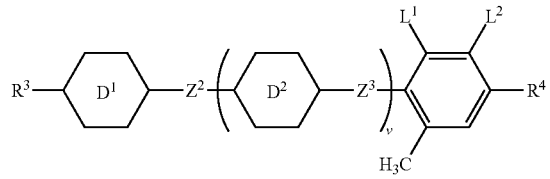

wherein R³ and R⁴ are each independently alkyl having 1 to 10 carbons or alkenyl having 2 to 10 carbons, and in the alkyl and the alkenyl, arbitrary hydrogen may be replaced by fluorine and arbitrary —CH₂— may be replaced by —O—;

ring $D^1$, ring $D^2$, ring $D^3$ and ring $D^4$ are each independently 1,4cyclohexylene, 1,4-cyclohexenylene, 1,4-phenylene in which arbitrary hydrogen may be replaced by fluorine, tetrahydropyran-2,5-diyl or decahydro-2,6-naphthalene;

$Z^2$, $Z^3$, $Z^4$ and $Z^5$ are each independently —(CH₂)₂—, —COO—, —CH₂O—, —OCF₂—, —OCF₂(CH₂)₂— or a single bond;

$L^1$ and $L^2$ are each independently fluorine or chlorine; and q, r, s, t, u and v are each independently 0 or 1, and the sum of r, s, t and u is 1 or 2.

12. The liquid crystal composition according to claim 7, further comprising at least one compound selected from the group of compounds represented by formulas (8), (9) and (10):

(8)

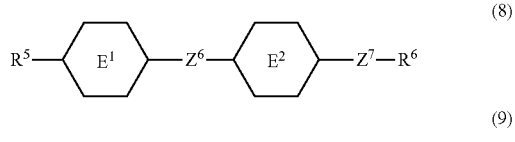

(9)

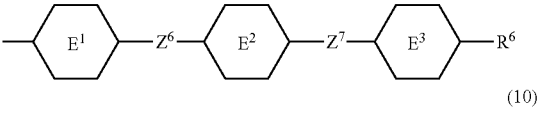

(10)

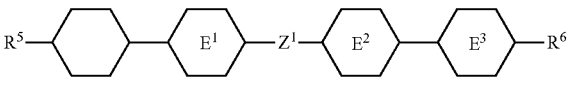

wherein

R⁵ and R⁶ are each independently alkyl having 1 to 10 carbons or alkenyl having 2 to 10 carbons, and in the alkyl and the alkenyl, arbitrary —CH₂— may be replaced by —O—;

ring $E^1$, ring $E^2$ and ring $E^3$ are each independently 1,4-cyclohexylene, pyrimidine-2,5-diyl, 1,4-phenylene, 2-fluoro-1,4-phenylene, 3-fluoro-1,4-phenylene or 2,5difluoro-1,4-phenylene; and $Z^6$ and $Z^7$ are each independently —C≡C—, —COO—, —(CH₂)₂—, —CH=CH— or a single bond.

13. The liquid crystal composition according to claim 11, further comprising at least one compound selected from the group consisting of compounds represented by formulas (8), (9) and (10):

(8)

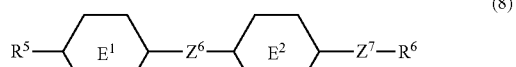

(9)

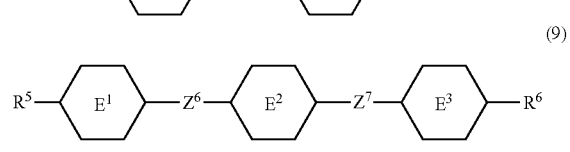

(10)

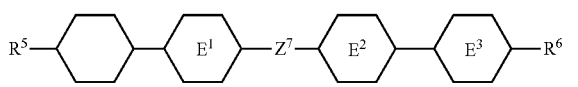

wherein

R⁵ and R⁶ are each independently alkyl having 1 to 10 carbons or alkenyl having 2 to 10 carbons, and in the alkyl and the alkenyl, arbitrary —CH₂— may be replaced by —O—;

ring $E^1$, ring $E^2$ and ring $E^3$ are each independently 1,4-cyclohexylene, pyrimidine-2,5-diyl, 1,4-phenylene, 2-fluoro-1,4-phenylene, 3-fluoro-1,4-phenylene or 2,5difluoro-1,4-phenylene; and $Z^6$ and $Z^7$ are each independently —C≡C—, —COO—, —(CH₂)₂—, —CH=CH— or a single bond.

14. The liquid crystal composition according to claim 7, further comprising at least one optically active compound and/or at least one polymerizable compound.

15. The liquid crystal composition according to claim 7, further comprising at least one antioxidant and/or at least one ultraviolet light absorber.

16. A liquid crystal display device containing the liquid crystal composition according to claim 7.

* * * * *